(12) United States Patent
Ramachandran et al.

(10) Patent No.: US 9,264,945 B2
(45) Date of Patent: Feb. 16, 2016

(54) SYSTEMS AND METHODS FOR IMPROVING CIRCUIT SWITCHED FALLBACK PERFORMANCE

(75) Inventors: Shyamal Ramachandran, San Diego, CA (US); Xipeng Zhu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 822 days.

(21) Appl. No.: 13/293,996

(22) Filed: Nov. 10, 2011

(65) Prior Publication Data
US 2012/0120789 A1    May 17, 2012

Related U.S. Application Data

(60) Provisional application No. 61/412,772, filed on Nov. 11, 2010, provisional application No. 61/424,560, filed on Dec. 17, 2010.

(51) Int. Cl.
| H04L 12/28 | (2006.01) |
| H04W 36/00 | (2009.01) |
| H04J 1/16 | (2006.01) |
| H04W 36/14 | (2009.01) |
| H04W 60/04 | (2009.01) |

(52) U.S. Cl.
CPC .......... *H04W 36/0022* (2013.01); *H04W 36/14* (2013.01); *H04W 60/04* (2013.01)

(58) Field of Classification Search
USPC .................................. 370/252, 241, 329, 352
See application file for complete search history.

(56) References Cited

U.S. PATENT DOCUMENTS

| 8,848,516 B2 * | 9/2014 | Sahin ................... H04W 36/12 370/225 |
| 2005/0090259 A1 | 4/2005 | Jain et al. |

(Continued)

FOREIGN PATENT DOCUMENTS

| CN | 101010977 A | 8/2007 |
| JP | 2011508496 A | 3/2011 |

(Continued)

OTHER PUBLICATIONS

Alcatel-Lucent: "UE behaviour with ISR active after CSFB with suspended PS Bearers", 3GPP Draft; S2-105143 Was 4679_23272 R10_ISR in CSFB_V3, 3rd Generation Partnersphip Project (3GPP), Mobile Competence Centre; 650, Route Des Lucioles; F-06921 Sophia-Antipolis Cedex; France, vol. SA WG2, no. Prague; Oct. 11, 2010, Oct. 15, 2010, XP050463079, [retrieved on Oct. 15, 2010].

(Continued)

*Primary Examiner* — John Pezzlo
(74) *Attorney, Agent, or Firm* — Novak Druce Connolly Bove + Quigg LLP

(57) ABSTRACT

Methods and apparatus for improving Circuit Switched (CS) Fallback performance, such as in an LTE network, are described. In one aspect, a UE may perform a RAU procedure before performing a CS call setup procedure when the UE has camped on a Non-DTM GERAN target after failing to access a redirection target. In another aspect, an MME may determine whether to perform a PS suspension based on an ISR status associated with a user terminal. In another aspect, an eNB may send information associated with a PS suspension to a user terminal.

30 Claims, 26 Drawing Sheets

(56) References Cited

U.S. PATENT DOCUMENTS

| | | |
|---|---|---|
| 2009/0082012 A1 | 3/2009 | Gallagher et al. |
| 2010/0098023 A1 | 4/2010 | Aghili et al. |
| 2010/0265884 A1 | 10/2010 | Vikberg et al. |
| 2011/0149907 A1 | 6/2011 | Olsson et al. |
| 2011/0171953 A1 | 7/2011 | Faccin et al. |
| 2011/0182243 A1* | 7/2011 | Gallagher et al. ............ 370/328 |
| 2013/0017805 A1* | 1/2013 | Andre--Jonsson et al. ... 455/411 |

FOREIGN PATENT DOCUMENTS

| | | |
|---|---|---|
| WO | 2005041612 | 5/2005 |
| WO | 2009081268 A1 | 7/2009 |
| WO | 2011073913 A1 | 6/2011 |
| WO | 2011138947 A1 | 11/2011 |

OTHER PUBLICATIONS

Huawei : "Correction for suspend procedure in CSFB", 3GPP Draft; S2-101061 CR Correction for Suspend Procedure in CSFB-V1, 3rd Generation Partnership Project (3GPP), Mobile Competence Centre; 650, Route Des Lucioles; F-06921 Sophia-Antipolis Cedex; France, vol. SA WG2, no. San Francisco, USA; Feb. 22, 2010, Feb. 16, 2010, XP050433674 [retrieved on Feb. 16, 2010] figures 6.3-1, 7.4-1.

Huawei: "Suspend problem in CSFB and SRVCC", 3GPP Draft; S2-101060 DIS Suspend Problem in CSFB and SRVCC-V3, 3rd-Generation Partnership Project (3GPP), Mobi Le Competence Centre; 650, Route Des Lucioles; F-06921 Sophia-Anti Polis Cedex; France, vol. SA WG2, no. San Francisco, USA; Feb. 22, 2010, Feb. 16, 2010, XP050433673, [retrieved on Feb. 16, 2010] p. 1, line 17-p. 3, line 33.

International Search Report and Written Opinion—PCT/US2011/060280—ISA/EPO—Feb. 29, 2012.

NEC: "Correction to the CSFB to UTRAN cell", 3GPP Draft; S2-097071 Correction to the CSFB to UTRAN Cell, 3rd Generation Partnership Project (3GPP), Mobile Competence Centre; 650, Route Des Lucioles; F-06921 Sophia-Antipolis Cedex; France, no. Cabo; Nov. 16, 2009, Nov. 6, 2009, XP050397938, [retrieved on Nov. 10, 2009] p. 2, line 1-p. 5, line 48; figures 6.3-1, 7.4-1.

Qualcomm Europe: "PS Bearer handling in redirection/NACC/CCO based CSFB", 3GPP Draft; S2-097060 (PS Bearer Handling in Redirection NACC CCO Based CSFB) R9 REV1, 3rd Generation Partnership Project (3GPP), Mobile Competence Centre; 650, Route Des Lucioles; F-06921 Sophia-Anti Polis Cedex; France, no. Cabo; Nov. 16, 2009, XP050397928, [retrieved on Nov. 10, 2009] p. 2, line 1-p. 3, line 25 p. 6, line 7-p. 8, line 7 figures 6.3-1,7.2-1,7.4-1.

Qualcomm Incorporated: "PS Suspending Clarification", 3GPP Draft; S2-110105 PS Suspending in CSFB 23.272 R9, 3rd Generation Partnership Project (3GPP), Mobile Competence Centre; 650, Route Des Lucioles; F-06921 Sophia-Anti Polis Cedex; France, vol. SA WG2, no. Elbonia; Jan. 17, 2011, Jan. 13, 2011, XP050475483, [Retrieved on Jan. 13, 2011].

* cited by examiner

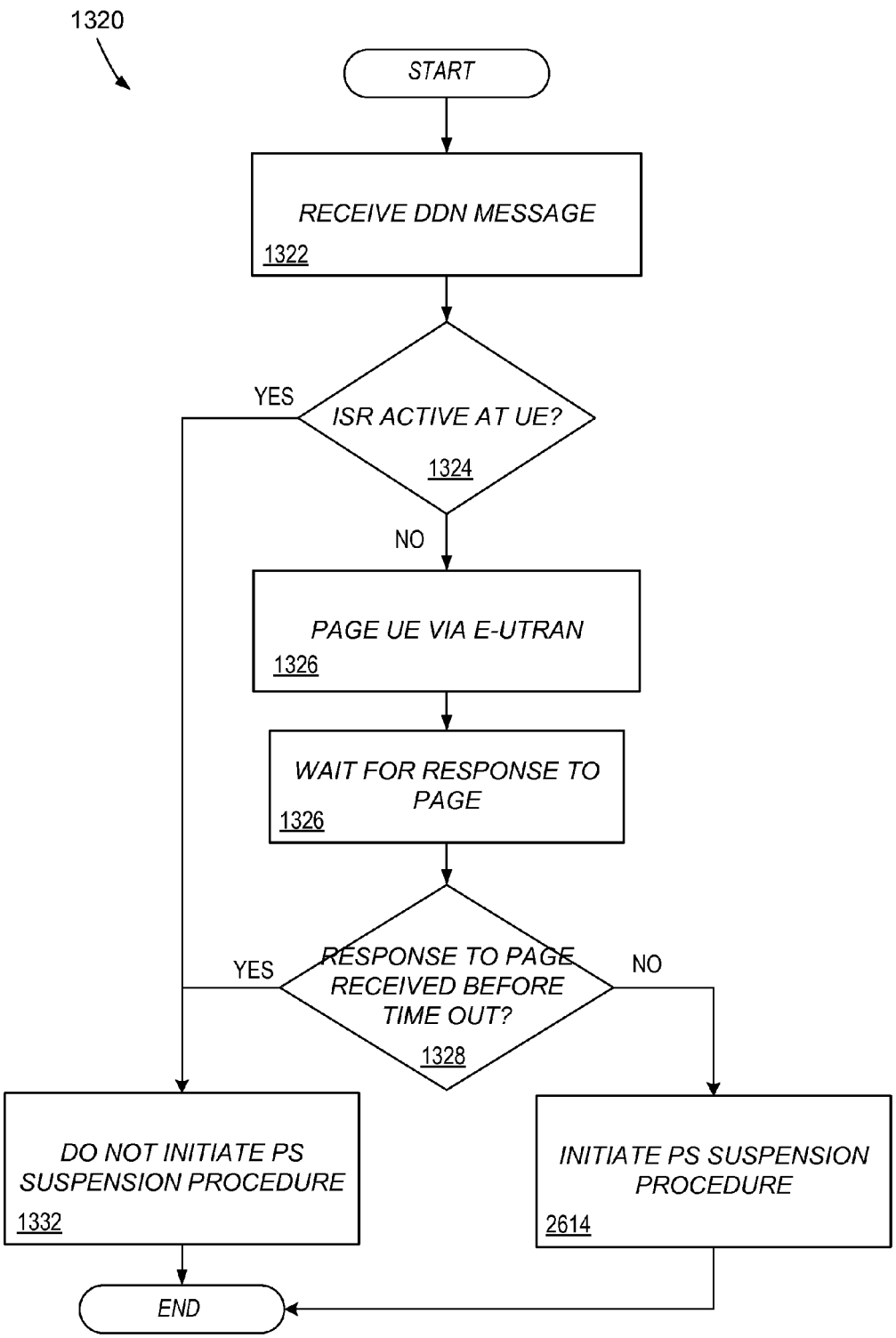

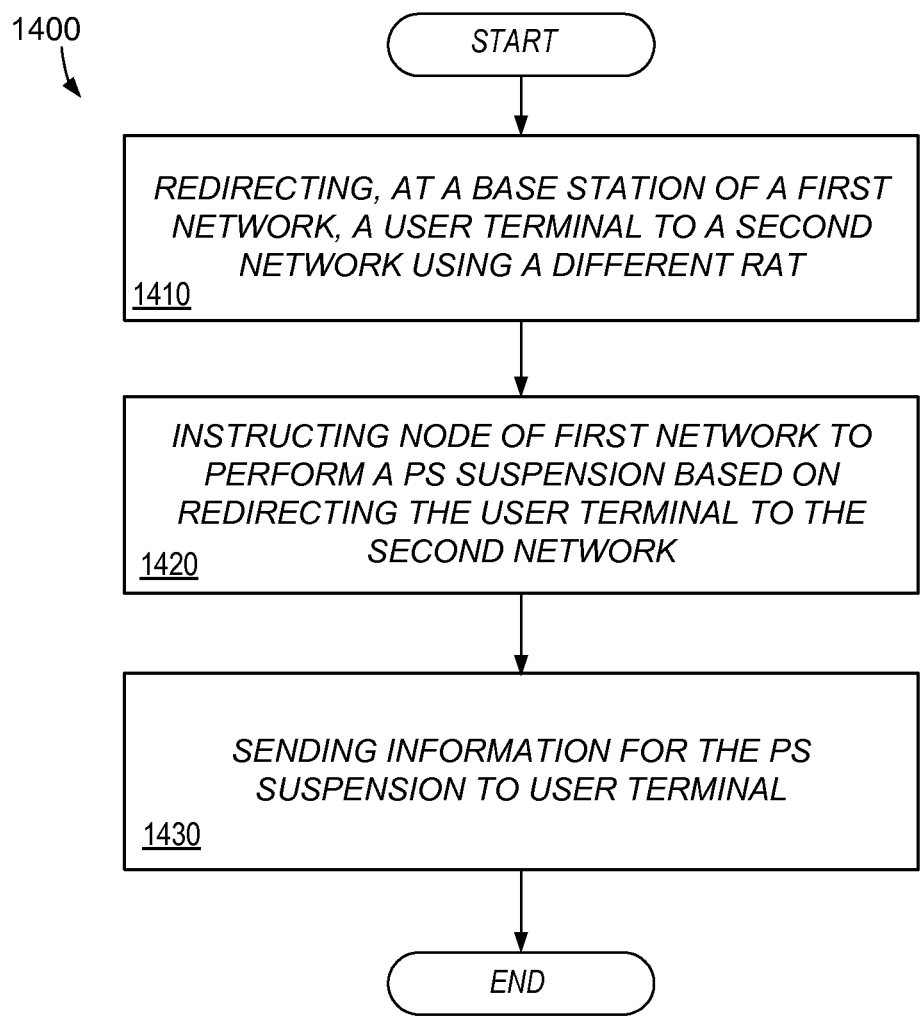

SYSTEMS AND METHODS FOR IMPROVING CIRCUIT SWITCHED FALLBACK PERFORMANCE

CROSS-REFERENCE TO RELATED APPLICATION

This application claims priority pursuant to 35 U.S.C. §119(e) to U.S. provisional application Ser. No. 61/412,772, filed Nov. 11, 2010, and U.S. provisional application Ser. No. 61/424,560 filed Dec. 17, 2010, both of which are hereby incorporated by reference, in their entirety.

FIELD

This application is directed generally to wireless communications systems.

More particularly, but not exclusively, the application relates to systems and apparatus for Circuit Switched (CS) Fallback (CSFB) performance enhancement in multimode communication systems and devices.

BACKGROUND

Wireless communication systems are widely deployed to provide various types of communication content such as voice, data, video, and the like, and deployments are likely to increase with introduction of new data oriented systems such as Long Term Evolution (LTE) systems. Wireless communication systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and other orthogonal frequency division multiple access (OFDMA) systems.

Generally, a wireless multiple-access communication system can simultaneously support communication for multiple wireless terminals (also know as user equipments (UEs), user terminals, or access terminals (ATs)). Each terminal communicates with one or more base stations (also know as access points (APs), EnodeBs, or eNBs) via transmissions on forward and reverse links. The forward link (also referred to as a downlink or DL) refers to the communication link from the base stations to the terminals, and the reverse link (also referred to as an uplink or UL) refers to the communication link from the terminals to the base stations. These communication links may be established via single-in-single-out, single-in-multiple out, multiple-in-single-out, or multiple-in-multiple-out (MIMO) systems.

A feature of interest in many communication systems is multimode operation. In multimode operation, communication devices, such as user terminals, may be configured to operate on different types of communication networks that use different Radio Access Technologies (RATs) and Radio Access Networks (RANs). In some cases, user terminals or other communication devices may be redirected from one RAN supporting a first RAT to a second RAN supporting a different RAT.

For example, some LTE networks may not support voice connections, or in some cases, an operator may wish to move a voice connection to another network under their control or coordination for various reasons, such as mobility, loading, or other reasons. In one case, in an LTE system, which is data-centric, an operator may wish to move a user attempting to make a voice call to another network that supports a different technology, such as a Circuit Switched (CS) connection. Alternately, the operator may wish to move a user receiving an incoming voice call. For example, the operator may wish to redirect a user from an LTE network and associated cells to another network, such as a UTRAN or GERAN network (e.g., a network that natively supports CS connections), using a procedure know as Circuit Switched Fallback (CSFB), which is described in, for example, 3GPP TS 23.272. In some cases, a user may wish to perform simultaneous voice and data communications, but redirection to other networks may create problems for simultaneous voice and data operation.

SUMMARY

This disclosure relates generally to wireless communication systems. More particularly, but not exclusively, the disclosure relates to systems and methods for improving CSFB performance.

For example, in one aspect, the disclosure relates to a method for providing communications in a multi-mode environment. The method may include one or more of the stages of receiving, at a user terminal, a redirection target, detecting a failure to connect to the redirection target, searching, responsive to the failure, for an alternative target, camping on a cell of the alternative target, and performing at least on of a Routing Area Update (RAU) procedure and a CS call setup procedure while camped on the cell.

The redirection target may be provided to the user terminal from a network entity based on, for example, a call initiated by a user of the user terminal, or an incoming call request to the user terminal. The redirection target may be provided based on, for example, movement of the user terminal. The redirection target may be provided based on, for example, signal characteristics in a network associated with the redirection target, or loading associated with the redirection target. The redirection target may be provided based on, for example, a lack of ability of a network associated with the user equipment, such as an LTE network, to provide CS connections.

The method may include determining that the redirection target uses a first RAT different from a second RAT used by the alternative target. For example, the redirection target may be, or may include, a UMTS Terrestrial Radio Network (UTRAN) target. For further example, the alternative target may be, or may include, a GSM EDGE Radio Access Network (GERAN) target that is not configured to support Dual Transfer Mode (Non-DTM GERAN). The method may further include, for example, performing the RAU procedure before performing the CS call setup procedure. The RAU procedure may be performed before the CS call setup procedure when an Idle Mode Signaling Reduction (ISR) status of the user terminal is an "off" status.

In an alternative example, the redirection target may be, or may include, a GERAN target. The GERAN target may be configured to support Dual Transfer Mode (DTM). An ISR status of the user terminal may be an "on" status, and the method may further include performing the RAU procedure in parallel with the CS call setup procedure, and may be based at least in part on the ISR "on" status.

The redirection target may be, for example, a Non-DTM GERAN target. An ISR status of the user terminal may be an "off" status, and the method may further include performing the RAU procedure before performing the CS call setup procedure, and may be based at least in part on the ISR "off" status.

The GERAN target may be a Non-DTM GERAN target, and the method may further include determining, at the user terminal, whether to perform the RAU procedure in advance of the CS call setup procedure. The determining whether to perform the RAU procedure in advance of the CS call setup procedure may be based on, for example, at least one of an operator preference, a user preference, an operator policy, or a user policy. The at least one of an operator preference, a user preference, an operator policy, or a user policy may include, for example, an operator configuration, a user configuration, presence of one or more high priority sessions, and whether a CS call setup delay has already occurred. The user configuration may consist of one of a voice centric user terminal configuration and a data centric user terminal configuration. The high priority session may comprise, for example, an IP Mobility Subsystem (IMS) session.

The RAU procedure and the CS setup procedure may be performed, for example, based in part on a configuration status of a Mobility Management Entity (MME) serving the user terminal. The configuration status of the MME may include a determination, at the MME, to suspend Packet Switched (PS) services, which may be based at least in part on an ISR status.

The user terminal may be an LTE User Equipment (UE) or similar or equivalent device or system, and the redirection target may be provided from an LTE base station, such as an eNB or similar or equivalent device or system.

In another aspect, the disclosure relates to an alternative method for providing communications in a multimode environment. The method may include receiving, at a user terminal, a redirection target, detecting a failure to connect to the redirection target, camping, responsive to the failure, on a cell associated with an alternative target, and determining whether to perform a RAU procedure while camped on the cell. The method may further include determining, responsive to the determining whether to perform a RAU procedure, when to perform a Circuit Switched (CS) call setup procedure relative to performing the RAU procedure.

The determining when to perform a CS call setup procedure may be based in part on which of at least one Radio Access Technology (RAT) is in use by the redirection target and the alternative target. The determining when to perform a CS call setup procedure may be based in part on an ISR status of the user terminal.

The redirection target may be, for example, a GERAN target, the alternative target may be a UTRAN target or a DTM GERAN target, and the ISR status may be an "on" status. The determining may include determining to perform the RAU procedure in parallel with performing the CS setup procedure.

Alternately, the redirection target may be, for example, a GERAN target, the alternative target may be a Non-DTM GERAN target, and the ISR status may be an "off" status. The determining may include determining to perform the CS call setup procedure after performing the RAU procedure.

Alternately, the redirection target may be, for example, a UTRAN target, the alternative target may be a Non-DTM GERAN, and the ISR status may be an "off" status. The determining may include determining to perform the CS call setup procedure after performing the RAU procedure.

The method may further include, for example, performing the RAU procedure and the CS setup procedure based in part on a configuration status of an MME serving the user terminal. The configuration status of the MME may include making a determination, at the MME, to suspend Packet Switched (PS) services, which may be based at least in part on an ISR status. The MME may receive a request to perform a PS suspension from a base station, such as an eNB.

The user terminal may be, for example, an LTE User Equipment (UE) and the redirection target may be provided from an LTE base station, such as an eNB.

In another aspect of the method, the user terminal may communicate with the network entity in a first network using a first RAT when receiving the redirection target, wherein the redirection target is in a second network and the alternative target is in a third network. Either or both of the second and third networks may use a second RAT different from the first RAT. The first network may be, for example, an LTE network and the third network may be, for example, a GERAN network. The method may include the user terminal receiving PS suspension information for a suspension of PS to the user terminal in connection with receiving the redirection target. The PS suspension information may include, for example, an indication that a PS suspension is to be performed. The user terminal may determine whether to perform the RAU procedure based on the PS suspension information. The GERAN network of the alternative target may be, for example, a DTM capable GERAN network. An ISR status of the user terminal may be an "on" status, and the determining whether to perform the RAU procedure may include determining to perform the RAU procedure, which may be based at least in part on the ISR status. The method may further include performing a CS call setup procedure in parallel with performing the RAU procedure. The performing a CS call setup procedure in parallel with performing the RAU procedure may be done in part based on the ISR "on" status.

Alternately, the first network may be, for example, an LTE network and the third network of the alternative target may be, for example, a UTRAN network. An ISR status of the user terminal may be an "on" status, and the determining whether to perform the RAU procedure may include determining to perform the RAU procedure. The method may further include performing a CS call setup procedure in parallel with performing the RAU procedure. The performing a CS call setup procedure in parallel with performing the RAU procedure may be done in part based on the ISR "on" status.

Alternately, the GERAN network may be, for example, a non-DTM GERAN network, an ISR status of the user terminal may be an "off" status, and the determining whether to perform the RAU procedure may include determining to perform the RAU procedure, which may be based at least in part on the ISR status. The method may further include performing the RAU procedure prior to performing the CS call setup procedure. The performing the RAU procedure prior to performing the CS call setup procedure may be done in part based on the ISR "off" status.

In another aspect, the method may include determining whether the redirection target is DTM capable, and determining whether to perform a RAU procedure with the third network where the alternative target is located based on the determining whether a redirection target is DTM capable.

The first network may be, for example, an LTE network and the third network may be, for example, a GERAN network. The method may further include the user terminal receiving information for determining whether the redirection target is DTM capable, for example, information associated with a redirection command. The information may be received, for example, in one or more system information blocks in the redirection command. In an alternative example, information associated with the redirection command may be received in a Radio Resource Control (RRC) Connection Release Request.

In another aspect, the disclosure relates to an alternative method for providing communications in a multi-mode environment. The method may include one or both of the stages of receiving, at a network node from a base station, an indication that a user terminal is not available for Packet Switched (PS) services or is no longer available for PS services, and determining, based on an ISR status of the user terminal, whether to perform a PS suspension. The method may further include sending a paging message to the UE if the ISR status is an "off" status, and determining whether to perform a suspension may further include determining to perform a PS suspension if no response is received to the paging message, for example, based on receiving no response within a defined time period. These operations, including at least operations beginning with sending the paging message, may be initiated after the network node determines that downlink data is awaiting delivery to the UE. For example, these operations may be triggered by the network node receiving a Downlink Data Notification (DDN) message, notifying the network node that downlink data is awaiting delivery to the UE.

The determining whether to perform a PS suspension may include, for example, determining not to perform a PS suspension if an ISR status of the user terminal is an "on" status. The determining whether to perform a suspension may include, for example, determining to perform a PS suspension if the ISR status is an "off" status. The network node may be, for example, an LTE Mobility Management Entity (MME). The method may further include, for example, signaling a PS suspension determination to a Serving Gateway (SGW) for the MME.

In another aspect, the disclosure relates to an alternative method for providing communications in a multimode environment. The method may include one or more of the stages of redirecting, at a base station of a first network using a first Radio Access Technology (RAT), a user terminal to a second network using a second RAT different from the first RAT, instructing a node of the first network to perform a Packet Switched (PS) suspension based on redirecting the user terminal to the second network, and sending, to the user terminal, information for the PS suspension.

The user terminal may be, for example, an LTE UE, the base station may be, for example, an LTE eNB, and the node of the first network may be, for example, an MME. The information for the PS suspension may be included in a redirection command sent to the user terminal. The first network may be an LTE network and the second network may be a GERAN network. The GERAN network may be a Non-DTM capable network, and the information for the PS suspension may include information that a PS suspension is to be performed. The PS suspension may be implemented by the MME and an associated Serving Gateway (SGW). The determining may be performed, for example, in response to receipt of a request from the user terminal to perform a voice call. The determining may be performed, for example, in response to receiving an incoming call request for the user terminal.

In related aspects, instructions (e.g., code) may be encoded in a non-transitory computer-readable medium for causing a user terminal to perform operations of the methods described above. Similarly, a communication apparatus may be configured to include one or more of the elements of a transmitter, a receiver and a processor configured to perform operations of the methods described above, for example by providing software or firmware for instructing the processor to perform operations of the methods using the transmitter, receiver, and other circuit elements as described in more detail herein. The communication apparatus may include means for performing operations of the methods, for example using more detailed algorithms as described herein encoded in software or firmware, and other circuit elements as described herein.

Additional aspects, features, and functionality are further described below in conjunction with the appended drawings.

BRIEF DESCRIPTION OF THE DRAWINGS

The present application may be more fully appreciated in connection with the following detailed description taken in conjunction with the accompanying drawings.

FIGS. 13A, 13B and 13C illustrate more detailed and/or optional aspects of the process illustrated in FIG. 12.

FIG. 14 illustrates an example embodiment of a process for improving CS Fallback performance in a multimode communication system.

DETAILED DESCRIPTION

Figure 1:
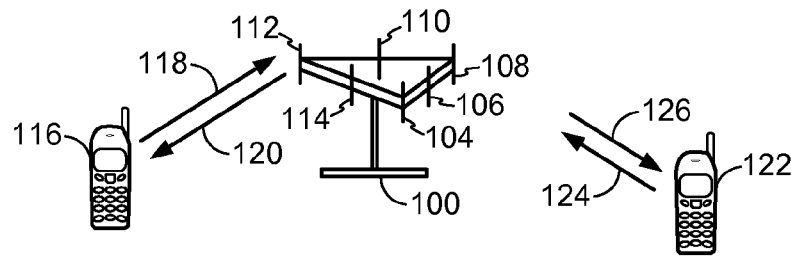
FIG. 1 illustrates details of a wireless communication system.

This disclosure relates generally to coordination and management of operation in wireless communication systems, such as a multimode communication system. In various embodiments, the techniques and apparatus described herein may be used for wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, LTE networks, GSM networks, as well as other communications networks. As described herein, the terms "networks" and "systems" may be used interchangeably.

A CDMA network may implement a radio technology such as Universal Terrestrial Radio Access (UTRA), cdma2000, and the like. UTRA includes Wideband-CDMA (W-CDMA) and Low Chip Rate (LCR). Cdma2000 covers IS-2000, IS-95, and IS-856 standards.

A TDMA network may implement a radio technology such as Global System for Mobile Communications (GSM). 3GPP defines standards for the GSM EDGE (Enhanced Data Rates for GSM Evolution) Radio Access Network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the Public Switched Telephone Network (PSTN) and Internet to and from subscriber handsets, also knows as user terminals or user equipments (UEs). A mobile phone operator's network may comprise one or more GERANs, which may be coupled with UTRANs in the case of a UMTS/GSM network. An operator network may also include one or more LTE networks, and/or one or more other networks. The various different network types may use different Radio Access Technologies (RATs) and Radio Access Networks (RANs).

An OFDMA network may implement a radio technology such as Evolved UTRA (E-UTRA), IEEE 802.11, IEEE 802.16, IEEE 802.20, Flash-OFDM and the like. UTRA, E-UTRA, and GSM are part of Universal Mobile Telecommunication System (UMTS). In particular, Long Term Evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems, and mobile devices. For clarity, certain aspects of the apparatus and techniques are described below for LTE implementations or in an LTE-centric way, and LTE terminology is used in much of the description below; however, the description is not intended to be limited to LTE applications. Accordingly, it may be apparent to one of skill in the art that the systems, apparatus and methods described herein may be applied to other communications systems and applications.

Logical channels in wireless communication systems may be classified into Control Channels and Traffic Channels. Logical Control Channels may include a Broadcast Control Channel (BCCH) which is a downlink (DL) channel for broadcasting system control information, a Paging Control Channel (PCCH) which is a DL channel that transfers paging information, and a Multicast Control Channel (MCCH) which is a point-to-multipoint DL channel used for transmitting Multimedia Broadcast and Multicast Service (MBMS) scheduling and control information for one or several MTCHs. Generally, after establishing a Radio Resource Control (RRC) connection this channel is only used by UEs that receive MBMS. A Dedicated Control Channel (DCCH) is a point-to-point bi-directional channel that transmits dedicated control information and is used by UEs having an RRC connection.

Logical Traffic Channels may include a Dedicated Traffic Channel (DTCH) which is point-to-point bi-directional channel, dedicated to one UE, for the transfer of user information, and a Multicast Traffic Channel (MTCH) for Point-to-multipoint DL channel for transmitting traffic data.

Transport Channels may be classified into downlink (DL) and uplink (UL) Transport Channels. DL Transport Channels may include a Broadcast Channel (BCH), Downlink Shared Data Channel (DL-SDCH), and a Paging Channel (PCH). The PCH may be used for support of UE power saving (for example, when a Discontinuous Reception (DRX) cycle is indicated by the network to the UE), broadcast over an entire cell and mapped to Physical Layer (PHY) resources which can be used for other control/traffic channels. The UL Transport Channels may include a Random Access Channel (RACH), a Request Channel (REQCH), an Uplink Shared Data Channel (UL-SDCH), and a plurality of PHY channels. The PHY channels may include a set of DL channels and UL channels.

LTE systems support time division duplex (TDD) and frequency division duplex (FDD) implementations. In a TDD system, the forward and reverse link transmissions use the same frequency regions so that the reciprocity principle allows the estimation of the forward link channel from the reverse link channel. This enables the access point to extract transmit beamforming gain on the forward link when multiple antennas are available at the access point.

System designs may support various time-frequency reference signals for the downlink and uplink to facilitate beamforming and other functions. A reference signal is a signal generated based on known data and may also be referred to as a pilot, preamble, training signal, sounding signal, and the like. A reference signal may be used by a receiver for various purposes such as channel estimation, coherent demodulation, channel quality measurement, signal strength measurement, and the like. MIMO systems using multiple antennas generally provide for coordination of sending of reference signals between antennas; however, LTE systems do not in general provide for coordination of sending of reference signals from multiple base stations or eNBs.

In some implementations a system may utilize time division duplexing (TDD). For TDD, the downlink and uplink share the same frequency spectrum or channel, and downlink and uplink transmissions are sent on the same frequency spectrum. The downlink channel response may thus be correlated with the uplink channel response. Reciprocity may allow a downlink channel to be estimated based on transmissions sent via the uplink. These uplink transmissions may be reference signals or uplink control channels (which may be used as reference symbols after demodulation). The uplink transmissions may allow for estimation of a space-selective channel via multiple antennas.

In LTE implementations, orthogonal frequency division multiplexing is used for the downlink—that is, from a base station, access point or eNodeB (eNB) to a user terminal or UE. Use of OFDM meets the LTE requirement for spectrum flexibility and enables cost-efficient solutions for very wide carriers with high peak rates, and is a well-established technology. For example, OFDM is used in standards such as IEEE 802.11a/g, 802.16, High Performance Radio LAN-2 (HIPERLAN-2, wherein LAN stands for Local Area Network) standardized by the European Telecommunications Standards Institute (ETSI), Digital Video Broadcasting (DVB) published by the Joint Technical Committee of ETSI, and other standards.

Time frequency physical resource blocks (also denoted here in as resource blocks or "RBs" for brevity) may be defined in OFDM systems as groups of transport carriers (e.g. sub-carriers) or intervals that are assigned to transport data. The RBs are defined over a time and frequency period. Resource blocks are comprised of time-frequency resource elements (also denoted here in as resource elements or "REs" for brevity), which may be defined by indices of time and frequency in a slot. Additional details of LTE RBs and REs are described in the 3GPP specifications, such as, for example, 3GPP TS 36.211.

UMTS LTE supports scalable carrier bandwidths from 20 MHz down to 1.4 MHZ. In LTE, an RB is defined as 12 sub-carriers when the subcarrier bandwidth is 15 kHz, or 24 sub-carriers when the sub-carrier bandwidth is 7.5 kHz. In an exemplary implementation, in the time domain there is a defined radio frame that is 10 ms long and consists of 10 subframes of 1 millisecond (ms) each. Every subframe consists of 2 slots, where each slot is 0.5 ms. The subcarrier spacing in the frequency domain in this case is 15 kHz. Twelve of these subcarriers together (per slot) constitutes an RB, so in this implementation one resource block is 180 kHz. 6 Resource blocks fit in a carrier of 1.4 MHz and 100 resource blocks fit in a carrier of 20 MHz.

In the downlink there are typically a number of physical channels as described above. In particular, the physical downlink control channel (PDCCH) is used for sending control, the physical hybrid ARQ indicator channel (PHICH) for sending ACK/NACK, the physical control format indicator channel (PCFICH) for specifying the number of control symbols, the Physical Downlink Shared Channel (PDSCH) for data transmission, the Physical Multicast Channel (PMCH) for broadcast transmission using a Single Frequency Network (SFN), and the Physical Broadcast Channel (PBCH) for sending important system information within a cell. Supported modulation formats on the PDSCH in LTE are QPSK, 16QAM, and 64QAM. Various modulation and coding schemes are defined for the various channels in the 3GPP specifications.

In the uplink there are typically three physical channels. While the Physical Random Access Channel (PRACH) is only used for initial access and when the UE is not uplink synchronized, the data is sent on the Physical Uplink Shared Channel (PUSCH). If there is no data to be transmitted on the uplink for a UE, control information would be transmitted on the Physical Uplink Control Channel (PUCCH). Supported modulation formats on the uplink data channel may include QPSK, 16QAM, and 64QAM.

3GPP describes configurations for implementing CS Fallback (CSFB) and PS suspension in the specification, such as, for example, 3GPP TS 23.272. The SGs interface may be as described, for example, in 3GPP TS 29.118. SGs is a letter designation (not an acronym) used in LTE to refer to an interface between an MME and a Mobile Switching Center (MSC) server to support CSFB. Additional aspects of CSFB may be as described, for example, in 3GPP TS 23.401.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways.

For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 illustrates details of an implementation of a multiple access wireless communication system, which may be an LTE system, on which aspects as further described subsequently may be implemented. An evolved NodeB (eNB) 100 (also know as a base station, access point or AP) may include multiple antenna groups, one including 104 and 106, another including 108 and 110, and an additional including 112 and 114. In FIG. 1, only two antennas are shown for each antenna group; however, more or fewer antennas may be utilized for each antenna group. A user equipment (UE) 116 (also known as an user terminal, access terminal, or AT) is in communication with antennas 112 and 114, where antennas 112 and 114 transmit information to UE 116 over forward link (also known as a downlink) 120 and receive information from UE 116 over reverse link (also known as an uplink) 118. A second UE 122 may be in communication with antennas 104 and 106, where antennas 104 and 106 transmit information to UE 122 over forward link 126 and receive information from access terminal 122 over reverse link 124.

In a frequency division duplex (FDD) system, communication links 118, 120, 124 and 126 may use different frequencies for communication. For example, forward link 120 may use a different frequency then that used by reverse link 118. In a time division duplex (TDD) system, downlinks and uplinks may be shared.

Each group of antennas and/or the area in which they are designed to communicate is often referred to as a sector of the eNB. Antenna groups each are designed to communicate to UEs in a sector of the areas covered by eNB 100. In communication over forward links 120 and 126, the transmitting antennas of eNB 100 utilize beamforming in order to improve the signal-to-noise ratio of forward links for the different access terminals 116 and 124. Also, an eNB using beamforming to transmit to UEs scattered randomly through its coverage causes less interference to UEs in neighboring cells than an eNB transmitting through a single antenna to all its UEs. An eNB may be a fixed station used for communicating with the UEs and may also be referred to as an access point, a Node B, or some other equivalent terminology. A UE may also be called an access terminal, AT, user equipment, wireless communication device, terminal, or some other equivalent terminology. UEs, such as UE 116 and 122, may be further configured to operate with other nodes of other communication networks (not shown), such as, for example, GERAN and/or UTRAN networks. Moreover, base stations, such as eNB 100, may be configured to facilitate handover of served UEs to base stations of the other networks, such as through use of a redirection command.

Figure 2:
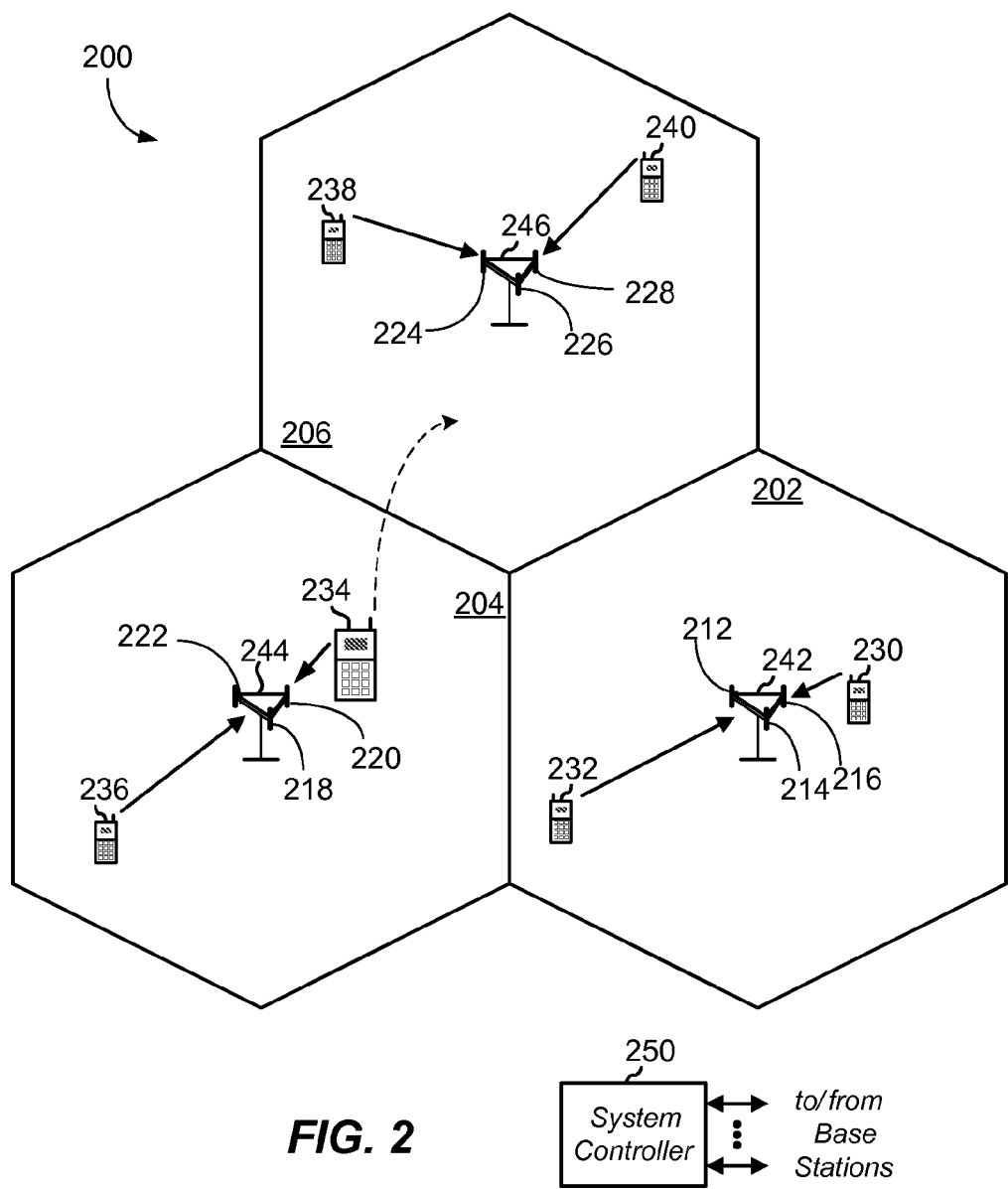
FIG. 2 illustrates details of a wireless communication system having multiple cells.

FIG. 2 illustrates details of an implementation of a multiple access wireless communication system 200, such as an LTE system, on which aspects, such as are described subsequently herein, may be implemented. The multiple access wireless communication system 200 includes multiple cells, including cells 202, 204, and 206. In one aspect, the cells 202, 204, and 206 may include an eNB that includes multiple sectors. The multiple sectors can be formed by groups of antennas with each antenna responsible for communication with UEs in a portion of the cell. For example, in cell 202, antenna groups 212, 214, and 216 may each correspond to a different sector. In cell 204, antenna groups 218, 220, and 222 each correspond to a different sector. In cell 206, antenna groups 224, 226, and 228 each correspond to a different sector. The cells 202, 204, and 206 can include several wireless communication devices, e.g., user equipment or UEs, which can be in communication with one or more sectors of each cell 202, 204, or 206. For example, UEs 230 and 232 can be in communication with eNB 242, UEs 234 and 236 can be in communication with eNB 244, and UEs 238 and 240 can be in communication with eNB 246. The cells and associated base stations may be coupled to a system controller 250, which may be part of a core or backhaul network or may provide connectivity to a core or backhaul network, including, for example, an MME and SGW, such as may be used to perform functions as further described herein related to multimode coordination and operation, as well as other aspects described herein.

Figure 3:
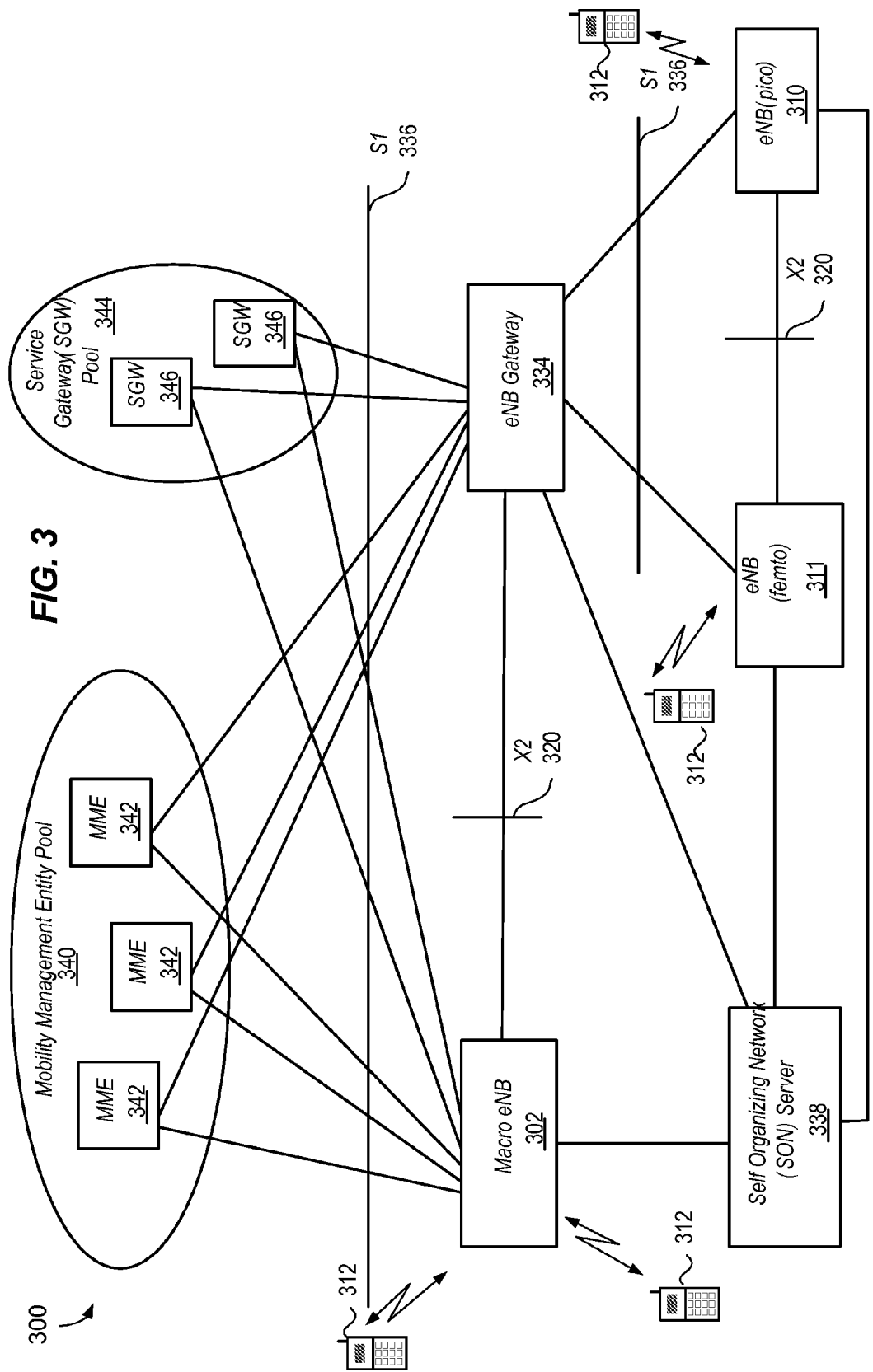
FIG. 3 illustrates details of an example configuration of network nodes in an LTE communication system.

FIG. 3 illustrates details of an example embodiment 300 of connections between various network nodes. Network 300 may include a macro-eNB 302 and/or multiple additional eNBs, which may be, for example, picocell eNBs 310, femtocell eNB 311, macrocell eNBs, or other base station nodes. Network 300 may include an eNB gateway 334 to picocell eNB 310 or femtocell eNB 311 for scalability reasons. The macro-eNB 302 and the gateway 334 may each communicate with a pool 340 of one or more Mobility Management Entities (MME) 342 and/or a pool 344 of one or more Serving Gateways (SGW) 346. The eNB gateway 334 may appear as a C-plane and a U-plane relay for dedicated S1 connections 336. An S1 connection 336 may be a logical interface specified as the boundary between an evolved packet core (EPC) and an Evolved Universal Terrestrial Access Network (EU-TRAN). As such, the S1 connection provides an interface to Core Network (CN) components, such as the MME and SGW, which may be further coupled to other components and/or networks (not shown). The eNB gateway 334 may act as a macro-eNB 302 from an EPC point of view. The C-plane interface may be S1-MME and the U-plane interface may be S1-U.

The eNB gateway 334 may act towards an eNB 310 as a single EPC node. The eNB gateway 334 may ensure S1-flex connectivity for an eNB 310. The eNB gateway 334 may provide a 1:n relay functionality such that a single eNB 310 may communicate with n MMEs 342. The eNB gateway 334 may register eNBs 310, 311 towards the pool 340 of MMEs 342 when put into operation via the S1 setup procedure. The eNB gateway 334 may support setup of S1 interfaces 336 with the eNBs 310.

Network 300 may also include a self organizing network (SON) server 338. The SON server 338 may provide automated optimization of a 3GPP LTE network. The SON server 338 may be a driver for improving operation administration and maintenance (OAM) functions in the wireless communication system 300. An X2 link 320 may exist between the macro-eNB 302 and the eNB gateway 334. X2 links 320 may also exist between each of the eNBs 310, 311 connected to a common eNB gateway 334. The X2 links 320 may be set up based on input from the SON server 338. If an X2 link 320 cannot be established, the S1 link 336 may be used to convey information, such as between different cells or networks. Backhaul signaling may be used in network 300 to manage various functionality as described further herein, such as between eNBs and other network nodes, and/or other networks. For example, these connections may be used as further described successively herein to facilitate multimode operation, such as with other network types, such as GERAN or UTRAN networks. UEs 312 may be coupled to the various eNBs, and may also move between cells associated with the eNBs, as well as communicate with cells of other network types (not shown).

For example, an operator's system may include multiple networks, which may be of multiple types (for example, in addition to the LTE network configurations shown in FIGS. 2 and 3) using different RATs. For example, one type may be an LTE system, which is data-centric. Another type may be a UTRAN system, such as a W-CDMA system. Yet another type may be a GERAN system, which may in some cases be Dual Transfer Mode (DTM) capable (also denoted herein as a DTM GERAN). Some GERAN networks may be non-DTM capable. Multimode user terminals, such as UEs, may be configured to operate in multiple networks, such as these, as well as other (e.g., WiFi or WiMax networks, etc.).

DTM, as specified in, for example, 3GPP TS 43.055, is a protocol based on the GSM standard that allows simultaneous transfer of CS (voice) and PS (data) over the same radio channel. A mobile phone (e.g., a user terminal or UE) that is DTM capable can be engaged in both CS and PS call and simultaneous voice and packet data connection in DTM GERAN networks.

In some LTE implementations, devices may support functionality known as Idle-Mode Signaling Reduction (ISR). ISR is a mechanism that allows a user terminal, such as a UE, to remain simultaneously registered in a UTRAN or GERAN Routing Area (RA) and an E-UTRA Tracking Area (TA) list. This can allow a UE to make cell reselections between LTE and UTRAN/GERAN networks without a need to send a Tracking Area Update (TAU) or Routing Area Update (RAU) request, as long as the UE remains within the registered RA and TA list. As such, ISR can be used to reduce the mobility signaling and may improve the battery life of UEs. This may be particularly important in initial deployments of LTE systems where coverage may be limited and inter-RAT changes may be frequent. Moreover, this may also be important until the availability of PS-based voice implementations, such as Voice Over IP (VoIP) are deployed, as operators may frequently switch operation between LTE and GERAN or UTRAN networks to support CS voice calling. To support ISR, a Home Subscriber Server (HSS) may need to maintain two PS registrations, one from the Mobility Management Entity (MME) and another from the Serving GPRS Support Node (SGSN), wherein "GPRS" stands for General Packet Radio Service. GPRS is a packet-oriented best-efforts mobile data service with a protocol maintained by 3GPP. In addition, ISR requires more complex paging procedures. In an exemplary embodiment, a status of ISR may be either On or Off, indicating whether ISR is in use or not.

The MME may operate as control node for the LTE access-network. The MME is responsible for idle mode UE tracking and paging procedures, including retransmissions. The MME is also involved in the bearer activation/deactivation process and is responsible for choosing the Serving Gateway (SGW) for a UE at the initial attach, and at the time of intra-LTE handover involving Core Network (CN) node relocation.

The MME may also be responsible for authenticating the user by interacting with the HSS. The Non-Access Stratum (NAS) signaling terminates at the MME, which is also responsible for generation and allocation of temporary identities to UEs. For example, the MME checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME.

Another function of the MME may be to provide the control plane function for mobility between LTE and 2G/3G access networks, such as UTRAN and GERAN networks, with the S3 interface terminating at the MME from the SGSN. The MME also terminates the S6a interface towards the home HSS for roaming UEs.

The Serving Gateway (SGW) routes and forwards user data packets, while also acting as the mobility anchor for the user plane during inter-eNodeB handovers and as the anchor for mobility between LTE and other 3GPP technologies, such as, for example, terminating S4 interface and relaying the traffic between 2G/3G systems and the Packet Gateway (PGW). For idle state UEs, the SGW terminates the DL data path and triggers paging when DL data arrives for the UE. The SGW manages and stores UE contexts, e.g. parameters of the IP bearer service, network internal routing information, and other information. The SGW may also perform replication of the user traffic in case of lawful interception.

The PDN Gateway provides connectivity from the UE to external packet data networks by being the point of exit and entry of traffic for the UE. A UE may have simultaneous connectivity with more than one PGW for accessing multiple PDNs. The PGW may perform policy enforcement, packet filtering for each user, charging support, lawful interception and packet screening.

Figure 4:
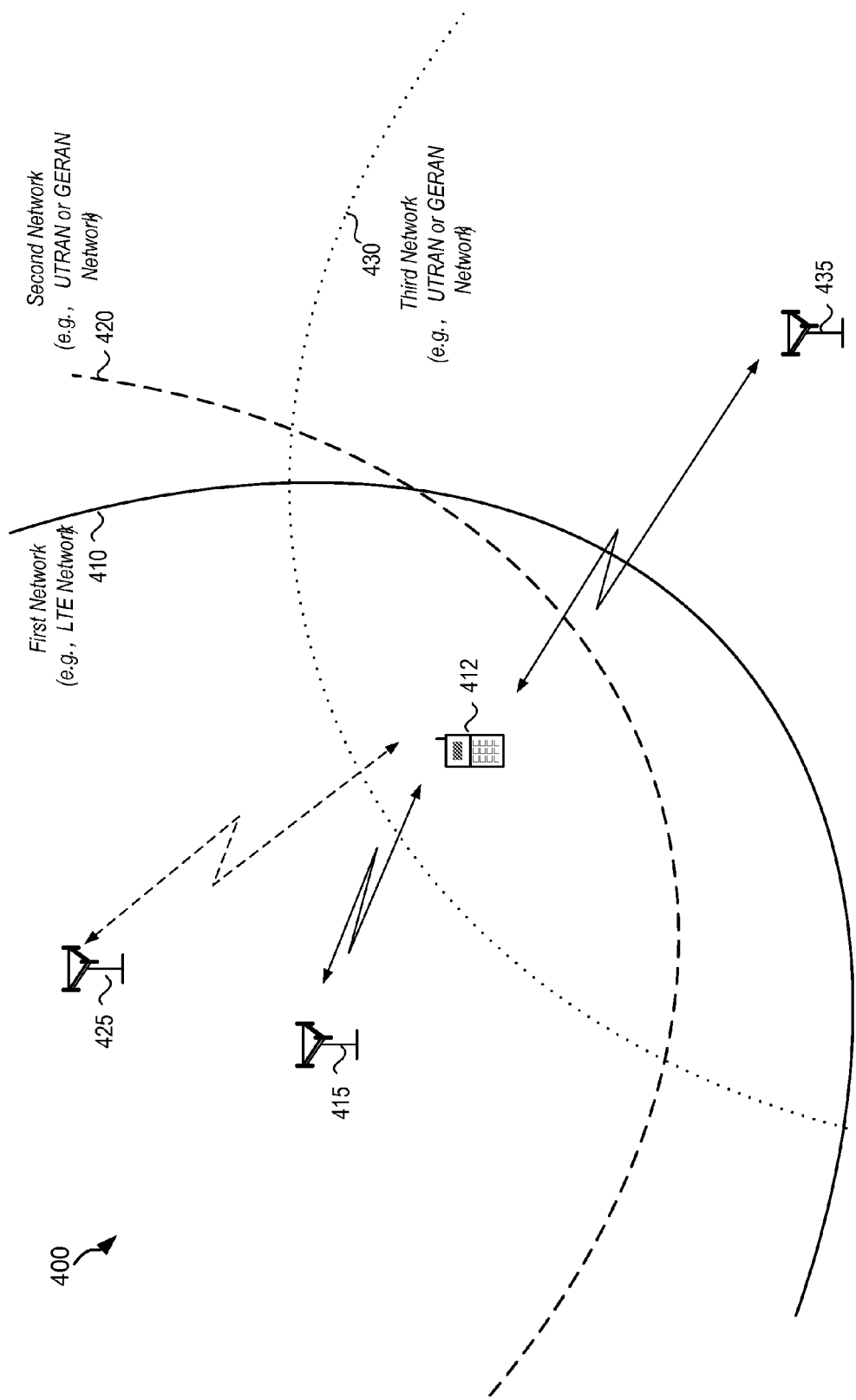
FIG. 4 illustrates an example communication system with three radio networks in a multimode configuration.

FIG. 4 illustrates details of an operator network 400 including three different network types based on three different RANs and RATs, e.g., LTE, GERAN, and UTRAN. Network 400 may include a first RAN 410, which may be an LTE network, and may include multiple cells and associated base stations, such as eNB 415. A UE 412 may be communication with eNB 415, such as, for example, to send and/or receive data in a PS connection. UE 412 may also be within the coverage area of a second RAN 420, which may be, for example, a UTRAN or GERAN network, as well as a third RAN 430, which may be, for example, a UTRAN or GERAN network. In various implementations, networks 420 and 430 may be GERAN networks that may, in some cases, support DTM; whereas in other cases they may be Non-DTM networks, i.e., networks that do no support DTM. Networks 420 and 430 may include one or more cells that may be served by one or more base stations, which may be, for example, base stations 425 and 435. The lines associated with networks 410, 420, and 430 are provided to illustrate example network coverage boundaries, which may vary in different implementations.

Network 410 may wish to redirect UE 412 to another network, such as network 420. This may happen, for example, in response to a voice call request from UE 412, receipt of an incoming call to UE 412, mobility of UE 412, or other reasons, such as network loading, coverage or signal limitations, or other factors. Consequently, network 410, through, for example, eNB 415, may redirect UE 412 to network 420. This may be done, for example, in response to a request from eNB 412 to make a voice call, when network 410 does not support packet-based voice services such as VoIP. In this case, UE 412 may inform the network that it needs to perform a CS voice call setup, with the eNB 415 then redirecting the UE to network 420, such as by sending a redirection command. In conjunction with the redirection, eNB 415 may signal an associated MME (not shown) regarding the redirection and/or associated PS suspension, depending on the selected redirection target.

If, for example, network 420 is a UTRAN network, the UE can perform a CS call setup and continue any PS sessions in parallel, since UTRAN supports simultaneous CS and PS connections (e.g., simultaneous voice and data). Similarly, if network 420 is a GERAN network, the UE can perform CS call setup and continue any PS sessions if the GERAN network supports DTM.

However, if network 420 is a Non-DTM GERAN network and eNB 415 chooses to move the UE 412 to that network (assuming the UE supports DTM), or if the UE 412 does not support DTM, the eNB 415 may indicate to an associated MME, such as shown in FIG. 3, that the UE 412 may be unavailable for PS services (e.g., PS may be suspended). In response, the MME may suspend PS service for the UE at the SGW as shown, for example, in FIG. 3.

While the eNB 415 may use redirection procedures to instruct the UE to move to a GERAN cell that does not support DTM (i.e., a Non-DTM GERAN), in some cases the UE 412 may be unable to find the intended target cell in redirection network 420. This may occur, for example, if the intended redirection target cell is no longer qualified and other cells are perceived to be qualified by the UE 412, or for other reasons. However, the UE may be able to find another target cell, such as in the third network 430, that is a UTRAN cell or GERAN cell. If the cell is a GERAN cell it may be unable to support Dual Transfer Mode (i.e., may be a Non-DTM GERAN). For example, the UE may be able to establish communications with a base station 435 in the third network.

In another case, the UE 412 may move to the intended cell in network 420, which may be a GERAN cell, but the need to perform the CS call setup no longer exists, for example, because the user has decided to end the call prematurely.

In these situations, the UE may be left in a state where it is unaware that the LTE network has suspended PS services, but the UE has camped on a cell in a network (e.g., the third network 430) where it believes that PS services are available. In this case, "always on" applications such as IMS may assume that services are available, when they are not due to the PS suspension. This may result in a loss or outage of services to the user. Moreover, the UE 412 may not even be aware of the outage and therefore may not take corrective measures.

Figure 5:
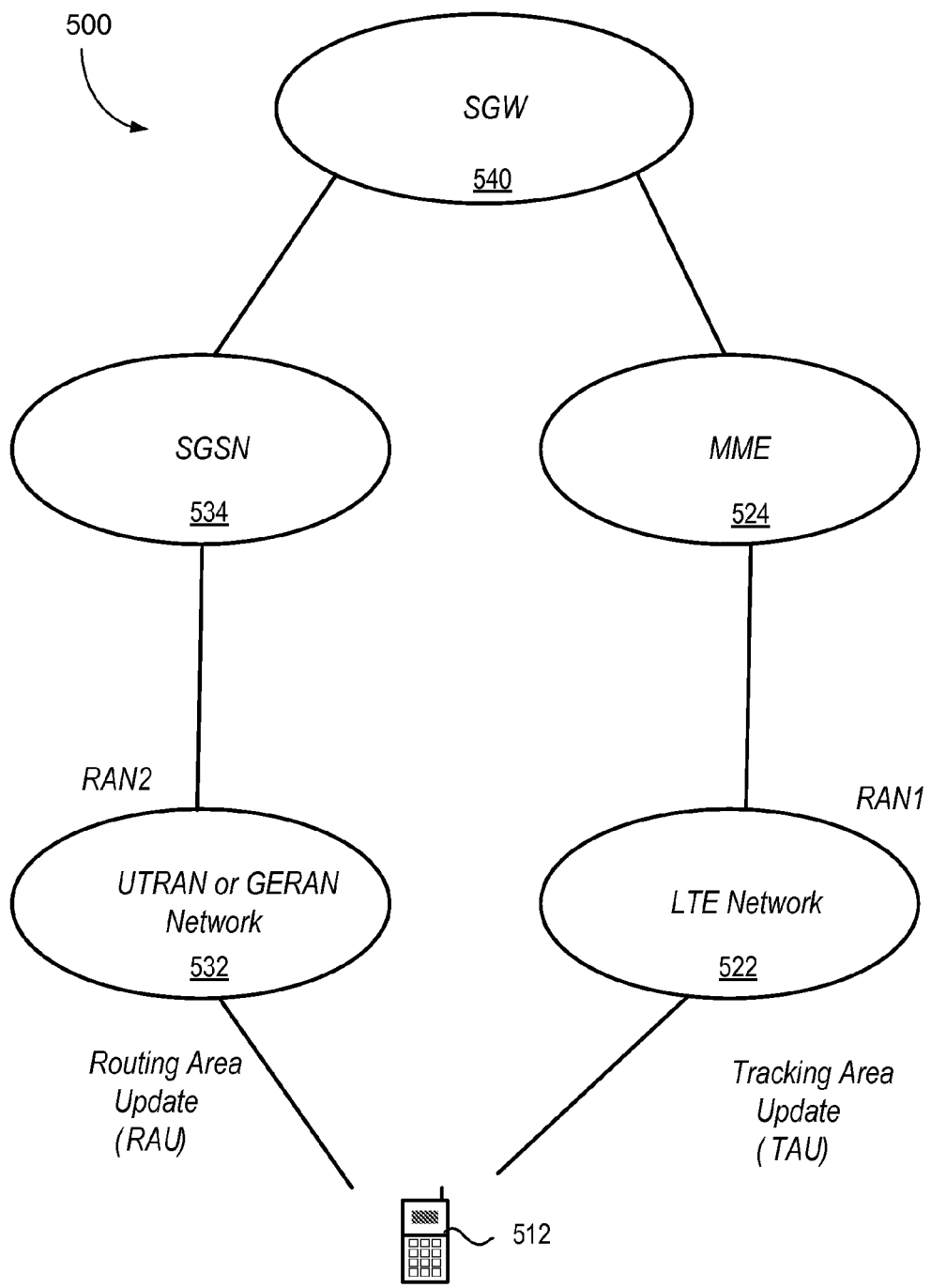
FIG. 5 illustrates an example configuration of network nodes in a multimode communication system.

FIG. 5 illustrates an example configuration 500 of network nodes for multimode operation between an LTE network and other networks, such as UTRAN or GERAN networks, which may be used to provide ISR functionality. A multimode UE 512 may be connected to an LTE network 522, such as to an eNB such as eNB 415 of FIG. 4, and may move between the LTE Network and a UTRAN or GERAN network 532, which may be served by a base station, such as a Node B. The LTE network may include an MME 524, such as shown previously in FIG. 4, as well as an SGW 540, such as shown in FIG. 4. The SGW may be connected to a PGW (not shown), and the MME may be connected to a legacy Mobile Switching Center (MSC) via an SGs interface. The SGs interface provides connectivity between an LTE network and a legacy network, such as GERAN or UTRAN.

When the UE 512 moves between networks, it may perform a Tracking Area Update (TAU) procedure when moving to the LTE network, or a Routing Area Update (RAU) procedure when moving to a UTRAN or GERAN network. The RAU or TAU may be initiated when the UE 512 detects a new tracking or routing area. In a RAU, the UE transmits a RAU signal to a 3G SGSN 534, initiating a sequence of messages between SGSN 534 and other network entities to establish that the UE has moved to a routing area served by the SGSN 534 within a 2G/3G context. Similarly, in a TAU the UE initiates a sequence of messages between an LTE SGSN 534 and other network entities to establish a new tracking area within an LTE context. Further details concerning performing a RAU or TAU are understood in the art, and need not be reproduced here. Further details may be found, for example, in 3GPP TS 23.401, with examples of call flows illustrated in Annex B of TS 23.401.

In accordance with one aspect, an MME, such as MME 524, may suspend a PS session (i.e., perform a PS suspension) associated with a UE, such as UE 412, if a serving eNB, such as eNB 415, has indicated to the MME that the UE is being redirected to a Non-DTM GERAN. As described previously, this may be in response to a call setup from the UE, from receipt of an incoming call request to the MME, or for other reasons, such as mobility handoffs. Traditionally, the MME does not take into account the UE's Idle Mode Signaling Reduction (ISR) status, which may be, for example, an "on" status or an "off" status, in making this decision. However, according to the present disclosure, the MME may perform operations conditioned on whether or not the UE's ISR status is "on" or "off"; in other words, the MME may take the ISR status into account.

For example, a first case of interest is where a UE, such as UE 412 of FIG. 4, is being redirected to a redirection target, such as the second network 420. If the second network is a UTRAN network, and the redirection to the second network fails, the UE 412 may then attempt to camp on a third network, such as network 430. If the third network is a Non-DTM GERAN, a problem may occur if the ISR status is "off." In particular, if the redirection network is a UTRAN network, PS processes would be supported in addition to CS processes. However, if the UE camps on a Non-DTM GERAN that does not support simultaneous CS and PS processes, a CS call setup may fail because, for example, the Non-DTM GERAN may not have a context associated with the UE. Consequently, to mitigate this problem, the UE 412 may perform a RAU procedure before performing a CS call setup procedure.

Another related case of interest is where a UE, such as UE 412, is redirected to a second network, such as network 420, which is a GERAN network (rather than a UTRAN network). If the redirection to the second network fails, the UE 412 may then attempt to camp on a third network, such as network 430. As with the previously case, if the third network is a Non-DTM GERAN, a problem may occur if the ISR status is "off." Similarly to the previous case, the CS call setup may fail due to lack of context in the Non-DTM GERAN. Consequently, to mitigate this problem, the UE 412 may perform a RAU procedure before performing a CS call setup procedure.

In yet another case of interest, if the redirection target (e.g., a second network, such as network 420 of FIG. 4) is a GERAN network and the redirection fails, the UE may camp on a third network, such as network 430. If the third network is a UTRAN network or a DTM GERAN network, and the ISR status is "on," the UE may advantageously perform a CS call setup procedure in parallel with performing a RAU procedure. Performing the procedure in parallel may facilitate delay mitigation in CS fallback call setup.

In summary, when a UE, such as UE 412, is camped on a non-DTM GERAN network as a result of a redirection failure (e.g., camped on a third network when redirection to a second network has failed), and must perform PS suspension, the UE may advantageously perform a RAU procedure first and then perform a CS call setup procedure. While this approach ensures proper suspension of PS bearers, it may also introduce additional delay to the CS fallback call setup procedure. However, not performing proper PS bearer suspension may result in the UE losing PS pages. It is also possible that the UE may lose some or the entire PS session context in the core network (CN), for example as a result of lack of page response from the UE.

While in a non-DTM GERAN where a RAU procedure is needed for proper PS session suspension, a UE, such as UE 412, may decide whether the RAU procedure must be performed (at the expense of CS call setup delay), which may be based on criteria such as operator preferences, user preferences, policies, and/or other criteria. The decision may be based on, for example, operator configuration, user configuration (e.g., is the device voice centric or data centric), presence of one or more "high priority" PS sessions, such as IMS, CS call setup delay already incurred, and/or other factors.

In another aspect of the present technology, an MME, such as shown in FIGS. 3 and 5, may consider an ISR status associated with a user terminal, such as UEs 412 or 512 of FIGS. 4 and 5, in determining whether to perform a PS suspension.

For example, in one implementation, if a UE, such as UE 412, is configured to support DTM and if a serving eNB, such as eNB 415, redirects the UE to a GERAN target cell that does not support DTM (i.e., a Non-DTM GERAN), the eNB may inform an associated MME, such as the MMEs shown in FIGS. 3 and 5, that the UE is unavailable for PS services. The MME may then respond as follows. When the MME receives information regarding the UE's non-availability for PS services, the MME may: a) perform PS suspension with an associated SGW if the ISR status associated with the UE is Off; or b) not perform PS suspension if the ISR status is On.

The UE, such as UE 412, may take the following actions, conditioned on the factors identified below as determined or detected by the UE:

1) If the redirection target is a UTRAN network and the UE camps on a UTRAN or DTM GERAN: a) perform CS call setup procedure if the ISR status is "on"; b) perform CS call setup procedure and perform RAU procedure in parallel if the ISR status is Off.

2) If the redirection target is a UTRAN network and the UE camps on a Non-DTM GERAN: a) perform CS call setup procedure if the ISR status is "on"; b) perform RAU procedure first and then perform CS call setup if the ISR status is "off."

3) If the redirection target is a GERAN network and the UE camps on a UTRAN or DTM GERAN: a) perform CS call setup procedure if the ISR status is "on"; b) perform CS call setup procedure and RAU procedure in parallel if the ISR status is "off."

4) If the redirection target is a GERAN network and the UE camps on a Non-DTM GERAN: a) perform CS call setup procedure if the ISR status is "on"; b) perform a RAU procedure first and then perform CS call setup if the ISR status is "off."

In another aspect of the present technology, when an eNB, such as eNB 415, determines that it may instruct the MME to perform a PS suspension, the eNB may include this information in a redirection command sent to a UE, such as UE 412. For example, if the eNB decides that the UE must be moved to a non-DTM GERAN, it may inform the MME to perform PS suspension, and may also inform the UE that the PS suspension may be performed. The UE may then use this information in accessing a third network if the redirection fails.

In some cases, the eNB may explicitly information the UE of the PS suspension. In other cases, if, for example, GERAN SI tunneling, such as described for example in 3GPP TS 23.272, is performed (e.g., where system information of one or more GERAN cells is provided to the UE in a redirection command) the UE may then determine whether the intended target is DTM capable or not. This may be done by, for example, looking at one or more system information blocks (SIBs) contained in the redirection command.

If system information is included in a Radio Resource Control (RRC) Connection Release Request, the UE may determine whether the MME has suspended PS services based on, for example, knowledge of the UE's capabilities and the redirection target or target's capabilities.

Examples of processing as may be performed in a UE, such as UE 412, in various scenarios are described below. For example, if the serving eNB informs the UE that PS suspension was initiated, and the UE camps on a UTRAN or DTM GERAN, the UE may perform a CS call setup procedure and a RAU procedure in parallel (irrespective of the ISR status).

If the serving eNB informs the UE that PS suspension was initiated, and the UE camps on a Non-DTM GERAN the UE may perform a CS call setup procedure (irrespective of the ISR status).

If the serving eNB informs the UE that PS suspension was not initiated, and the UE camps on a UTRAN or DTM GERAN: a) the UE may perform a CS call setup procedure if the ISR status is "on"; b) the UE may perform a CS call setup procedure and a RAU procedure in parallel if the ISR status is "off."

If the serving eNB informs the UE that PS suspension was not initiated, and the UE camps on a Non-DTM GERAN: a) the UE may perform a CS call setup procedure if the ISR status is "on"; b) the UE may perform a CS call setup procedure first and a RAU procedure subsequently if the ISR status is "off."

Cell Change Order/Network Assisted Cell Change

A Cell Change Order (CCO) procedure with Network Assisted Cell Change (NACC) may provide an alternative to the RRC Connection Release with Redirection procedure used for CSFB and described herein. In a CCO procedure, the UE is moved to the target RAT while remaining in RRC Connected Mode. A CCO procedure may be triggered by the eNodeB in response to receiving a CFSB indicator in an S1 interface context setup message. Unlike RRC Connection Release with redirection, a CCO procedure with NACC can only be initiated after security has been established over the S1 radio interface.

The CCO procedure with NACC may depend on the eNodeB determining a target cell using a CS-capable RAT from which the UE will obtain service. To assist in this determination, the UE may identify a strongest cell and reporting the strongest cell identity to the eNodeB. In the alternative, the COO target cell may be chosen based on Operations and Maintenance (O&M) planning. Having the eNB determine the COO target cell may sometime be disadvantageous. For example, this determination may be difficult to achieve without operator planning or time-consuming measurements by the UE.

To support COO, the eNodeB may acquire system information for the chosen COO target cell. The eNodeB may transmit a CCO command to the UE to access the indicated cell with the provided system information. The UE may use the provided system information to access the indicated CCO target cell.

As used herein, unless specifically indicated otherwise, "redirection" includes both RRC Connection Release with redirection and cell changes using a CCO procedure with NACC. Either type of redirection may implicate CSFB procedures.

EXAMPLE METHODOLOGIES AND APPARATUS

By way of additional example, further methodologies that may be implemented in accordance with the disclosed subject matter may be better appreciated with reference to various flow charts. For purposes of simplicity of explanation, methodologies are shown and described as a series of acts/operations. However, the claimed subject matter is not limited by the number or order of operations, as some operations may occur in different orders and/or at substantially the same time with other operations from what is depicted and described herein. Moreover, not all illustrated operations may be required to implement methodologies described herein. It is to be appreciated that functionality associated with operations may be implemented by software, hardware, a combination thereof or any other suitable means (e.g., device, system, process, or component). Additionally, it should be further appreciated that methodologies disclosed throughout this specification are capable of being stored as encoded instructions and/or data on an article of manufacture to facilitate transporting and transferring such methodologies to various devices. Those skilled in the art may understand and appreciate that a method could alternatively be represented as a series of interrelated states or events, such as in a state diagram.

Facilitating CSFB Using a RAU

Figure 6:
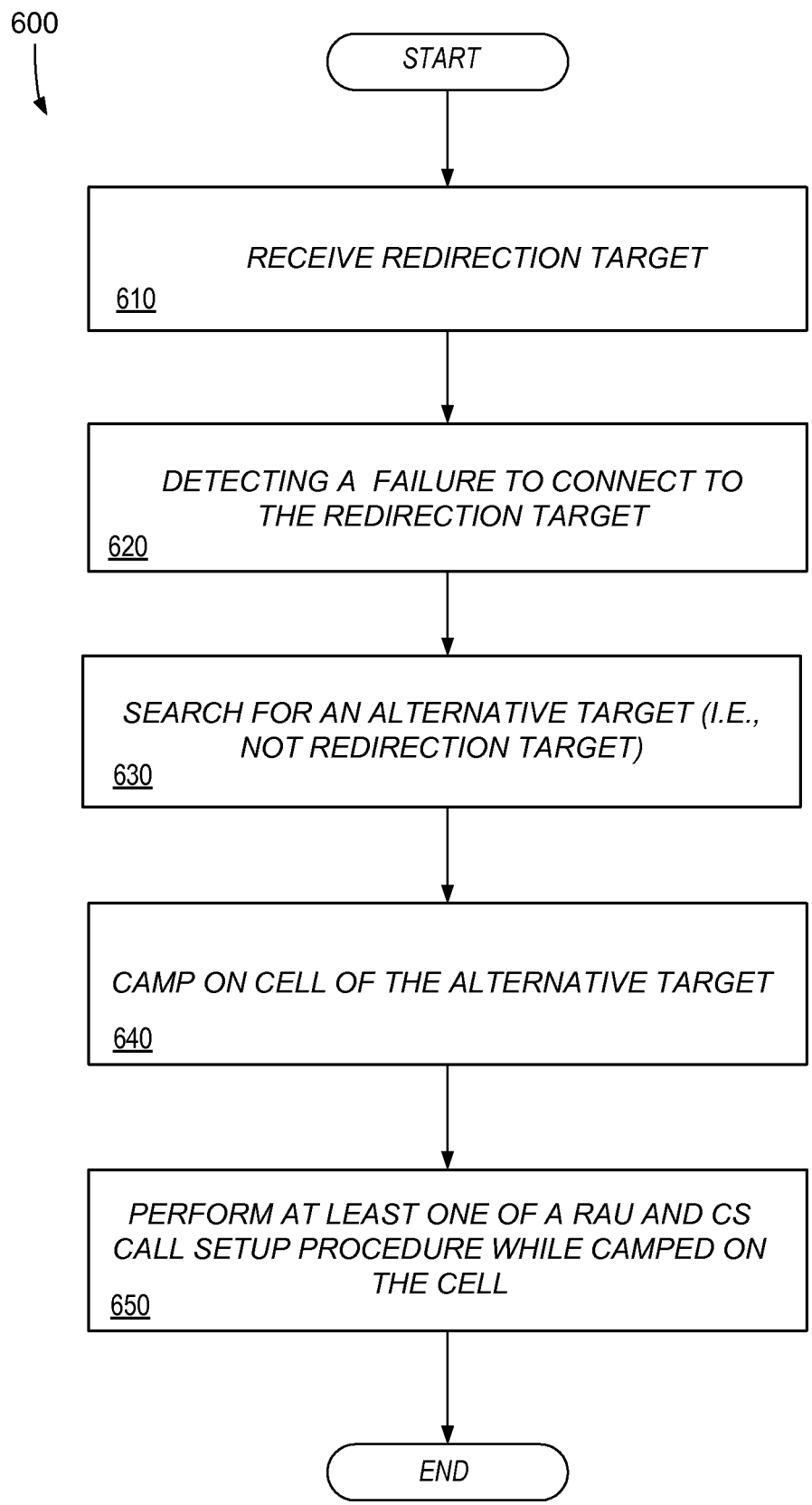
FIG. 6 illustrates an example embodiment of a process for improving CS fallback performance in a multimode communication system.

FIG. 6 illustrates an embodiment of an example process 600 that may be implemented by a user terminal, for example a UE, for facilitating CS fallback performance enhancement. At 610, a redirection target may be received at a user terminal. The user terminal may then attempt to access the redirection target; however, this process may fail. At 620, a determination or detection of a failure to acquire the redirection target may then be made. In response to the failure, at 630, a search for another target (different from the redirection target) may be performed by the user terminal. For example, the user terminal may search for another available UTRAN or GERAN target to access. At 640, the user terminal may then access or camp on a cell of the alternative target. The user terminal may then perform at least one of a RAU procedure and a CS call setup procedure while camped on the cell. In some cases the RAU and CS setup procedures may be done in parallel. In the alternative, in some cases the RAU procedure may be done before or in advance of the CS call setup procedure. As used herein, a "target" for a user terminal refers to a base station, for example an eNB, of a wireless communications network.

The redirection target may be provided by a network entity based on, for example, a call initiated by a user of the user terminal, or an incoming call request to the user terminal. The redirection target may be provided based on, for example, movement of the user terminal. The redirection target may be provided based on, for example, signal characteristics in a network associated with the redirection target, and/or loading associated with the redirection target. The redirection target may be provided based on, for example, a lack of ability of a network associated with the user equipment, such as an LTE network, to provide CS connections.

Figure 7:
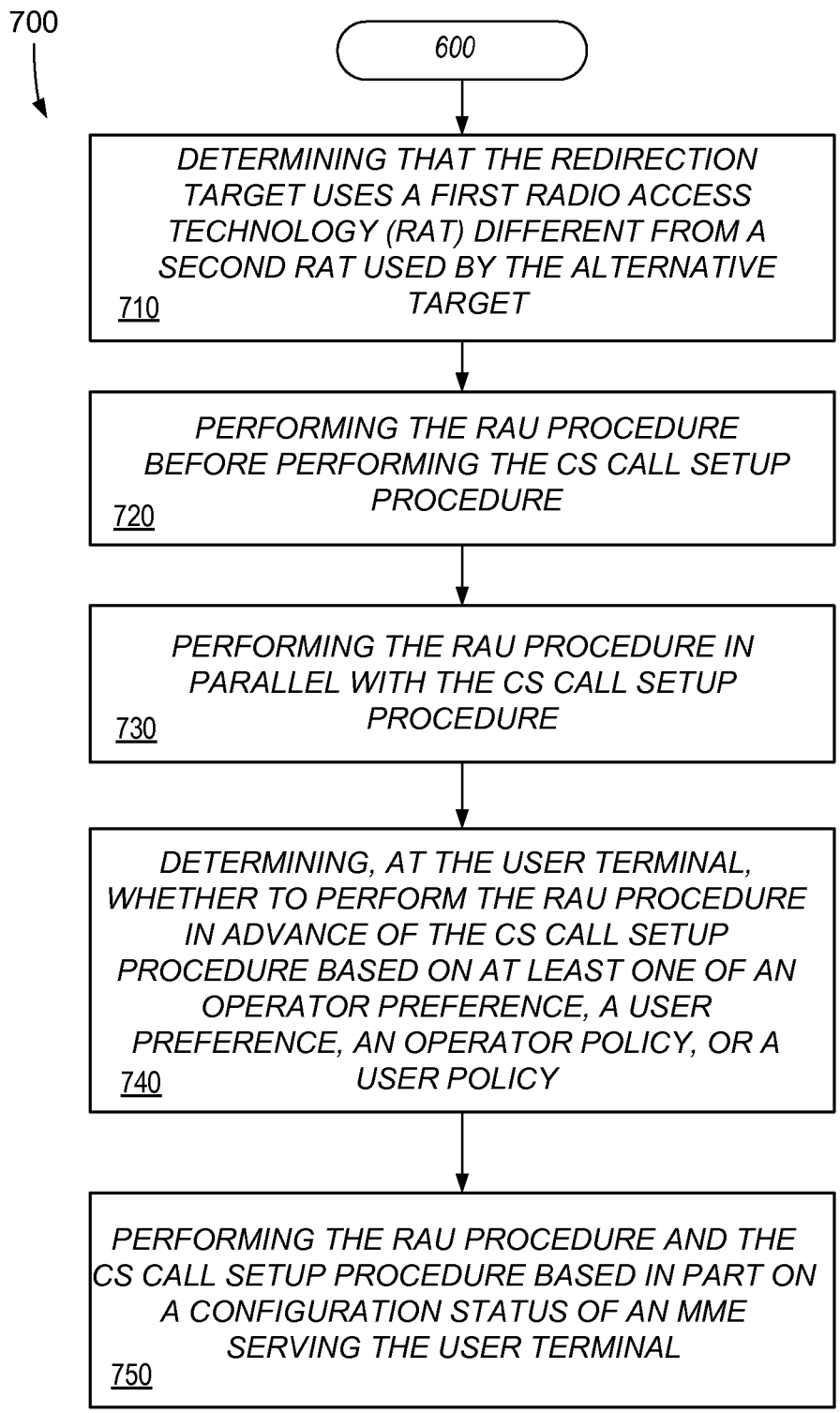
FIG. 7 illustrates more detailed and/or optional aspects of the process illustrated in FIG. 6.

Additional operations 700 are illustrated in FIG. 7, for performance by the user terminal. One or more of operations 700 may optionally be performed as part of method 600. The elements 700 may be performed in any operative order, or may be encompassed by a development algorithm without requiring a particular chronological order of performance. Operations are independently performed and not mutually exclusive. Therefore any one of such operations may be performed regardless of whether another downstream or upstream operation is performed. For example, if the method 600 includes at least one of the operations 700, then the method 600 may terminate after the at least one operation, without necessarily having to include any subsequent downstream operation(s) that may be illustrated.

In an aspect, the method 600 may further include, at 710, determining that the redirection target uses a first RAT that is different from a second RAT used by the alternative target. For example, the redirection target may be a UMTS Terrestrial Radio Network (UTRAN) target. The alternative target may be, for example, a GSM EDGE Radio Access Network (GERAN) target not configured to support Dual Transfer Mode (Non-DTM GERAN). In such case, the method 600 may further include, at 720, performing the RAU procedure before performing the CS procedure. In an aspect, the RAU procedure may be performed before the CS procedure when an Idle Mode Signaling Reduction (ISR) status of the user terminal is an "off" status.

For alternative example, the redirection target may be a GERAN target. The GERAN target may be configured to support Dual Transfer Mode (DTM). An ISR status of the user terminal may be an "on" status, and the method may further include, at 730, performing the RAU procedure in parallel with the CS call setup procedure based in part on the "on" status.

Alternately, the redirection target may be, for example, a Non-DTM GERAN target. An ISR status of the user terminal may be an "off" status, and the method may further including performing the RAU procedure before performing the CS call setup procedure based in part on the "off" status.

The GERAN target may be a Non-DTM GERAN target, and the method 600 may further include, at 740 determining at the user terminal whether to perform the RAU procedure in advance of the CS call setup. The determining whether to perform the RAU procedure in advance of the CS call setup may be based on, for example, at least one of an operator preference, a user preference, an operator policy, or a user policy. The at least one of an operator preference, a user preference, an operator policy, or a user policy may include, for example, an operator configuration, a user configuration, presence of one or more high priority sessions, as well as whether a CS call setup delay has already occurred, or other preferences or parameters. The user configuration may consist of one of a voice centric user terminal configuration and a data centric user terminal. The high priority session may be, for example, an IP Mobility Subsystem (IMS) session.

In another aspect, the method 600 may include, at 750, the user terminal performing the RAU procedure and the CS setup procedure based in part on a configuration status of a Mobility Management Entity (MME) serving the user terminal. The configuration status of the MME may include a determination, at the MME, to suspend Packet Switched (PS) services. The suspension may be in response to suspension information received from an associated base station, such as an eNB, which may redirect the user terminal to a Non-DTM GERAN. The user terminal may be an LTE User Equipment (UE) and the redirection target may be provided to the user terminal from the eNB.

Process 600 may be embodied in a tangible medium. For example, process 600 may be embodied as a computer program product including a non-transitory computer-readable medium having codes for causing a computer to perform one or more of the stages as shown in FIG. 600, including receiving, at a user terminal, a redirection target, detecting a failure to connect to the redirection target, searching, responsive to the failure, for an alternative target, camping or initiating a process for camping on a cell of the alternative target, and performing or initiating performing of at least one of a Routing Area Update (RAU) procedure and a Circuit Switched (CS) call setup procedure while camped on the cell. The computer-readable medium may further be encoded with code for causing a user terminal to perform any of the additional operations 700 described above.

Process 600 may be embodied in a communication system or apparatus. For example, the communication apparatus may include one or more of the elements of a transmitter module configured to communicate with a plurality of base stations using different Radio Access Technologies (RATs), a receiver module configured to receive, at a user terminal, a redirection target from a network entity, and a processor module configured to, detect a failure to connect to the redirection target, search, in conjunction with the receiver module, for an alternative target in response to the failure, initiate a process to camp on a cell of the alternative target, and initiate at least on of a Routing Area Update (RAU) procedure and a Circuit Switched (CS) call setup procedure while camped on the cell, which may be done in conjunction with the transmitter module. The processor may further be configured to perform any of the additional operations 700 described above. The transmitter module and/or the receiver module may be configured to operate in multiple modes, including a first mode associated with a first network type operating with a first radio access technology (RAT) and a second mode associated with a second network type that may be using a second RAT. The communication apparatus may be an LTE user equipment (UE) or a component of an LTE UE or similar or equivalent device or system.

Alternately, or in addition, the communication system or apparatus may include one or more of a means for receiving a redirection target. The means for receiving a redirection target may include, for example, a transceiver coupled to a processor of a user terminal, wherein the processor performs an algorithm including decoding a received signal, and recognizing that the signal indicates a redirection target.

The apparatus may further include a means for detecting a failure to connect to the redirection target. The means for detecting a failure to connect may include, for example, a transceiver coupled to a processor of a user terminal, wherein the processor performs an algorithm including transmitting a signal to the redirection target, detecting a signal from the redirection target, and determining that a failure has occurred based on failing to detect an anticipated signal or detecting a signal indicating that an acceptable connection cannot be made.

The apparatus may further include a means for searching, responsive to the failure, for an alternative target. This means may include, for example, a transceiver coupled to a processor of a user terminal, wherein the processor performs an algorithm including detecting one or more signals from an alternative target, decoding the signals, transmitting a signal to the alternative target and receiving a response.

The apparatus may further include a means for camping on a cell of the alternative target. This means may include, for example, a transceiver coupled to a processor of a user terminal, wherein the processor performs an algorithm including transmitting a signal to the alternative target indicating a request to camp on a cell of the alternative target, and receiving a response indicating that the user terminal is camped on the cell.

The apparatus may further include a means for performing at least one of a RAU procedure and a CS call setup procedure while camped on the cell. This means may include, for example, a transceiver coupled to a processor of a user terminal, wherein the processor performs an algorithm including transmitting signals to a network entity for initiating a RAU and/or CS setup procedure according to a protocol referenced herein, and receiving a confirmation signal from the network entity when the confirmation is completed. The means may further include processors of the network entities used to perform the RAU and CS setup procedures as defined, for example, in 3GPP TS 23.401.

Facilitating CSFB with RAU Determination

Figure 8:
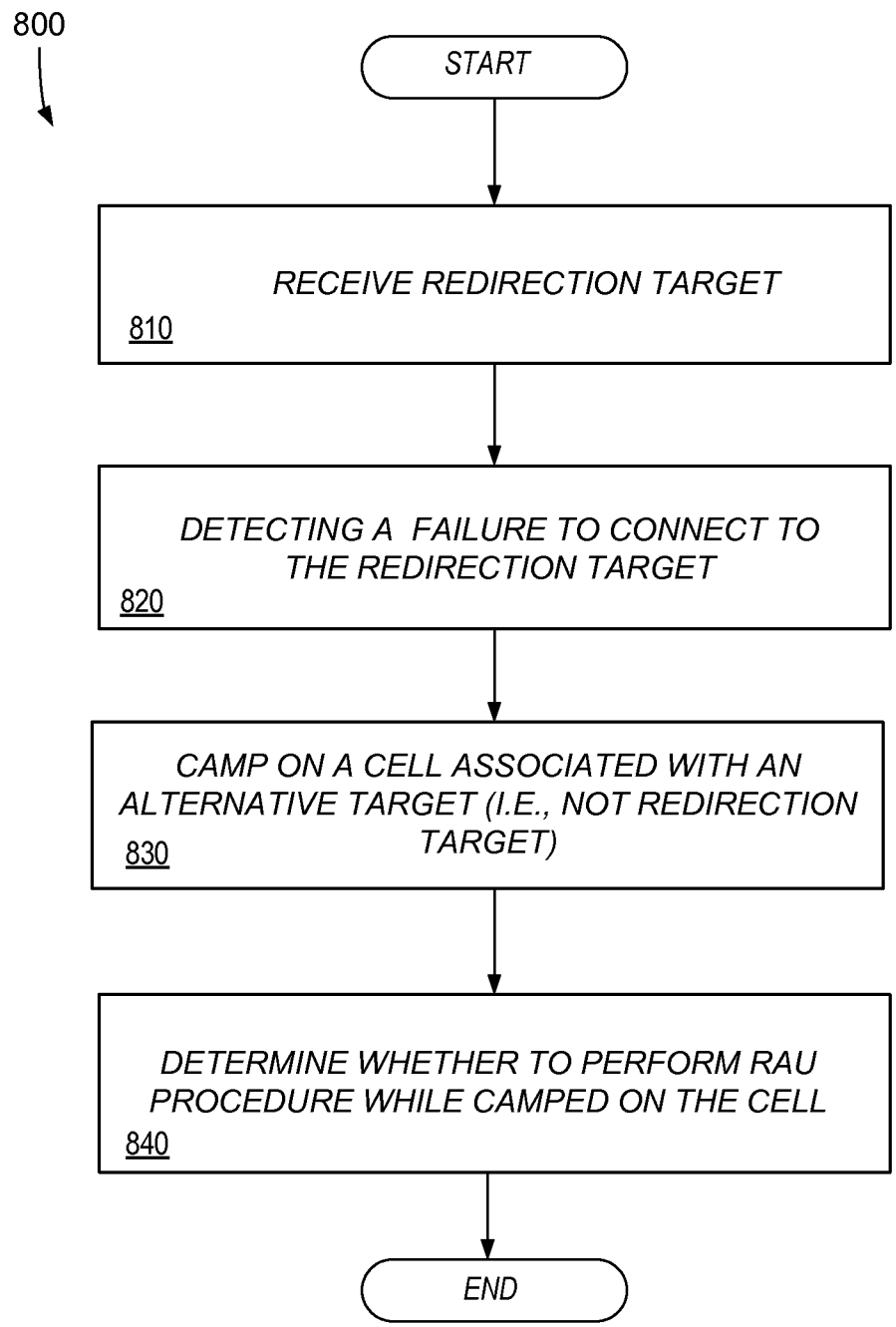
FIG. 8 illustrates an example embodiment of an alternative process for improving CS fallback performance in a multimode communication system.

FIG. 8 illustrates an embodiment of an example process 800 that may be used for facilitating CS fallback performance enhancement, wherein the user terminal determines whether or not to perform a RAU. At 810, a redirection target may be received at a user terminal. The user terminal may then attempt to access the redirection target, however, this process may fail. At 820, a failure to acquire the redirection target may be detected or determined. In response to detection of the failure to access the redirection target, a search for another target (different from the redirection target) may be performed by the user terminal. At 830, the user terminal may camp, responsive to the failure, on a cell of the alternative target. At 840, a determination may be made as to whether to perform a Routing Area Update (RAU) procedure while camped on the cell with the alternative target, which may result in a decision to perform the RAU or to not perform the RAU.

Figure 9:
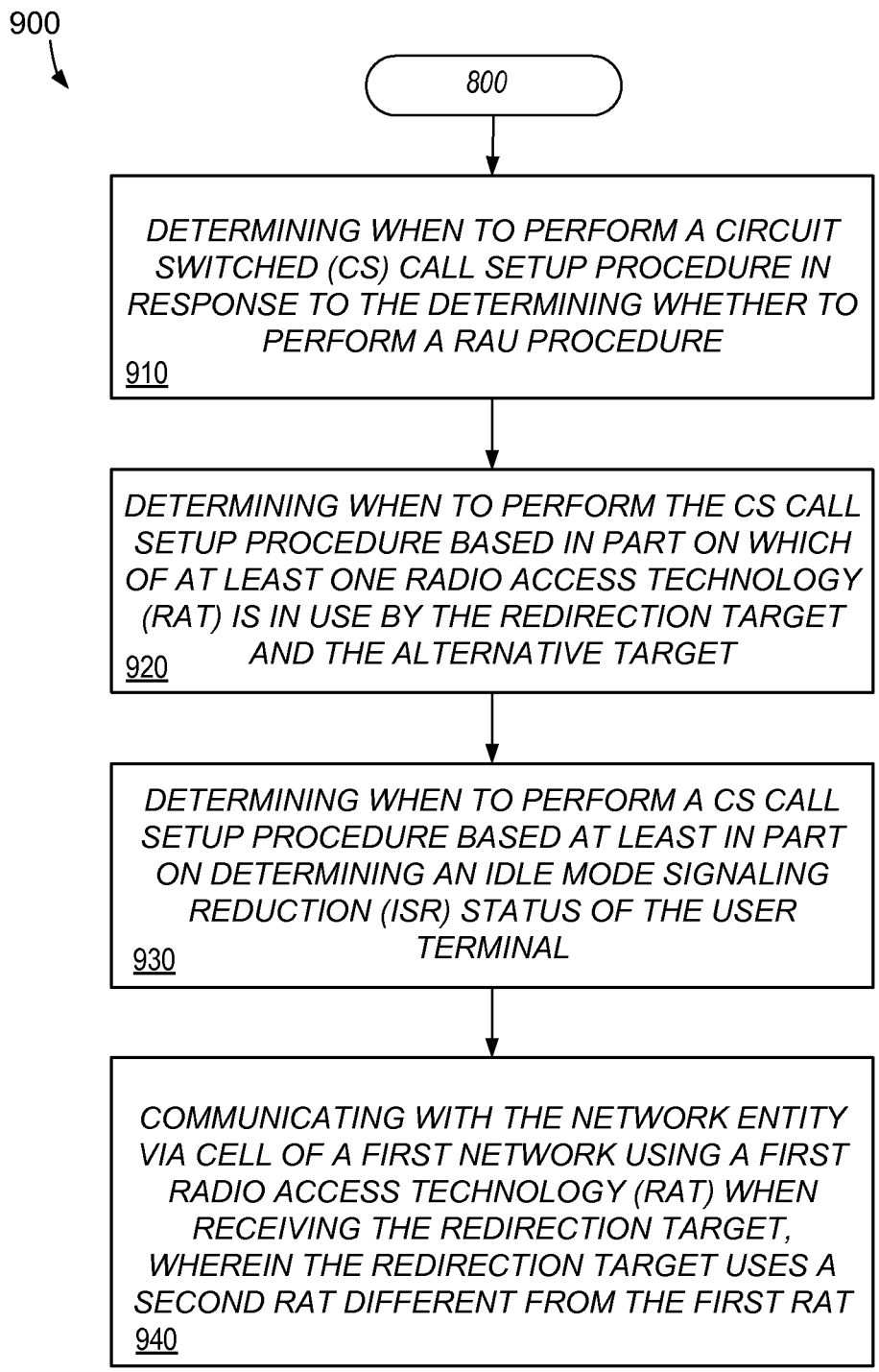
FIGS. 9-11 illustrate more detailed and/or optional aspects of the process illustrated in FIG. 8.
Figure 10:
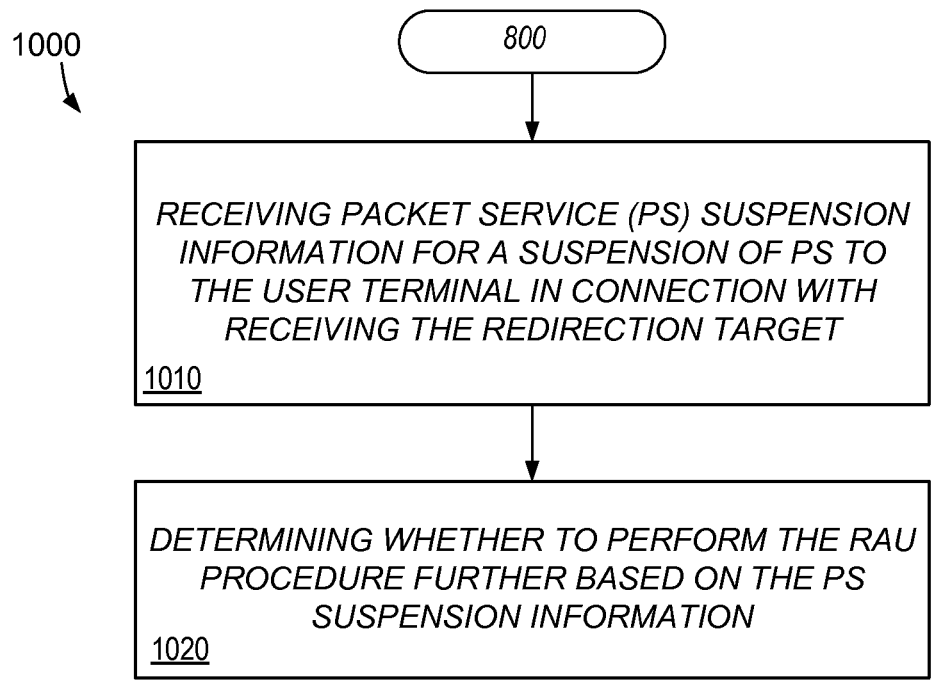
Figure 11:
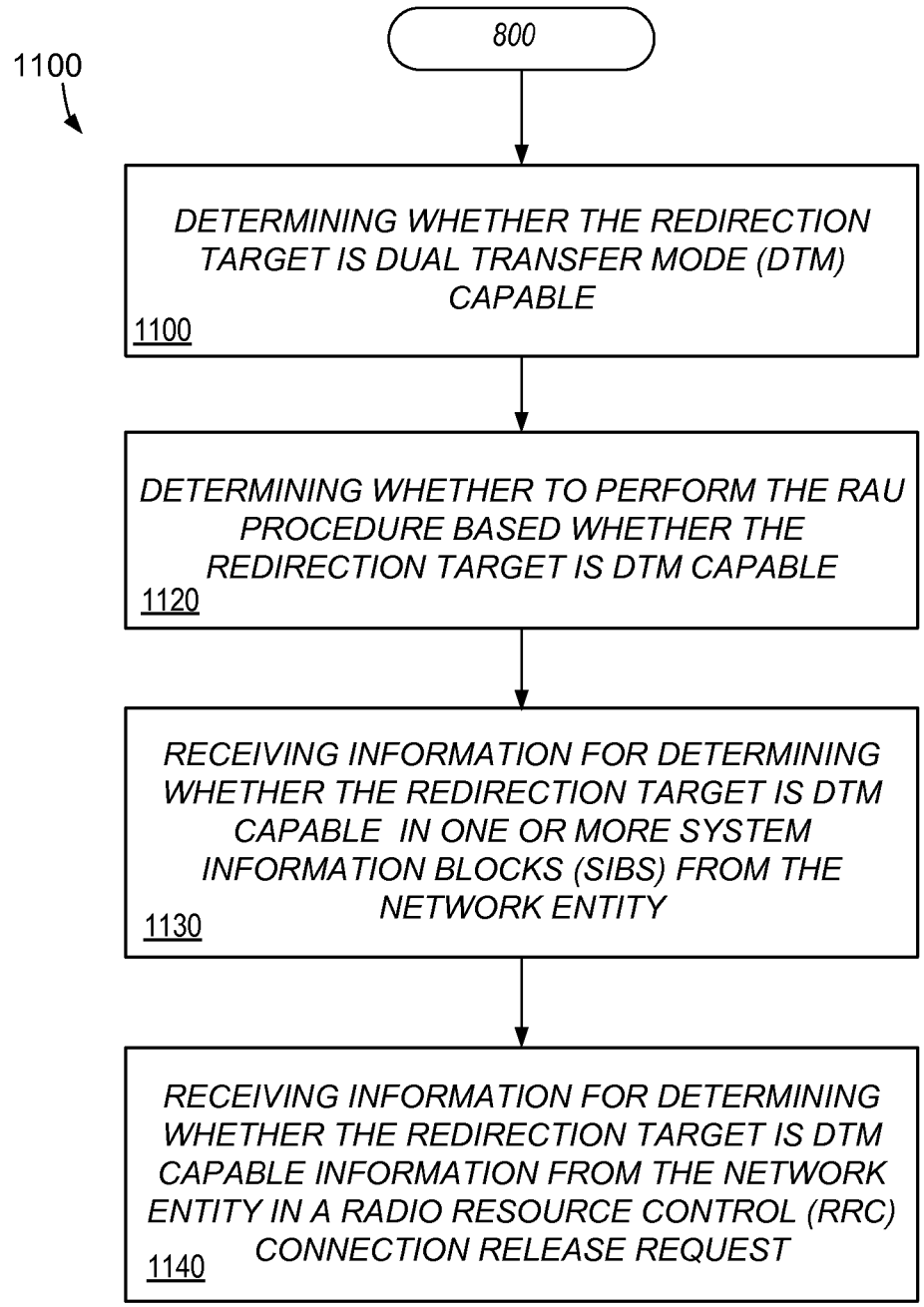

Additional operations 900, 1000 and 1100 are illustrated in FIGS. 9-11, for performance by the user terminal. One or more of operations 900, 1000 and 1100 may optionally be performed as part of method 800. The elements 900, 1000 and 1100 may be performed in any operative order, or may be encompassed by a development algorithm without requiring a particular chronological order of performance. Operations are independently performed and not mutually exclusive. Therefore any one of such operations may be performed regardless of whether another downstream or upstream operation is performed. For example, if the method 800 includes at least one of the operations 900, 1000 and 1100, then the method 800 may terminate after the at least one operation, without necessarily having to include any subsequent downstream operation(s) that may be illustrated.

Referring to FIG. 9 at 910, the method 800 may further include determining when to perform a CS call setup procedure relative to the RAU procedure, in response to the decision whether to perform the RAU. For example, if a decision to perform a RAU is made, a subsequent decision as to when to perform the RAU procedure relative to the CS call setup procedure may be made. More detailed aspects of determining when to perform the CS call setup procedure, such as logic for making a decision, are described below in connection with blocks 920 and 930. If a decision not to perform a RAU is made, then the decision regarding when to perform the CS call setup procedure may be omitted.

In an aspect, the method 800 may further include, at 920, determining when to perform a CS call setup procedure based in part on which of at least one Radio Access Technology (RAT) is in use by the redirection target and the alternative target. In another aspect, the method 800 may further include, at 930, determining when to perform a CS call setup procedure based in part on an ISR status of the user terminal. Specific examples of logic for determining when to perform a CS setup procedure based of the RAT and/or ISR status parameters referenced in blocks 920 and 930 are provided in the three paragraphs immediately below. The present technology is not limited to these examples, which are merely illustrative. The redirection target and the alternative target may use different RATs. Accordingly, the method 800 may further include, at 940, communicating with the network entity via cell of a first network using a first RAT when receiving the redirection target, wherein the redirection target uses a second RAT different from the first RAT. In addition, the alternative target may use a third RAT that is different from the second RAT and/or different from the first RAT.

Determining when to perform a CS setup procedure based of the RAT and ISR status parameters is illustrated by the following example. The redirection target may be, for example, a GERAN target, the alternative target may be a UTRAN target or a DTM GERAN target, and the ISR status may be "on." The determining when to perform the RAU procedure relative to the CS call setup procedure may include determining to perform the RAU procedure in parallel with the CS setup procedure, e.g., concurrently.

Determining when to perform a CS setup procedure based of the RAT and ISR status parameters is further illustrated by the following alternative example. The redirection target may be, for example, a GERAN target, the alternative target may be a Non-DTM GERAN target, and the ISR status may be "off." The determining when to perform the RAU procedure relative to the CS call setup procedure may include determining to perform the CS call setup procedure after the RAU procedure.

Determining when to perform a CS setup procedure based of the RAT and ISR status parameters is further illustrated by the following second alternative example. The redirection target may be, for example, a UTRAN target, the alternative target may be a Non-DTM GERAN, and the ISR status may be "off." The determining when to perform the RAU procedure relative to the CS call setup procedure may include determining to perform the CS call setup procedure after the RAU procedure.

The method 800 may further include, for example, performing the RAU procedure and the CS setup procedure based in part on a configuration status of an MME serving the user terminal. The configuration status of the MME may include making a determination or decision, at the MME, to suspend Packet Switched (PS) services, which may be based on an ISR status. For example, the MME may make a decision as to whether to perform a PS suspension based on receipt of redirection information from an eNB as well as an ISR status of the user terminal. The user terminal may be, for example, an LTE UE and the redirection target may be provided to the UE from the eNB.

Referring to FIG. 10 the method 800 may include the additional operations 1000 for facilitating CS fallback performance enhancement. At 1010, in connection with receiving the redirection target, the user terminal may receive PS suspension information indicating that PS may be suspended to the user terminal. Accordingly, the method 800 may further include, at 1020, determining whether to perform the RAU procedure further based on the PS suspension information. The determination may concern whether to perform a RAU procedure with the third network (the network of the alternative target). Specific examples of logic for determining whether to perform a RAU procedure further based on the PS suspension information are provided in the three paragraphs immediately below. The present technology is not limited to these examples, which are merely illustrative.

Determining whether to perform a RAU procedure further based on the PS suspension information is illustrated by the following example. The first network may be, for example, an LTE network and the third network may be, for example, a GERAN network. The PS suspension information may include, for example, an indication that a PS suspension is to be performed. The GERAN network may be, for example, a DTE capable GERAN network. An ISR status of the user terminal may be an "on" status, and the determining whether to perform the RAU procedure may include determining to perform the RAU procedure. That is, in response to determining that the PS suspension information, ISR status and network RATs are as described, the user terminal may initiate a RAU. The process may further include performing a CS call setup procedure in parallel with performing the RAU procedure. The performing a CS call setup procedure in parallel with performing the RAU procedure may be done in part based on the ISR on status.

Determining whether to perform a RAU procedure further based on the PS suspension information is further illustrated by the following alternative example. The first network may be, for example, an LTE network and the third network may be, for example, a UTRAN network. The PS suspension information may include, for example, an indication that a PS suspension is to be performed. An ISR status of the user terminal may be an "on" status, and the determining whether to perform the RAU procedure may include determining to perform the RAU procedure. That is, in response to determining that the PS suspension information, ISR status and network RATs are as described, the user terminal may initiate a RAU. The process may further include performing a CS call setup procedure in parallel with performing the RAU procedure. The performing a CS call setup procedure in parallel with performing the RAU procedure may be done in part based on the ISR "on" status.

Determining whether to perform a RAU procedure further based on the PS suspension information is further illustrated by the following second alternative example. The GERAN network may be, for example, a Non-DTE GERAN network, an ISR status of the user terminal may be an "off" status. The PS suspension information may include, for example, an indication that a PS suspension is to be performed. The determining whether to perform the RAU procedure may include determining to perform the RAU procedure. That is, in response to determining that the PS suspension information, ISR status and network RATs are as described, the user terminal may initiate a RAU. The process may further include performing the RAU procedure prior to performing the CS call setup procedure. The performing the RAU procedure prior to performing the CS call setup procedure may be done in part based on the ISR "off" status.

Referring to FIG. 11, the method 800 may include the additional operations 1100 for facilitating CS fallback performance enhancement. At 1110, the user terminal may determine whether the redirection target is DTM capable. This determination may be made based on information associated with a redirection command from a network entity. The user terminal may detect a third network to which the alternative target belongs in response to the failure to connect with the redirection target. As noted above at 840, the method 800 may include determining whether to perform a RAU procedure with the third network. The method 800 may further include, at 1120, determining whether to perform the RAU procedure based on whether the redirection target is DTM capable.

The first network may be, for example, an LTE network and the second network may be, for example, a GERAN network. The method 800 may further include, at 1130, receiving information for determining whether the redirection target is DTM capable in one or more system information blocks (SIBs) from the network entity. In the alternative, the method 800 may further include, at 1140 receiving information for determining whether the redirection target is DTM capable in a Radio Resource Control (RRC) Connection Release Request.

Process 800 may be embodied in a tangible medium. For example, process 800 may be embodied in a non-transitory computer program product including a computer-readable medium having codes for causing a user terminal to perform one or more of receiving a redirection target, detecting a failure to connect to the redirection target, camping on a cell of the alternative target, and determining whether to perform a Routing Area Update (RAU) procedure while camped on the cell, and determining, responsive to the determining whether to perform a RAU procedure. The computer-readable medium may further be encoded with code for causing a user terminal to perform any of the additional operations 900, 1000, or 1100 described above.

Process 800 may be embodied in a communication system or apparatus. The communication apparatus may include one or more of the components of a transmitter module configured to communicate with a plurality of base stations using different Radio Access Technologies (RATs), a receiver module configured to receive, at a user terminal, a redirection target from a network entity, a processor module configured to detect a failure to connect to the redirection target, initiate a process to camp on a cell of the alternative target, determine whether to perform a Routing Area Update (RAU) procedure while camped on the cell. The processor may further be configured to perform any of the additional operations 900, 1000 or 1100 described above. For example, the processor may be configured to determine, responsive to the determining whether to perform a RAU procedure, when to perform a Circuit Switched (CS) call setup procedure relative to the RAU procedure. The transmitter module and/or the receiver module may be configured to operate in multiple modes, including a first mode associated with a first network type operating with a first radio access technology (RAT) and a second mode associated with a second network type that may be associated with a second RAT. The communication apparatus may be an LTE user equipment (UE) or a component of an LTE UE or a similar or equivalent device or system.

Alternately, or in addition, the communication apparatus may include a means for receiving a redirection target. The means for receiving a redirection target may include, for example, a transceiver coupled to a processor of a user terminal, wherein the processor performs an algorithm including decoding a received signal, and recognizing that the signal indicates a redirection target.

The apparatus may further include a means for detecting a failure to connect to the redirection target. The means for detecting a failure to connect may include, for example, a transceiver coupled to a processor of a user terminal, wherein the processor performs an algorithm including transmitting a signal to the redirection target, detecting a signal from the redirection target, and determining that a failure has occurred based on failing to detect an anticipated signal or detecting a signal indicating that an acceptable connection cannot be made.

The apparatus may further include a means for camping, responsive to the failure, on a cell of the alternative target. This means may include, for example, a transceiver coupled to a processor of a user terminal, wherein the processor performs an algorithm including transmitting a signal to the alternative target indicating a request to camp on a cell of the alternative target, and receiving a response indicating that the user terminal is camped on the cell.

The apparatus may further include a means for determining whether to perform a Routing Area Update (RAU) procedure while camped on the cell. This means may include, for example, a transceiver coupled to a processor of a user terminal, wherein the processor performs an algorithm including conditional logic for testing the state of input factors, and determining an outcome based in the input factors. Input factors may include, for example, whether the redirection target is DTM capable or an ISR status of the user terminal.

Resolving Issues with Network-Triggered PS Suspending

Certain issues may arise when a PS suspension is triggered by the network. For example, when a UE is transferred to a non-DTM GERAN in CSFB and the PS domain is therefore suspended, the network may perform a CSFB procedure, for example as described more particularly in TS 23.272. In an aspect of this procedure, the UE initially enters dedicated mode and performs a CS call. In parallel, the UE may send an RR Suspend Request (Temporary Logical Link Identity (TLLI)) message to the BSC. The BSC may then requests the SGSN to suspend the PS domain. The SGSN may send a Suspend Request message including the old Packet Temporary Mobile Subscriber Identity (P-TMSI) and Routing Area Identity (RAI) but not the P-TMSI signature to an old CN node. If ISR is not active, the SGSN may sends the suspend request message to the old MME; i.e., the old CN node may be the old MME. If ISR is active, the SGSN sends the suspend request message to the old S4-SGSN; i.e., the old CN node may the old S4-SGSN.

An issue arises from the foregoing context, namely the MME cannot trigger PS bearer suspension for the UE from the Suspend Request message because it cannot derive the Global Unique Temporary ID (GUTI) from the mapped old P-TMSI/RAI. Normally, the MME should be able to derive the GUTI by mapping from the P-TMSI, RAI and P-TMSI Signature. However, the P-TMSI signature is not provided by the UE in RR suspend request. Therefore, the MME already triggers PS bearer suspension when it indicates "Fallback to non-DTM GERAN" to the eNB during the CSFB procedure.

Problems may occur in the following CSFN scenarios: In one scenario, the target cell communicated by the eNB supports DTM, but the cell found by the UE does not support DTM. For example, the UE may be redirected to a UTRAN cell, but may instead select a non-DTM GERAN cell. In Scenario A, the MME does not suspend PS bearers. If ISR is active in the UE, no problem arises because the old S4-SGSN will suspend the PS domain. If ISR is not active in the UE, the PS domain is not suspended. Consequently, packets arriving at the SGW/PGW may cause unnecessary paging in the E-UTRAN air interface, and the UE may be charged for downlink PDU's that it cannot receive. When a DL packet arrives, the MME will page the UE and will fail to receive a response. Then, the SGM deletes buffered DL packets. To resolve these issues, the UE may be configured to always perform a RAU before setting up a CS call. However, this approach may add a delay of 1000 ms or more to the CSFB, leading to a call failure.

Figure 12:
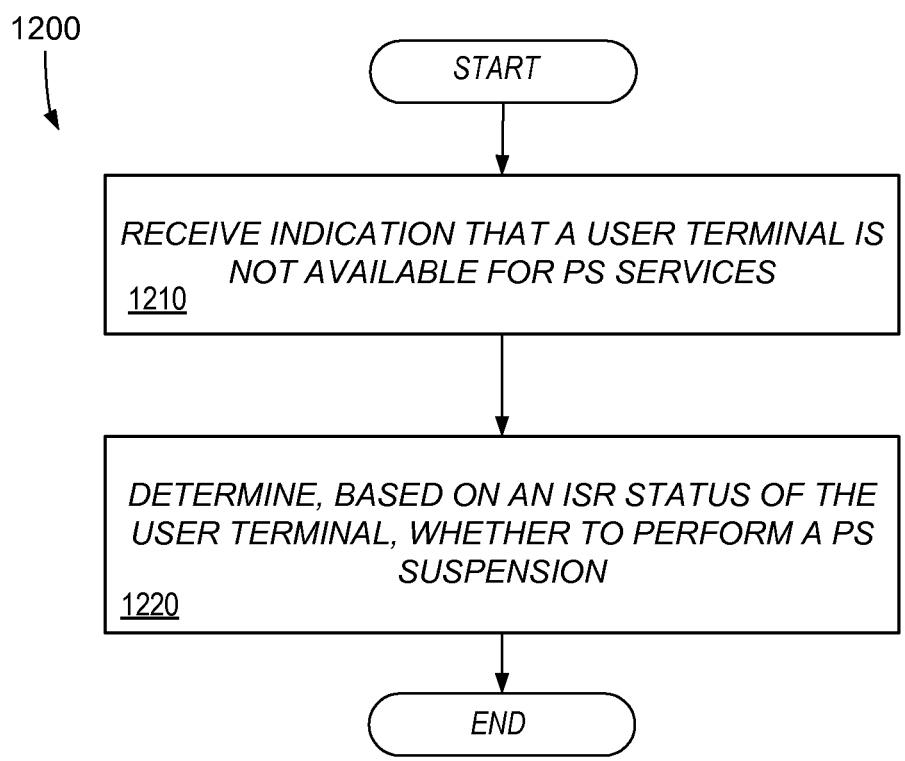
FIG. 12 illustrates an example embodiment of an alternative process for improving CS Fallback performance in a multimode communication system.
Figure 13A:
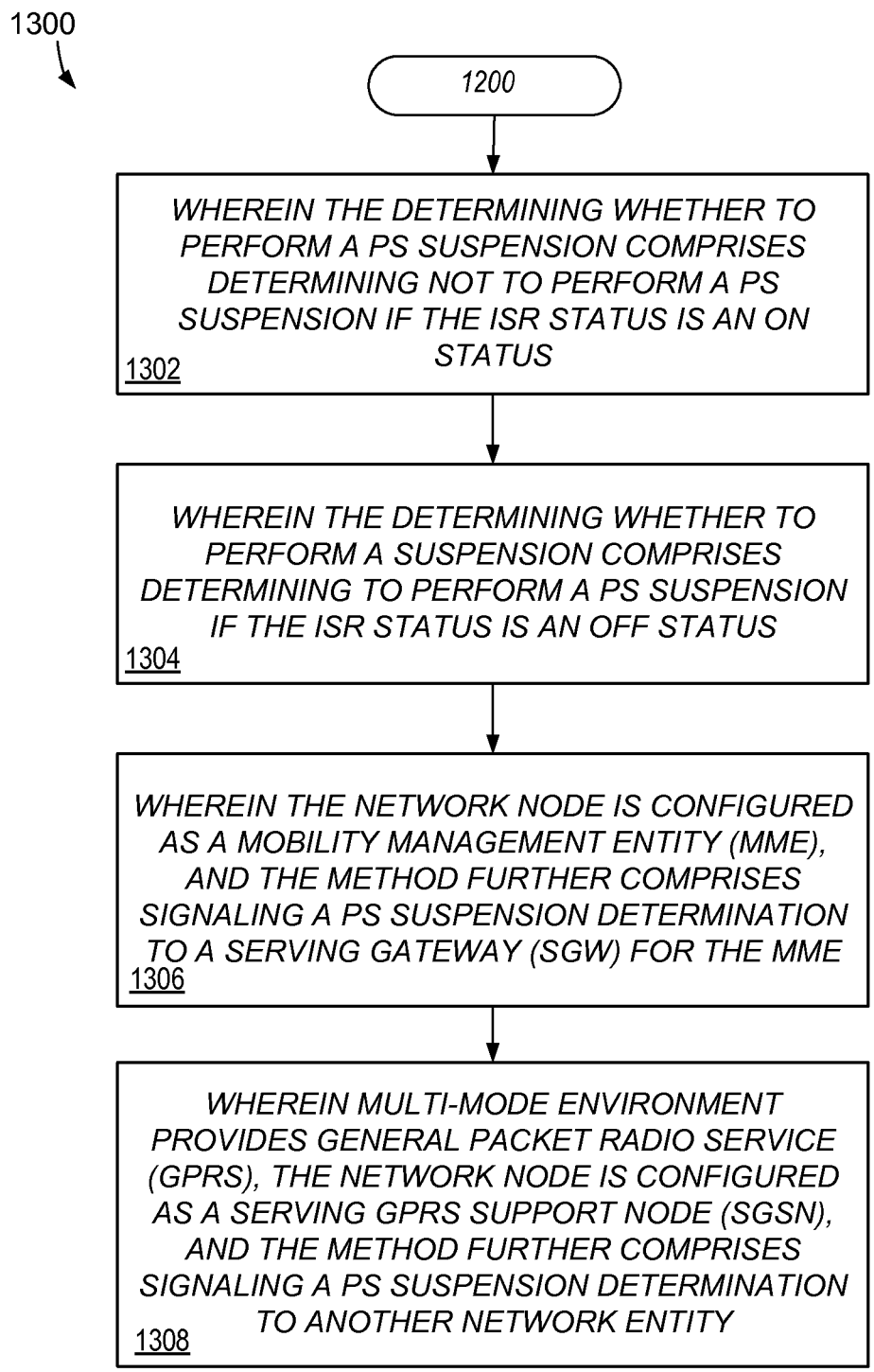
Figure 13B:
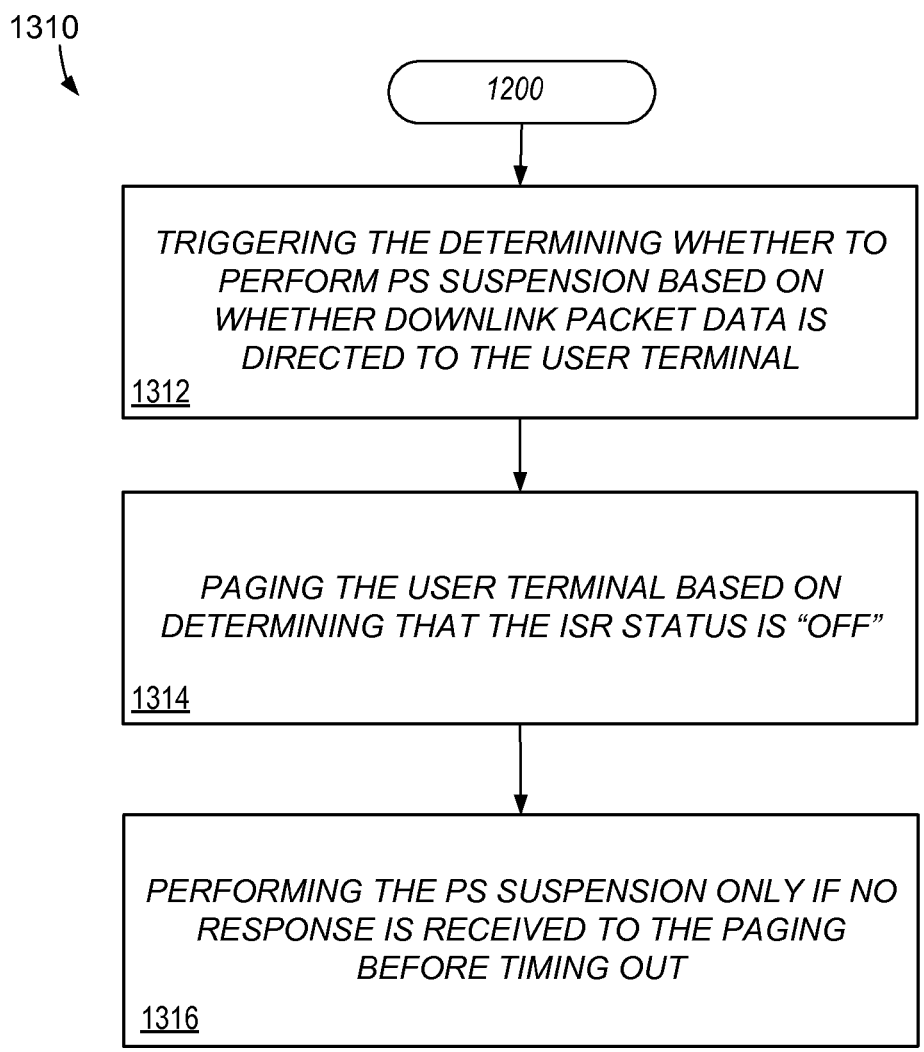

To resolve these issues more effectively, the MME or other network entity may perform another process 1200 that may be used for facilitating CS fallback performance enhancement, as shown in FIG. 12. At 1210, a network entity may receive an indication that a user terminal, such as a UE, is not available for PS services. At 1220, the network entity may determine whether to perform a PS suspension, based on an ISR status of the user terminal. For example, the network entity may determine an ISR status of the user terminal. If the ISR status is "off," the network entity may suspend packet service to the user terminal, based on the determination. Within this basic framework, the method 1200 may include further aspects and operations as described below in connection with FIGS. 13A-C In an aspect, the method 1200 may include the additional operations 1300 as illustrated in FIGS. 13A-B, for performance by network entity. One or more of operations 1300 or 1310 may optionally be performed as part of method 1200.

The elements 1300 or 1310 may be performed in any operative order, or may be encompassed by a development algorithm without requiring a particular chronological order of performance, unless logically required. Operations may be independently performed and are not mutually exclusive, unless expressly described as interdependent or as mutually exclusive operations. In general, any one of such operations may be performed regardless of whether another downstream or upstream operation is performed. For example, if the method 1200 includes at least one of the operations 1300, then the method 1200 may terminate after the at least one operation, without necessarily having to include any subsequent downstream operation(s) that may be illustrated.

In an aspect of the method 1200, determining whether to perform a PS suspension may include, at 1302, determining not to perform a PS suspension if the ISR status is "on." In the alternative, the determining whether to perform a suspension may include, at 1304, determining to perform a PS suspension if the ISR status is "off." In another aspect of the method 1200, the network entity performing operations of the method may be configured as an LTE Mobility Management Entity (MME), and the method 1200 may include, at 1304, signaling a PS suspension determination to a Serving Gateway (SGW) for the MME. In another aspect, the multimode environment may include providing General Packet Radio Service (GPRS) and the network entity performing the method 1200 may be configured as an SGSN. The method 1200 may further include, at 1308, signaling the PS suspension to another network entity.

In another aspect of the method 1200, the method may include additional operations 1310 as shown in FIG. 13B. In this aspect, the method may include, at 1312, triggering the determining of whether to perform the PS suspension based on whether downlink packet data is directed to the user terminal. The network entity may determine whether downlink packet data is directed to the user terminal, for example, by receiving a Downlink Data Notification (DDN) message for the user terminal from a network involved with packet data distribution. For further example, in the absence of receiving a DDN for the user terminal, the network entity may infer that downlink packet data is not directed to the user terminal, and thus may defer performing the method 1200. The method 1200 may further include, at 1314, paging the user terminal based on determining that the ISR status is "off." The method may further include, at 1316, performing the PS suspension only if no response is received to the paging within a specified time period, i.e., before timing out. In other words, the network entity may perform PS suspension only if all of the following conditions are satisfied: (a) the ISR status for the user terminal is "off"; (b) downlink packet data is directed to the user terminal; and (c) no response is received to a paging message directed to the user terminal.

A more detailed logical flow for the operations 1310 summarized by FIG. 13B is illustrated by FIG. 13C. An MME or other network entity may perform the method 1200 to also include additional operations 1320 and logic as illustrated by the flow chart in FIG. 13C. At 1322, the MME may receive a Downlink Data Notification (DDN) message after the eNB has redirected the UE to a 2G/3G cell. Receiving the DDN message at 1322 may trigger initiation of the downstream operations in FIG. 13C, starting at block 1324. If ISR is not active as determined at 1324, the MME may automatically page the UE via E-UTRAN at 1326. Conversely, if the MME determines that ISR is active, it does not initiate a PS suspension procedure at 1332. The MME may determine, at 1324, that ISR is not active from an S1 UE Context Release Request including a CSFB cause value. At 1326, the MME may wait for a response to the page from the UE. If the MME determines at 1328 that no response is received before timing out, then the MME may initiate a PS suspension procedure at 1330. However if a response is received before timing out, at 1332 the MME does not initiate a PS suspension procedure.

In a converse scenario to that resolved by method 1200, the target cell communicated by the eNB does not support DTM, but the cell found by the UE supports DTM. For example, the UE may be redirected to a non-DTM GERAN cell, but may instead select a UTRAN cell. In this scenario, the MME may suspend PS bearers and if ISR is not active in the UE, no issue arises because the UE will perform a RAU in UTRAN. If ISR is active in the UE, the UE may not perform RAU and the PS domain may fail to operate due to the suspended bearers. However, this problem should rarely arise because normally ISR will not be active in this scenario and the UE will perform a RAU. Usually, the eNB will direct the UE to a registered RAT cell, and the ISR will be active only in the rare case that GERAN and UTRAN share the same LAI. Therefore, a particular resolution of this rarely arising issue may not be warranted.

Process 1200 may be embodied in a tangible medium, For example, process 1200 may be embodied in a computer program product including a non-transitory computer-readable medium having codes for causing a computer to perform one or both of the stages of receiving, at a network node from a base station, an indication that a user terminal is not available for PS services, and determining, based on an ISR status of the user terminal, whether to perform a PS suspension. The computer-readable medium may further include codes for performing the additional operations 1300, 1310 and/or 1320.

Process 1200 may be embodied in a communication system or apparatus. The communication apparatus may include one or both of a receiver module configured to receive, at a network node from a base station, an indication that a user terminal is not available for PS services, and a processor module configured to determine, based on an ISR status of the user terminal, whether to perform a PS suspension. The processor may further be configured to perform the additional operations 1300. The communication apparatus may be an LTE MME, or a similar or equivalent device or component of a device or system.

Alternately, or in addition, the communication apparatus may include one or both of a means for receiving, at a network node from a base station, an indication that a user terminal is not available for PS services. The means may include, for example, a transceiver coupled to a processor, wherein the processor is configured to perform an algorithm for receiving an indication that a user terminal is not available for PS services. The algorithm may include receiving a signal from the user terminal or from a network entity, decoding the signal, and interpreting the decoded signal as an indication that the user terminal is not available for PS services.

The apparatus may further include means for determining, based on an ISR status of the user terminal, whether to perform a PS suspension. The means may include, for example, a transceiver coupled to a processor, wherein the processor is configured to perform an algorithm for determining whether to perform a PS suspension. The algorithm may include conditional logic for testing the state of input factors, and determining an outcome based in the input factors. Input factors may include, for example, an ISR status of the user terminal. The communication apparatus may comprise an LTE MME, or a similar or equivalent device or component of a device or system.

Facilitating CSFB PS Suspension Based on Redirecting

FIG. 14 illustrates another method 1400 that may be used for facilitating CS fallback performance enhancement. The method 1400 may include, at 1410, a network entity (e.g., a base station) of a first network type redirecting a user terminal to a second network of a different type. The first network may use a first RAT, and the second network may use a second RAT different from the first RAT. The redirecting may be initiated in response to a call request from the user terminal, an incoming call to the user terminal, or other network factors such as mobility, loading, and so forth. The method 1400 may further include, at 1420, instructing a node of the first network to perform a PS suspension based on redirecting the user terminal to the second network. The method 1400 may further include, at 1430, sending information for the PS suspension to a user terminal. The user terminal may be, for example, an LTE UE, the base station may be, for example, an LTE eNB, and the node of the first network may be, for example, an MME. The first network may be an LTE network and the second network may be a GERAN network. The GERAN network may be a Non-DTM GERAN network. The PS suspension may be implemented by the MME and an associated SGW and/or other core network components.

Figure 15:
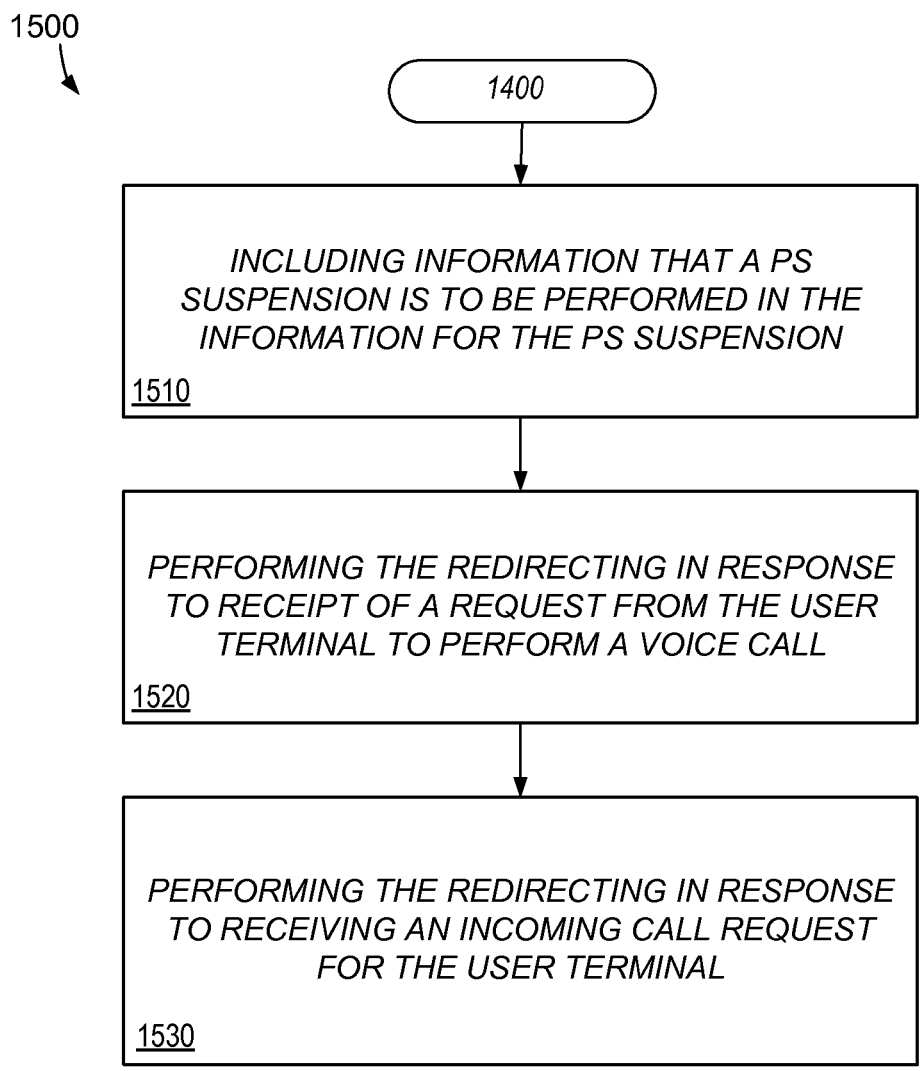
FIG. 15 illustrates more detailed or optional aspects of the process illustrated in FIG. 14.

Additional operations 1500 are illustrated in FIG. 15, for performance by network entity. One or more of operations 1500 may optionally be performed as part of method 1400. The elements 1500 may be performed in any operative order, or may be encompassed by a development algorithm without requiring a particular chronological order of performance. Operations are independently performed and not mutually exclusive. Therefore any one of such operations may be performed regardless of whether another downstream or upstream operation is performed. For example, if the method 1400 includes at least one of the operations 1500, then the method 1400 may terminate after the at least one operation, without necessarily having to include any subsequent downstream operation(s) that may be illustrated.

In an aspect of the method 1400, at 1510, the network entity may include information that a PS suspension is to be performed in the information for the PS suspension. The method 1400 may further include, at 1520, performing the redirecting in response to receipt of a request from the user terminal to perform a voice call. The method 1400 may further include, at 1530, performing the redirecting in response to receiving an incoming call request for the user terminal.

Process 1400 may be embodied in a tangible medium. For example, process 1400 may be embodied in a non-transitory computer program product including a computer-readable medium having codes for causing a computer to perform one or more of the stages of redirecting, at a base station of a first network using a first RAT, a user terminal to a second network using a second RAT different from the first RAT, instructing a node of the first network to perform a PS suspension based on redirecting the user terminal to the second network, and sending, to the user terminal, information for the PS suspension. The computer-readable medium may further include code for performing the additional operations 1500.

Process 1400 may be embodied in a communication system or apparatus. The communication apparatus may include one or more of the components of a processor module configured to redirect a user terminal from a first network using a first RAT to a second network using a second RAT different from the first RAT, and instruct a node of the first network to perform a PS suspension based on redirecting the user terminal to the second network, and a transmitter module configured to send, to the user terminal, information for the PS suspension. The processor may be further configured to perform one or more of the additional operations 1500. The communication apparatus may be a base station, such as, for example, an LTE eNB, or a similar or equivalent device or component of a device or system.

Alternately, or in addition, the communication apparatus may include a means for redirecting, at a base station of a first network using a first RAT, a user terminal to a second network using a second RAT different from the first RAT. Said means may include, for example, a transceiver coupled to a processor, wherein the processor is configured to perform an algorithm for redirecting the user terminal. The algorithm may include, for example, determining an identifier for a base station of the second network, encoding the identifier in a redirection message, and transmitting the redirection message to the user terminal.

The apparatus may further include a means for instructing a node of the first network to perform a PS suspension based on redirecting the user terminal to the second network, and a means for sending, to the user terminal, information for the PS suspension. Said means may include, for example, a transceiver coupled to a processor, wherein the processor is configured to perform an algorithm for instructing a node of the first network to perform a PS suspension based on the redirecting. The algorithm may include, for example, detecting that the redirecting is completed or in progress, encoding an instruction to suspend PS including an identifier for the user terminal, transmitting the instruction to the node of the first network. The communication apparatus may be a base station, such as, for example, an LTE eNB, or a similar or equivalent device or component of a device or system.

Figure 16:
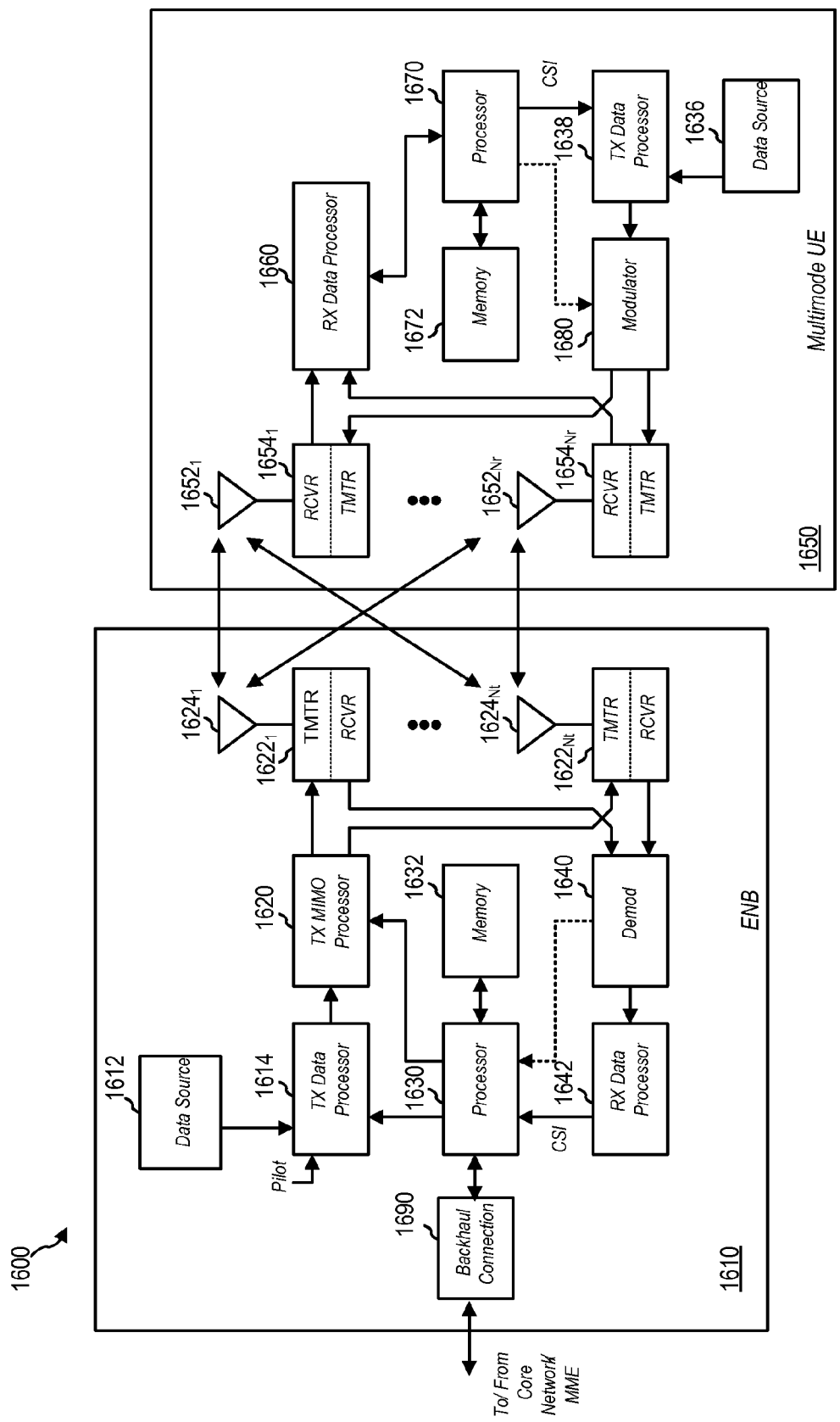
FIG. 16 illustrates an example embodiment of a base station and user terminal in a multimode communication system.

FIG. 16 illustrates a block diagram of an embodiment of base station 1610 (i.e., an eNB, HeNB, etc.) and a user terminal 1650 (i.e., a terminal, AT or UE, etc.) in an example LTE communication system 1600, on which aspects and functionality as described herein may be implemented. These components may correspond to those shown in FIGS. 1-5, and may be configured to implement the processes illustrated previously herein, such as described with respect to FIGS. 6-15.

Various functions may be performed in the processors and memories as shown in base station 1610 (and/or in other components not shown), such as coordination with other base stations (not shown) of other networks, to transmit and receive signaling from the other base stations and UEs, as well as to provide other functionality as described herein. For example, UE 1650 may include one or more modules to receive signals from base station 1610 and/or other base stations (not shown, such as non-serving base stations or base stations of other network types as described previously herein) to access base stations, receive DL signals, determine channel characteristics, perform channel estimates, demodulate received data and generate spatial information, determine power level information, and/or other information associated with base station 1610 or other base stations (not shown).

In one embodiment, base station 1610 may coordinate with other base stations as described previously herein to facilitate multimode operation. This may be done in one or more components (or other components not shown) of base station 1610, such as processors 1614, 1630 and memory 1632. Base station 1610 may also include a transmit module including one or more components (or other components not shown) of eNB 1610, such as transmit modules 1622. Base station 1610 may include an interference cancellation module including one or more components (or other components not shown), such as processors 1630, 1642, demodulator module 1640, and memory 1632 to provide functionality such as redirection of served UEs, communication with associated MMEs, or other network nodes, signaling redirection information, PS suspension information, and/or other information such as is described herein.

Base station 1610 may include a processor module including one or more components (or other components not shown), such as processors 1630, 1614 and memory 1632 to perform base station functions as described herein and/or manage transmitter and/or receiver modules, which may be used to communicate with UEs or other nodes, such as MMEs. Base station 1610 may also include a control module for controlling receiver functionality. Base station 1610 may include a network connection module 1690 to provide networking with other systems, such as backhaul systems in the core network, such as via backhaul connection module 1690, or with other components such as are shown in FIGS. 1-5.

Likewise, UE 1650 may include a receive module including one or more components of UE 1650 (or other components not shown), such as receivers 1654. UE 1650 may also include a processor module including one or more components (or other components not shown) of UE 1650, such as processors 1660 and 1670, and memory 1672, to perform the processing functions associated with user terminals as described herein. This may include, for example, receiving and searching for redirection targets and alternate targets, as well as performing CS call setup procedure and RAU procedures, which may be sequenced as described herein.

In one embodiment, one or more signals received at UE 1650 are processed to receive DL signals and/or extract information such as SIB information from the DL signals. Additional processing may include estimating channel characteristics, power information, spatial information, and/or other information associated with eNBs, such as base station 1610 and/or other base stations, such as Node Bs (not shown), facilitating redirection commands, searching for and locating redirection targets and alternate targets, such as fallback targets, as well as facilitating communicating with other networks such as UTRAN and GERAN networks and associated nodes, such as base stations or Node Bs of those different network types.

UE 1650 may include one or more receiver and transmitter modules which may be configured for multimode operation so as to perform communication with LTE base stations as well as base stations of other types, such as base stations in UTRAN and/or GERAN networks. Memories 1632 and 1672 may be used to store computer code for execution on one or more processors, such as processors 1660, 1670 and 1638, to implement processes associated with the aspects and functionality described herein.

In operation, at the base station 1610, traffic data for a number of data streams may be provided from a data source 1612 to a transmit (TX) data processor 1614, where the data may be processed and transmitted to one or more UEs 1650. In one aspect, each data stream is processed and transmitted over a respective transmitter sub-system (shown as transmitters $1624_1$-$1624_{Nt}$) of base station 1610. TX data processor 1614 receives, formats, codes, and interleaves the traffic data for each data stream based on a particular coding scheme selected for that data stream so as to provide coded data. In particular, base station 1610 may be configured to determine a particular reference signal and reference signal pattern and provide a transmit signal including the reference signal and/or beamforming information in the selected pattern.

The coded data for each data stream may be multiplexed with pilot data using

OFDM techniques. The pilot data is typically a known data pattern that is processed in a known manner and may be used at the receiver system to estimate the channel response. For example, the pilot data may include a reference signal. Pilot data may be provided to TX data processor 1614 as shown in FIG. 16 and multiplexed with the coded data. The multiplexed pilot and coded data for each data stream may then be modulated (i.e., symbol mapped) based on a particular modulation scheme (e.g., BPSK, QSPK, M-PSK, M-QAM, etc.) selected for that data stream so as to provide modulation symbols, and the data and pilot may be modulated using different modulation schemes. The data rate, coding, and modulation for each data stream may be determined by instructions performed by processor 1630 based on instructions stored in memory 1632, or in other memory or instruction storage media of UE 1650 (not shown).

The modulation symbols for all data streams may then be provided to a TX MIMO processor 1620, which may further process the modulation symbols (e.g., for OFDM implementation). TX MIMO processor 1620 may then provide Nt modulation symbol streams to $N_t$ transmitters (TMTR) $1622_1$ through $1622_{Nt}$. The various symbols may be mapped to associated RBs for transmission.

TX MIMO processor 1620 may apply beamforming weights to the symbols of the data streams and corresponding to the one or more antennas from which the symbol is being transmitted. This may be done by using information such as channel estimation information provided by or in conjunction with the reference signals and/or spatial information provided from a network node such as a UE. For example, a beam B=transpose([b1 b2 ... $b_{Nt}$]) composes of a set of weights corresponding to each transmit antenna. Transmitting along a beam corresponds to transmitting a modulation symbol x along all antennas scaled by the beam weight for that antenna; that is, on antenna t the transmitted signal is bt*x. When multiple beams are transmitted, the transmitted signal on one antenna is the sum of the signals corresponding to different beams. This can be expressed mathematically as B1x1+B2x2+$BN_s xN_s$, where $N_s$ beams are transmitted and xi is the modulation symbol sent using beam Bi. In various implementations beams could be selected in a number of ways. For example, beams could be selected based on channel feedback from a UE, channel knowledge available at the eNB, or based on information provided from a UE to facilitate interference mitigation, such as with an adjacent macrocell.

Each transmitter sub-system $1622_1$ through $1622_{Nt}$ receives and processes a respective symbol stream to provide one or more analog signals, and further conditions (e.g., amplifies, filters, and upconverts) the analog signals to provide a modulated signal suitable for transmission over the MIMO channel. $N_t$ modulated signals from transmitters $1622_1$ through $1622_{Nt}$ are then transmitted from $N_t$ antennas $1624_1$ through $1624_{Nt}$, respectively.

At UE 1650, the transmitted modulated signals are received by $N_r$ antennas $1652_1$ through $1652_{Nr}$ and the received signal from each antenna 1652 is provided to a respective receiver (RCVR) $1654_1$ through $1652_{Nr}$. Each receiver 1654 conditions (e.g., filters, amplifies and downconverts) a respective received signal, digitizes the conditioned signal to provide samples, and further processes the samples to provide a corresponding "received" symbol stream.

An RX data processor 1660 then receives and processes the $N_r$ received symbol streams from $N_r$ receivers $1654_1$ through $1652_{Nr}$ based on a particular receiver processing technique so as to provide $N_S$ "detected" symbol streams so at to provide estimates of the $N_S$ transmitted symbol streams. The RX data processor 1660 then demodulates, deinterleaves, and decodes each detected symbol stream to recover the traffic data for the data stream. The processing by RX data processor 1660 is typically complementary to that performed by TX MIMO processor 1620 and TX data processor 1614 in base station 1610.

A processor 1670 may periodically determine a precoding matrix. Processor 1670 may then formulate a reverse link message that may include a matrix index portion and a rank value portion. In various aspects, the reverse link message may include various types of information regarding the communication link and/or the received data stream. The reverse link message may then be processed by a TX data processor 1638, which may also receive traffic data for a number of data streams from a data source 1636 which may then be modulated by a modulator 1680, conditioned by transmitters $1654_1$ through $1654_{Nr}$, and transmitted back to base station 1610. Information transmitted back to base station 1610 may include power level and/or spatial information for providing beamforming to mitigate interference from base station 1610.

At base station 1610, the modulated signals from UE 1650 are received by antennas 1624, conditioned by receivers 1622, demodulated by a demodulator 1640, and processed by a RX data processor 1642 to extract the message transmitted by UE 1650. Processor 1630 then determines which precoding matrix to use for determining beamforming weights, and then processes the extracted message.

Figure 17:
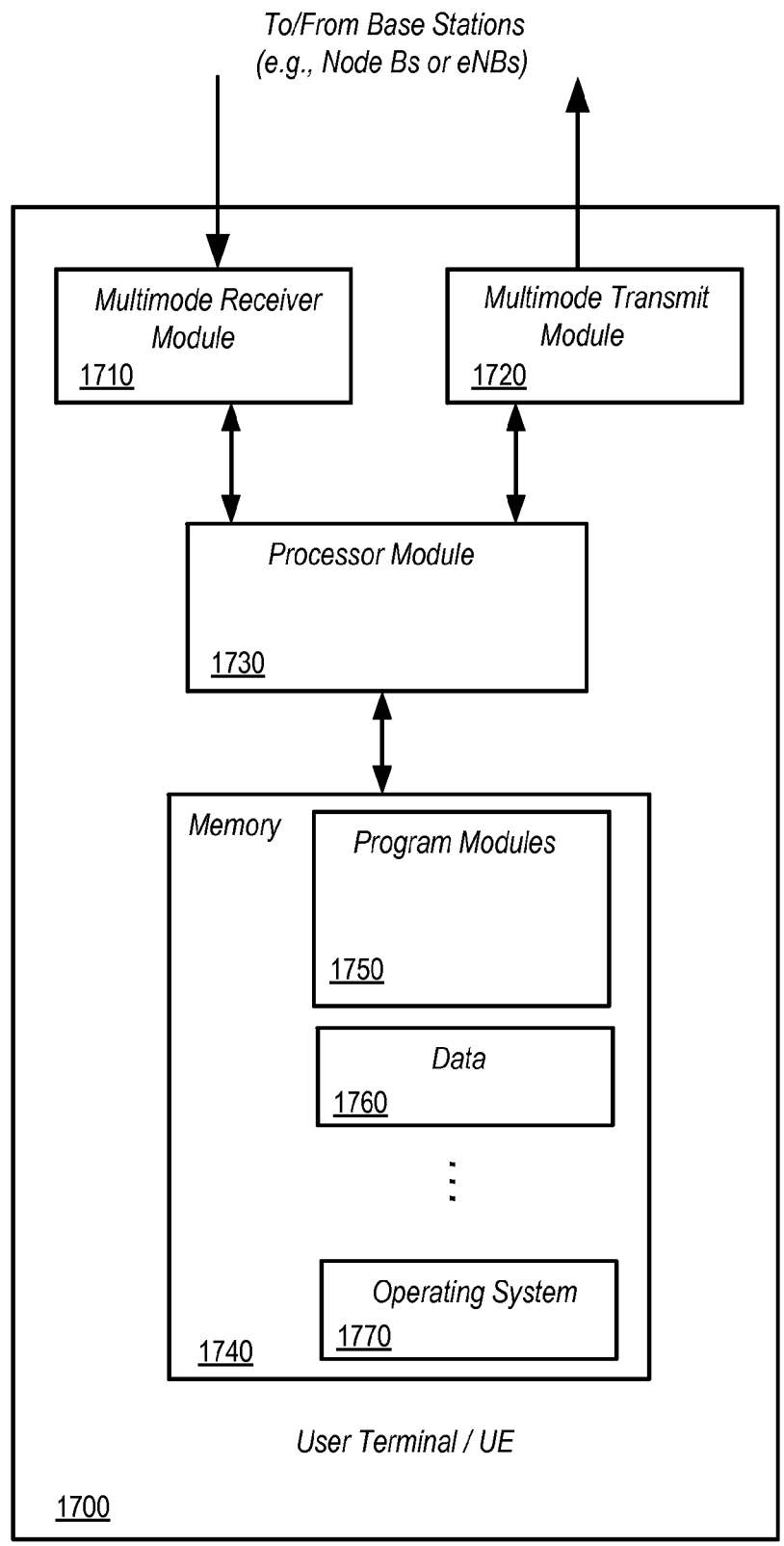
FIG. 17 illustrates details of an embodiment of a user terminal.

FIG. 17 illustrates additional details of an embodiment of a communications apparatus 1700, which may be a user terminal or component of a user terminal, such as a multimode UE as described herein. Apparatus 1700 may include a multimode receiver module 1710 which may be configured to receive signals from multiple network types, such as LTE networks, UTRAN networks, GERAN networks, and/or other networks. Likewise, apparatus 1700 may include a transmitter module 1720 which may be configured for similar multimode capability. Apparatus 1700 may include one or more processor modules 1730 which may be configured to implement the processing described herein. Apparatus 1700 may also include a memory 1740, which may include program modules 1750, data 1760, one or more operating systems 1770, as well as other memory storage capabilities (not shown). The memory 1740 may comprise multiple physical memory devices, such as flash, DRAM, SRAM, optical storage, and/or other memory or storage technologies.

The memory 1740 may hold data and program instructions, for example instructions for performing operations of the methods illustrated by FIGS. 6-11. Accordingly, as included in the memory 1740, the program module 1750 may include modules, such as described herein, to perform user terminal functions such as receiving and responding to redirection requests, detecting failures to access targets, such as redirection targets, accessing fallback targets, performing RAU and TAU procedures, performing CS setup procedures, and/or performing other functions as are described herein. Program modules 1750 may be configured to perform these various functions in conjunction with processor modules 1730, receiver and transmitter modules 1720, and/or other modules (not shown). Data 1760 may include data associated with execution of program modules 1750, which may be implemented by or in conjunction with operation system(s) 1770.

Figure 18:
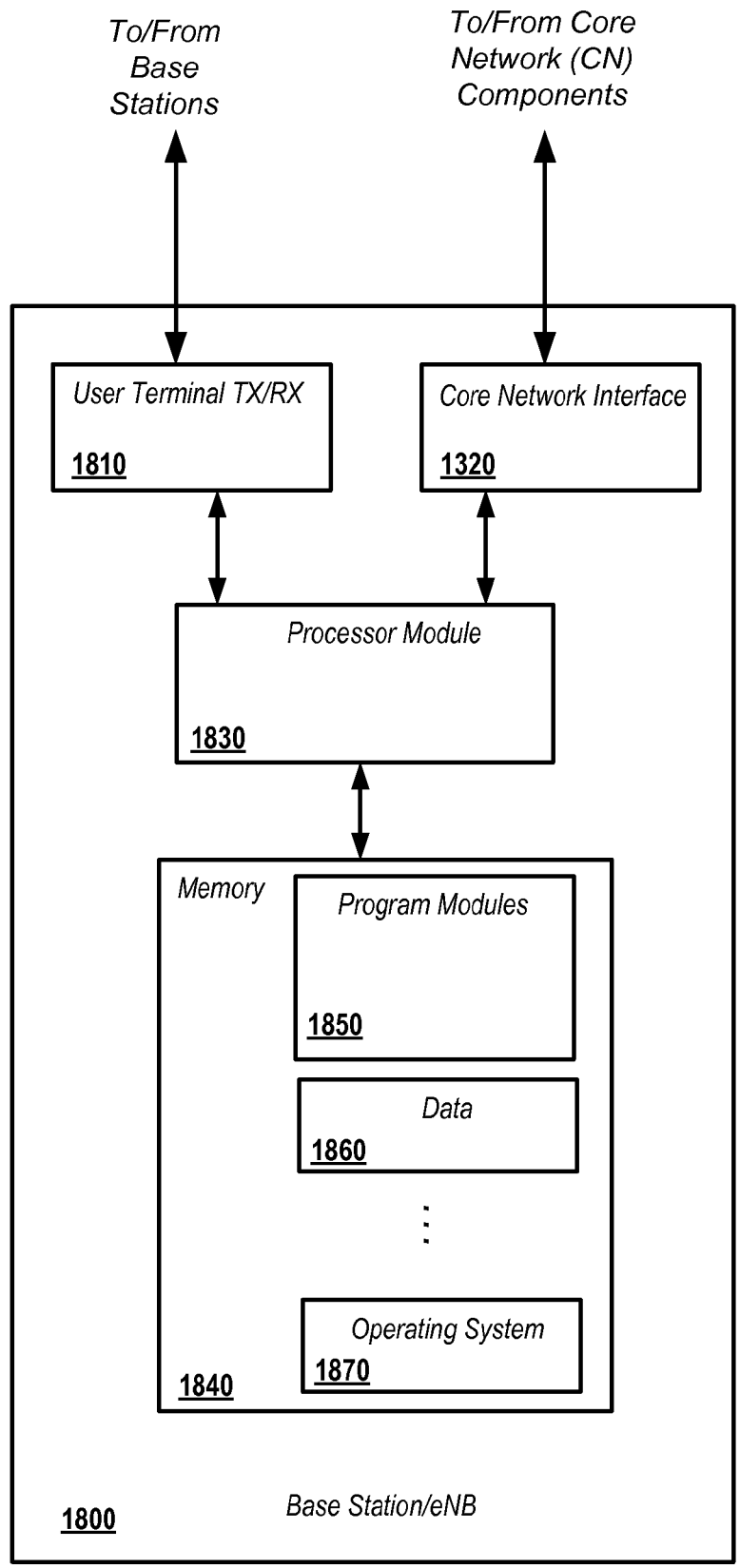
FIG. 18 illustrates details of an embodiment of a base station.

FIG. 18 illustrates additional details of an embodiment of a communications apparatus 1800, which may be a base station, such as an eNB as described herein. Apparatus 1800 may include transmit and receive modules 1810 (collectively shown as a transceiver module 1810, for communicating with served nodes such as user terminals or UEs. Apparatus 1800 may also include one or more Core Network (CN) interface modules 1820 configured to communicate with core network components, such as MMEs, SGWs, etc. Apparatus 1800 may include one or more processor modules 1830 which may be configured to implement the processing associated with base stations/eNBs as described herein. Apparatus 1800 may also include a memory 1840, which may include program modules 1850, data 1860, one or more operating systems 1870, as well as other memory storage capabilities (not shown). The memory 1840 may comprise multiple physical memory devices, such as flash, DRAM, SRAM, optical storage, and/or other memory or storage technologies.

Program module 1850 may include modules, such as described herein, to perform base station functions such as responding to CS call requests, coordination and providing redirection requests, coordination PS suspension with other network components, such as MMEs, SGWs, etc., as well as performing other base station functions such as are described herein. Program modules 1850 may be configured to perform these various functions in conjunction with processor module(s) 1830, transceiver modules 1810, core network modules 1820, and/or other modules (not shown). Data 1860 may include data associated with execution of program modules 1850, which may be implemented by or in conjunction with operation system(s) 1870.

Figure 19:
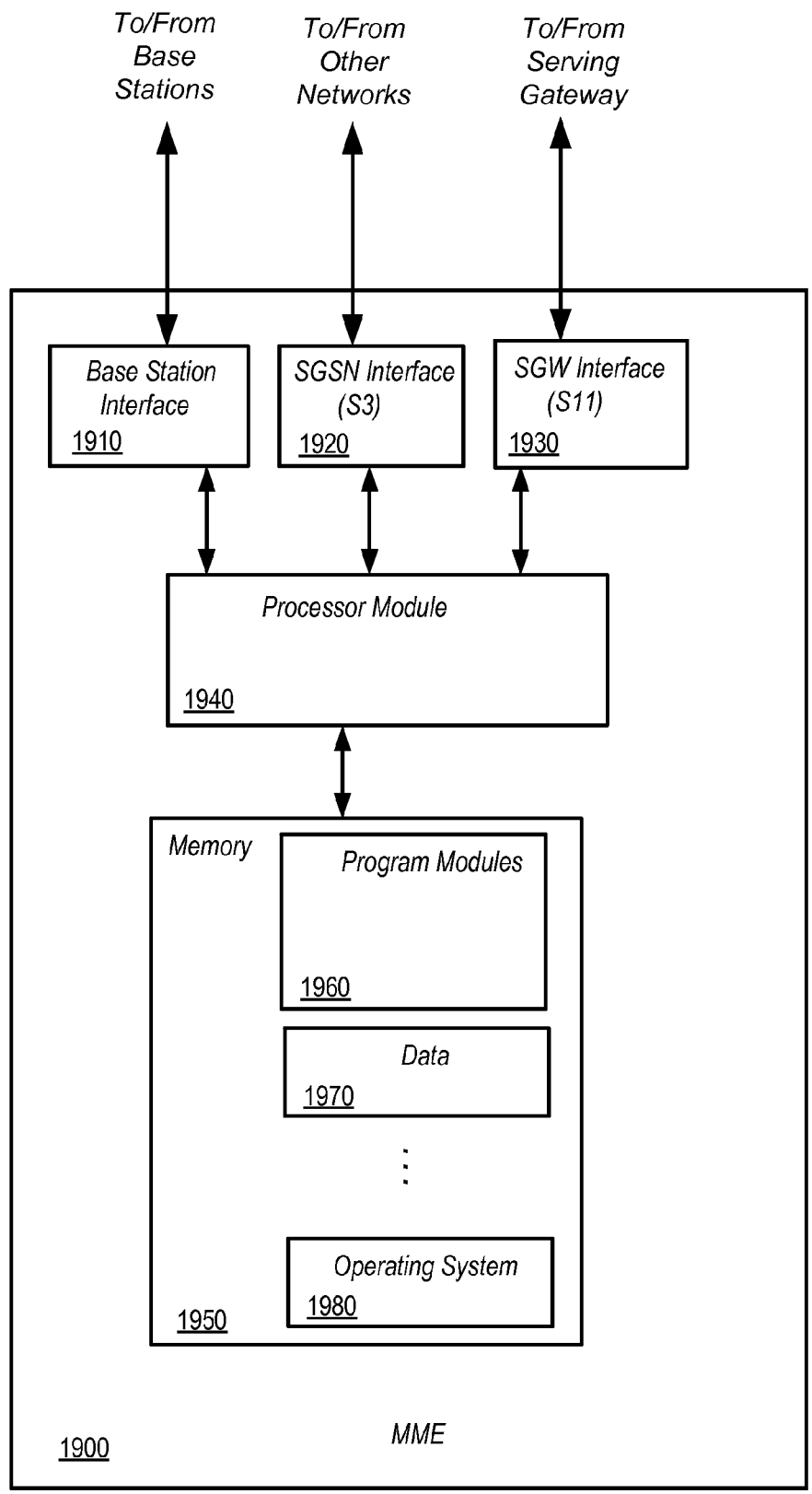
FIG. 19 illustrates details of an embodiment of a Mobility Management Entity (MME).

FIG. 19 illustrates additional details of an embodiment of a communications apparatus 1900, which may be a Mobility Management Entity (MME) as described herein. Apparatus 1900 may include one or more base station interface modules 1910 configured to communicate directly or indirectly with associated base stations. Apparatus 1900 may also include one or more SGSN interface modules configured to communicate with CN components of other networks, such as shown in FIG. 5, which may be implemented using an S3 interface. Apparatus 1900 may also include an SGW interface 1930 for communicating with an associated SGW, such as shown in FIG. 5. Interfaces 1910, 1920, and/or 1930 may be logical interfaces comprising one or more physical interfaces or connections, and may be connected to or coupled with or integrated with one or more processor modules 1940. Processor module(s) 1930 may be configured to implement the processing associated with MMEs as described herein. Apparatus 1900 may also include a memory 1950, which may include program modules 1960, data 1970, one or more operating systems 1980, as well as other memory storage capabilities (not shown). The memory 1950 may comprise multiple physical memory devices, such as flash, DRAM, SRAM, optical storage, and/or other memory or storage technologies. The memory 1950 may hold data and program instructions, for example instructions for performing operations of the methods illustrated by FIGS. 12-15.

Accordingly, as included in the memory 1950, program module 1960 may include modules, such as described herein, to perform MME functions, such as communicating with base stations/eNBs to facilitate redirection of user terminals, to determine whether to perform PS suspension based on, for example, an ISR status, and/or to perform other MME functionality as described herein. Program modules 1960 may be configured to perform these various functions in conjunction with processor module(s) 1940 and/or interface modules 1910, 1920, and 1930. Data 1970 may include data associated with execution of program modules 1960, which may be implemented by or in conjunction with operation system(s) 1980.

CALL FLOW EXAMPLES

Some additional example implementation details in accordance with exemplary embodiments and various aspects are further described below. In the section below, a user terminal may be referred to as a mobile station (MS). Procedures relating to suspending and resuming packet service as detailed may assist the reader in better understanding the methodologies, apparatus and means described above.

Suspend and Resume Procedure (A/Gb Mode)

Figure 20:
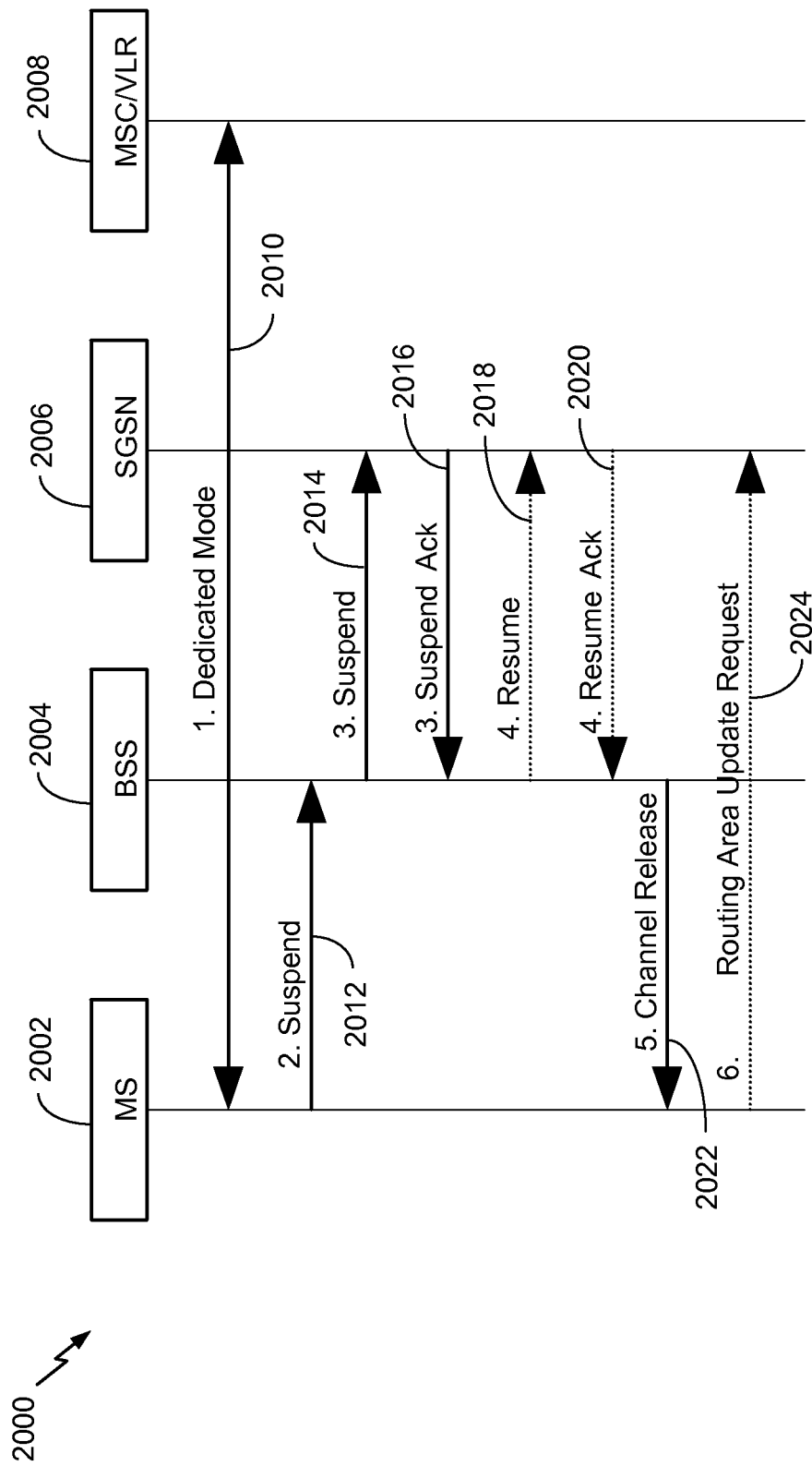
FIGS. 20-23 illustrate examples of call flows for suspend and resume procedures between network entities.

In the following procedures, when a suspended MS is resumed, the MS may either deactivate the Packet Data Protocol (PDP) context of streaming or conversational traffic class, or the MS may modify the PDP context of streaming or conversational traffic class to reset the maximum bit rate to a proper value. An example of a "Suspend and Resume" procedure 2000 for intra-SGSN is illustrated in FIG. 20. The procedure may apply to an MS mode of operation when the MS is connected to the CN via GERAN via the A and/or Gb interfaces. The procedure 2000 may involve an MS 2002, Base Station Server (BSS) 2004, SGSN 2006, and a Mobile Switching Center (MSC) with Visitor Location Register (VLR) 2008.

At 2010, the MS may enter dedicated mode, in which the MS or the network limitations make it unable to support a dual transfer mode of operation, or during CS connection, a DTM MS performs handover from a cell supporting DTM to a cell not supporting DTM.

At 2012, the MS may send a Radio Resource (RR) Suspend message to the BSS. A Temporary Logical Link Identifier (TLLI) and Routing Area Identifier (RAT) may be derived according to a known Routing Area. Update procedure. The BSS may terminate any ongoing GPRS traffic for this TLLI.

At 2014, the BSS may send a Suspend (TLLI, RAI) message to the SGSN, and the SGSN may acknowledge by returning Suspend Ack at 2016. The BSS may store TLLI and RAI in order to be able to request the SGSN to resume GPRS services when the MS leaves dedicated mode.

Eventually, the BSS may determine that the conditions for the GPRS suspension have disappeared. If the BSS is able to request the SGSN to resume GPRS services, at 2016, the BSS may send a Resume (TLLI, RAI) message to the SGSN. At 2020, the SGSN may acknowledge the successful outcome of the resume by returning Resume Ack.

At 2022, if the circuit switched radio channel is to be released, the BSS may send an RR Channel Release (Resume) message to the MS. The Resume message indicates whether the BSS has successfully requested the SGSN to resume GPRS services for the MS, i.e., whether Resume Ack was received in the BSS before the RR Channel Release message was transmitted. The MS may then leaves dedicated mode upon receiving the Channel Release message.

At 2024, the MS may resume GPRS services by sending a Routing Area Update Request message to the SGSN, in response to any of the following conditions being true: (a) if the BSS did not successfully request the SGSN to resume GPRS services; (b) if the RR Channel Release message was not received before the MS left dedicated mode; or (c) if the MS locally determines that the conditions for the GPRS suspension have disappeared. In the alternative, a different update type may be used depending on the mode of operation of the network in use, for example a combined RA/LA updating procedure.

The full handling of suspended MSs in the BSS and the SGSN is implementation dependent. Typically, the SGSN should not page suspended MSs. If the MS performs an inter-Base Station Controller (BSC) handover while suspended, the TLLI and RAI may be transferred as BSC-to-BSC information in the Handover Required and Handover Request messages, for example, as described in TS 48.008. This allows the new BSC to initiate the Resume request procedure to the SGSN. If the BSC-to-BSC information was not transferred or not understood, the MS may not receive an indication that resumption has been successful, and may resume GPRS services by initiating a Routing Area Update or combined RA/LA updating procedure.

Inter-SGSN Suspend and Resume Procedure

Figure 21:
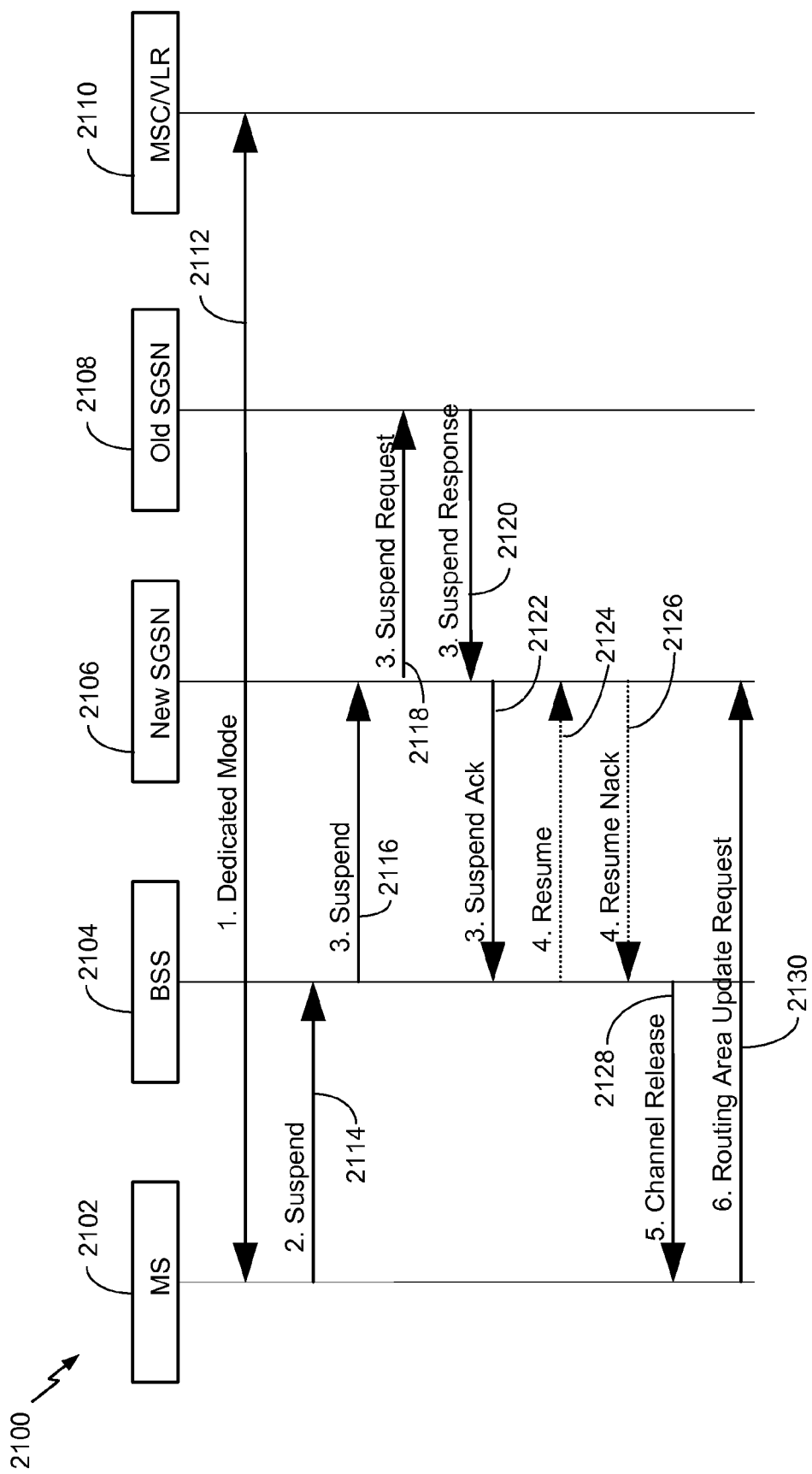

An example of a Suspend and Resume procedure 2100 for inter-SGSN is illustrated in FIG. 21. This describes the scenario where the old cell and the new cell are handled by different SGSN's, e.g., the suspend message is received in an SGSN that is different from the SGSN currently handling the packet data transmission. The procedure 2100 may involve an MS 2102, BSS 2104, New SGSN 2106, old SGSN 2108, and an MSCNLR 2110.

At 2112, during CS connection, a DTM MS performs handover from a cell supporting DTM to a cell not supporting DTM. At 2114, the MS sends an RR Suspend (TLLI, RAI) message to the BSS. The TLLI and RAI may be derived in same way as known in Routing Area Update procedure.

At 2116, the BSS sends a Suspend (TLLI, RAI) message to the SGSN. Since the SGSN that receives the Suspend message is not the one currently handling the packet data transmission, an indication to perform suspend may be sent to the old SGSN by means of a SUSPEND REQUEST message on the Gn interface, as indicated at 2118. The address of the old SGSN may be derived by "old RAI" received in the Suspend message. If the SGSN that receives the Suspend message provides functionality for Intra Domain Connection of RAN Nodes to Multiple CN Nodes, the SGSN that receives the Suspend message from the BSS may derive the old SGSN from the old RAI and the old TLLI and send the Suspend Request message to this old SGSN. Otherwise, the SGSN that receives the Suspend message from the BSS derives the old SGSN from the old RAI. In any case the SGSN that receives the Suspend message from the BSS may derive an SGSN that it believes is the old SGSN. This derived SGSN may itself be the old SGSN, or it may be associated with the same pool area as the actual old SGSN and therefore the SGSN may determine the correct old SGSN from the TLLI and relay the Suspend Request message to that actual old SGSN.

At 2120, the Old SGSN returns a SUSPEND RESPONSE. At 2122, the new SGSN then returns Suspend Ack to the BSS.

At 2124, after CS connection is terminated, the BSS may send a Resume (TLLI, RAI) message to the new SGSN, but since resume is not needed against the old SGSN, at 2126 the new SGSN may acknowledge the resume by sending a Resume Nack message. Resume may not be needed against the old SGSN since the MS in this case should perform an RA Update for updating of GPRS services when the CS connection is terminated and the MM context may be moved from the old to the new SGSN.

At 2128, the BSS sends an RR Channel Release message to the MS, indicating that the BSS has not successfully requested the SGSN to resume GPRS services for the MS. The MS leaves dedicated mode. At 2130, the MS may resume GPRS services by sending a Routing Area Update Request message or combined RA/LA update message to the SGSN.

Intra-SGSN System Suspend and Resume Procedure

Figure 22:
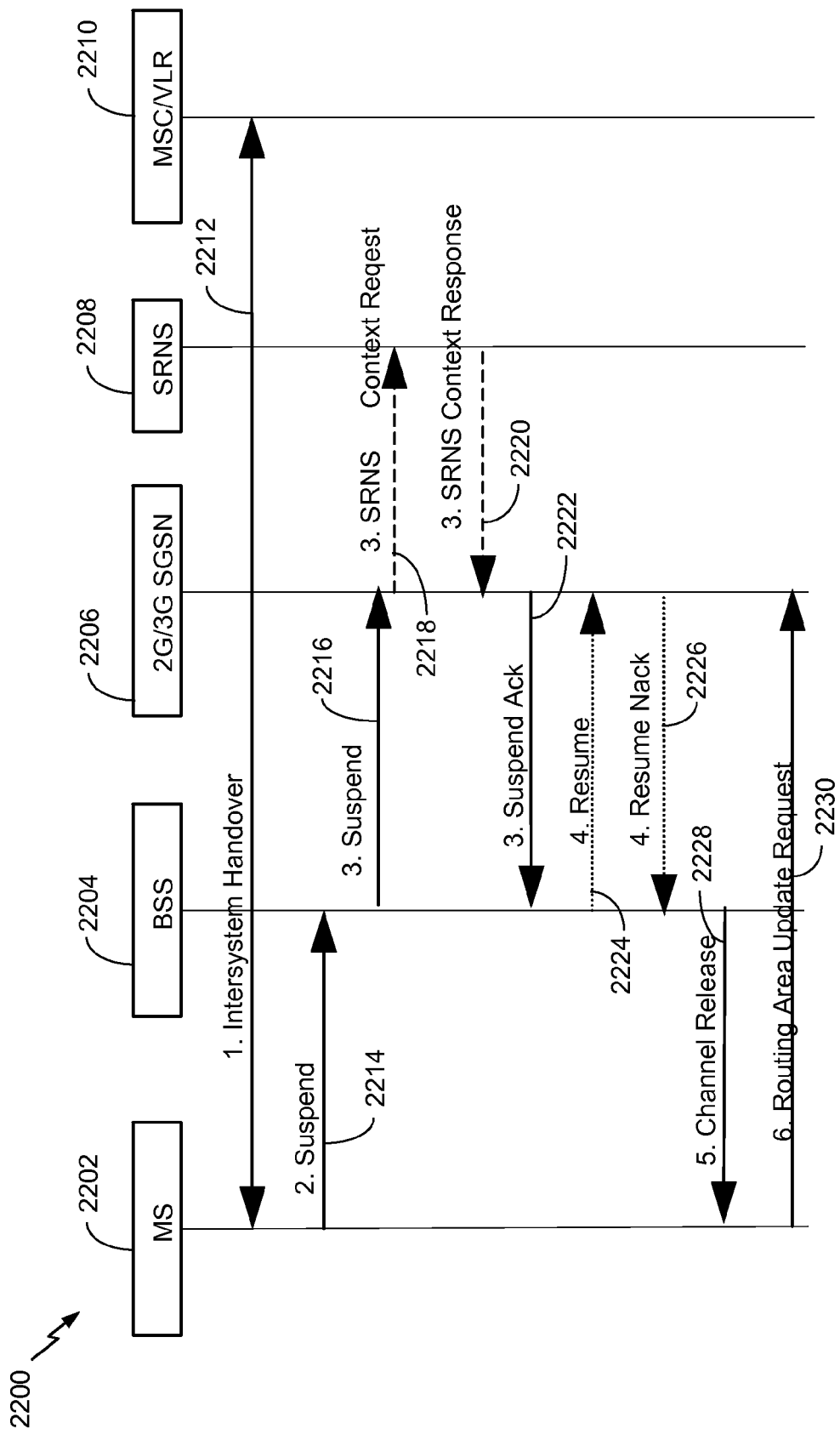

An example of a Suspend and Resume procedure 2200 for intra-SGSN is illustrated in FIG. 22. The procedure 2200 may involve an MS 2202, BSS 2204, 2G/3G SGSN 2206, a Serving Radio Network Subsystem (SRNS) 2208, and an MSC/VLR 2210.

At 2212, during CS connection, the MS performs handover from Iu mode to A/Gb mode, and the MS or the network limitations may be unable to support CS/PS mode of operation.

At 2214, the MS sends an RR Suspend (TLLI, RAI) message to the BSS. The TLLI and RAI may be derived as known in Routing Area Update procedures. At 2216, the BSS sends a Suspend (TLLI, RAI) message to the SGSN. At 2218, the SGSN may request the SRNS to stop sending downlink PDU's by the SRNS Context Request message. The SRNS then starts buffering the downlink PDUs. At 2220, the SRNS responds with an SRNS Context Response message. At 2222, the SGSN then returns Suspend Ack to the BSS.

At 2224, after CS connection is terminated, the BSS may send a Resume (TLLI, RAI) message to the SGSN. At 2226, resume is not possible since the MS has changed the radio system, so the SGSN acknowledges the resume by sending a Resume Nack message.

At 2228, the BSS sends an RR Channel Release message to the MS, indicating that the BSS has not successfully requested the SGSN to resume GPRS services for the MS. At 2230, the MS may resume GPRS services by sending a Routing Area Update Request message or combined RA/LA update message to the SGSN.

Alternative Inter-SGSN Suspend and Resume Procedure

Figure 23:
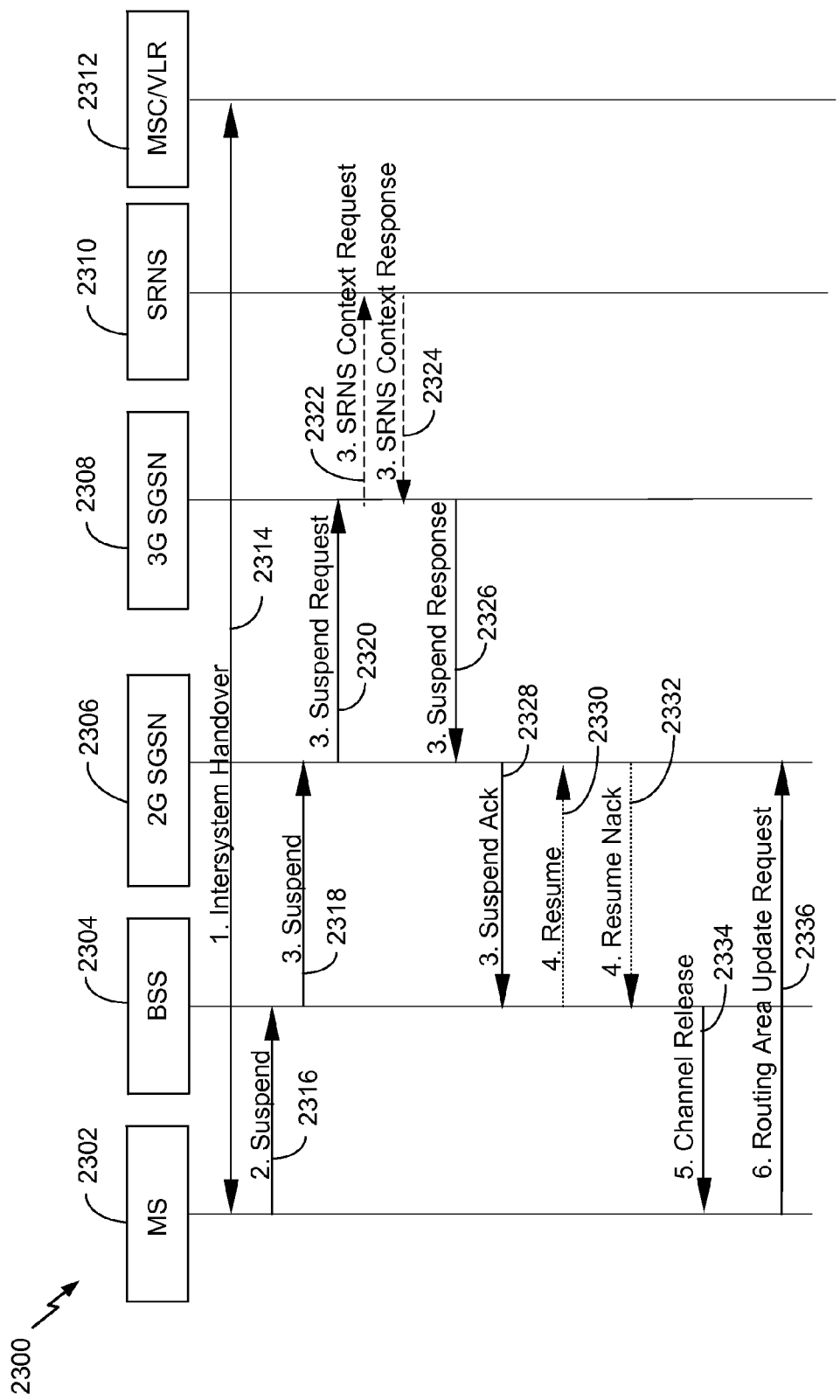

An alternative Suspend and Resume procedure 2300 for inter SGSN is illustrated in FIG. 23. The procedure 2300 may apply the suspend message is received in an SGSN that is different from the SGSN currently handling the packet data transmission. The procedure 2300 should be valid when the MS performs inter-system handover from Iu mode to A/Gb mode during CS connection and the SGSN handling the A/Gb mode cell is different from the SGSN handling the Iu mode cell, for example, when the 2G and 3G SGSNs are separated. The procedure 2300 may involve an MS 2302, BSS 2304, 2G SGSN 2306, 3G SGSN 2308, SRNS 2310, and an MSC/VLR 2312.

At 2314, during CS connection, the MS performs handover from Iu mode to A/Gb mode, and the MS or the network limitations make it unable to support CS/PS mode of operation. At 2316, the MS sends an RR Suspend (TLLI, RAI) message to the BSS. The TLLI and RAI may be derived as known in Routing Area Update procedures.

At 2318, the BSS sends a Suspend (TLLI, RAI) message to the SGSN. At 2320, since the SGSN that receives the Suspend message is not the one currently handling the packet data transmission, an indication to perform suspend may be sent to the 3G SGSN 2308 by means of a SUSPEND REQUEST message on the Gn interface. The address of the old SGSN 2306 may be derived by "old RAI" received in the Suspend message. If the SGSN that receives the Suspend message provides functionality for Intra Domain Connection of RAN Nodes to Multiple CN Nodes, the SGSN that receives the Suspend message from the BSS may derive the old SGSN from the old RAI and the old TLLI and send the Suspend Request message to this old SGSN. Otherwise, the SGSN that receives the Suspend message from the BSS derives the old SGSN from the old RAI. In any case the SGSN that receives the Suspend message from the BSS may derive an SGSN that it believes is the old SGSN. This derived SGSN may be itself the old SGSN, or may be associated with the same pool area as the actual old SGSN. Accordingly, the SGSN 2306 may determine the correct old SGSN from the TLLI and relay the Suspend Request message 2320 to that actual old SGSN.

At 2322, the 3G SGSN may request the SRNS to stop sending downlink PDU's by the SRNS Context Request message. Upon reception of the SRNS Context Request message, the SRNS starts buffering the downlink PDUs. At 2324, the SRNS responds with an SRNS Context Response message.

At 2326, the 3G SGSN returns a suspend response message to the 2G SGSN 2306. At 2328, the 2G SGSN 2306 then returns a Suspend Ack message to the BSS. At 2330, after CS connection is terminated, the BSS may send a Resume (TLLI, RAI) message to the 2G SGSN, but since resume is not needed against the 3G SGSN the 2G SGSN acknowledges the resume by sending a Resume Nack message at 2332. Resume is not needed in this case since the MS may perform an RA Update for updating of GPRS services when the CS connection is terminated and the MM context may be moved from 3G to 2G SGSN.

At 2334, the BSS sends an RR Channel Release message to the MS, indicating that the BSS has not successfully requested the SGSN to resume GPRS services for the MS. At 2336, the MS may resume GPRS services by sending a Routing Area Update Request message or combined RA/LA update message to the SGSN 2306.

Mobile Originating Call in Active Mode—No PS HO Support

Figure 24:
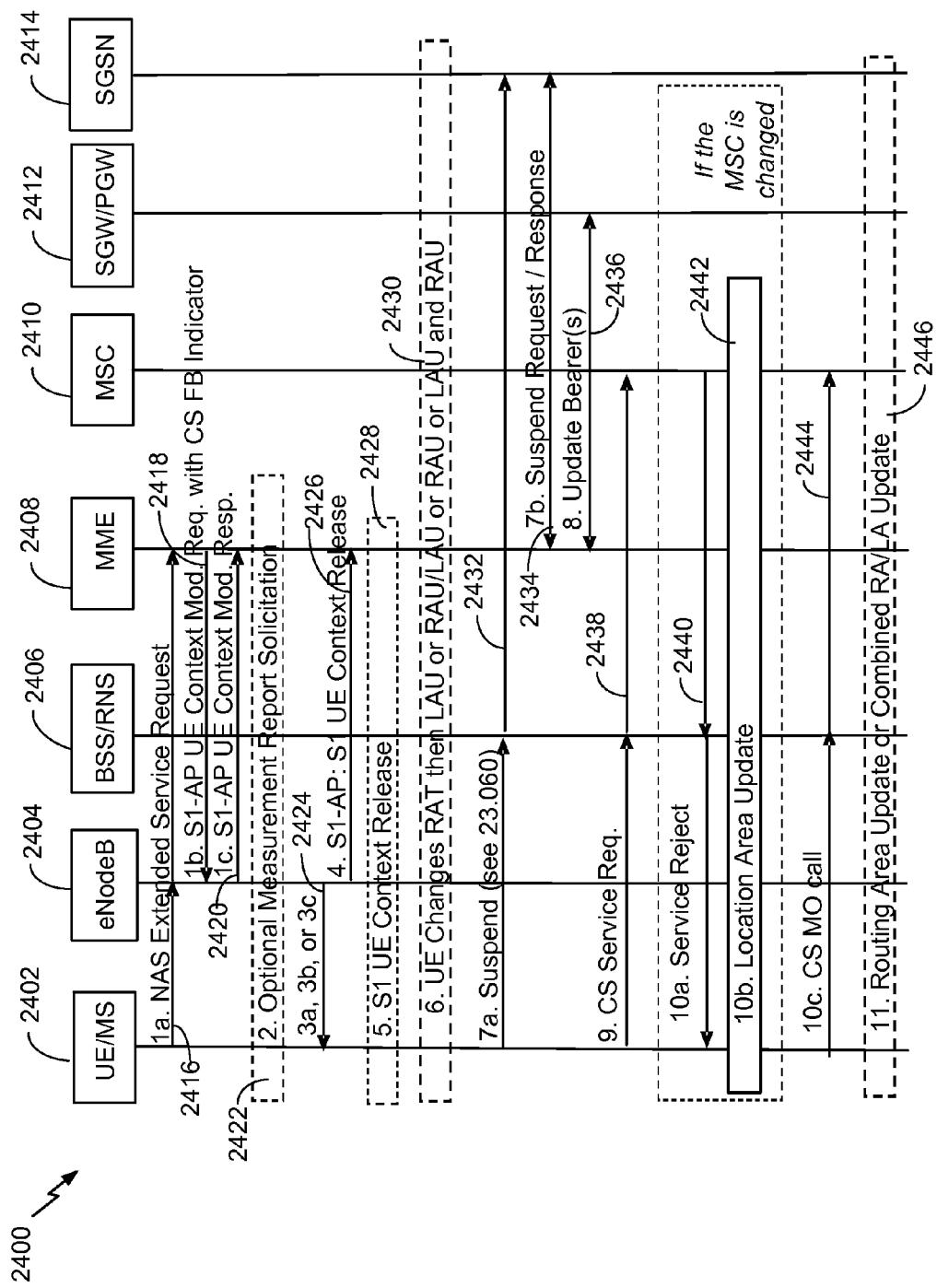
FIG. 24 illustrates an example of a call flow for a CS call request and related details.

The procedure 2400 shown in FIG. 24 may be executed when PS handover (HO) is not supported, in the normal case, for originating a call in a multimode environment. MME. The procedure 2400 may involve an MS 2402, eNB 2404, BSS/Radio Network Server (RNS) 2406, MME 2408, MSC 2410, SGW/PGW 2412, and SGSN 2414.

At 2416, the UE sends an Extended Service Request (CS Fallback Indicator) to the MME. The extended Service Request message may be encapsulated in RRC and S1-AP messages. A CS Fallback Indicator may indicate that the MME should perform CS Fallback. The UE may only transmit this request if it is attached to CS domain (with a combined EPS/IMSI Attach) and can not initiate an IMS voice session, for example if the UE is not IMS registered or IMS voice services are not supported by the serving IP-CAN, home PLMN or UE.

At 2418, the MME sends an S1-AP UE Context Modification Request message to eNB that includes a CS Fallback Indicator. This message indicates to the eNB that the UE should be moved to UTRAN/GERAN. If MME determines the CS Fallback procedure needs priority handling based on MPS CS Priority in the UE's EPS subscription, it sets a priority indication, i.e. "CSFB High Priority", in the S1AP message to the eNB, for example, as specified in TS 36.413. At 2420, the eNB may reply with a S1-AP UE Context Modification Response message.

At 2422, the eNodeB may optionally solicit a measurement report from the UE to determine the target GERAN/UTRAN cell to which the redirection procedure may be performed.

At 2424, the network may perform one of steps 3a or 3b or 3c, as follows. (3a) If the UE and network support inter-RAT cell change order to GERAN and the target cell is GERAN, the eNodeB may trigger an inter-RAT cell change order (optionally with NACC) to a GERAN neighbour cell by sending an RRC message to the UE. The inter-RAT cell change order may contain a CS Fallback Indicator which indicates to UE that the cell change order is triggered due to a CS fallback request. If the inter-RAT cell change order contains a CS Fallback Indicator and the UE fails to establish connection to the target RAT, then the UE considers that CS fallback has failed. Service Request procedure is considered to be successfully completed when cell change order procedure is completed successfully. (3b) If the UE or the network does not support inter-RAT PS handover from E-UTRAN to GERAN/UTRAN nor inter-RAT cell change order to GERAN or the network does not wish to use these procedures, the eNodeB may trigger RRC connection release with redirection to GERAN or UTRAN. (3c) If the UE and network support "RRC connection release with redirection and Multi Cell System Information to GERAN/UTRAN," the eNodeB may trigger RRC connection release with redirection to GERAN or UTRAN and include one or more physical cell identities and their associated System Information. A Service Request procedure supervision timer should be sufficiently long considering the optional measurement reporting at 2422.

At 2426, the eNodeB may send an S1-AP UE Context Release Request message to the MME. If the target cell is GERAN and either the target cell or the UE does not support DTM the message includes an indication that the UE is not available for the PS service.

At 2428, the MME releases the UE Context in the eNodeB as well as all eNodeB related information in the S-GW, for example, as specified in TS 23.401. In case a cause indicates that RRC was released due to abnormal conditions, e.g. radio link failure, the MME suspends the EPS bearers (2436).

At 2430, the UE may perform one of steps 6a or 6b or 6c, and THEN performs step 6d. Step 6a may be performed if step 3a, Cell Change Order to GERAN, was performed. In 6a, the UE moves to the new cell in GERAN. The UE uses the NACC information and/or receives the broadcast System Information and when it has all of the necessary information to access the GERAN cell, establishes a radio signalling connection. Step 6b may be performed if step 3b, RRC release with redirection, was performed. In 6b, the UE moves to the target RAT, identifies a suitable cell preferably of the same PLMN as received in LAI IE of combined EPS/IMSI Attach/TAU Accept message, receives the broadcast System Information and when it has the necessary information to access GERAN/UTRAN, establishes a radio signalling connection. Step 6c may be performed if step 3c, RRC connection release with redirection and Multi Cell System Information, was performed. In 6c, the UE moves to the target RAT and identifies a suitable cell preferably of the same PLMN as received in LAI IE of combined EPS/IMSI Attach/TAU Accept message. The UE uses the NACC information and/or receives the broadcast System Information and when it has all of the necessary information to access GERAN/UTRAN, the UE establishes the radio signalling connection. In a step 6d, when the UE arrives at the target cell, if target RAT is UTRAN: The UE may establish the radio signalling connection by sending an RRC Initial Direct Transfer message, for example as specified in TS 25.331, that contains a NAS message. The CN Domain Indicator is set to "CS" in the Initial Direct Transfer message. If target RAT is GERAN A/Gb mode, the UE may establish a radio signalling connection by using the procedures as specified, for example, in TS 44.018. For example, the UE may request and be assigned a dedicated channel where it sends a Set Asynchronous Balanced Mode (SABM) containing a Non-Access Stratum (NAS) message to the BSS and the BSS responds by sending a UA. Upon receiving the SABM (containing the NAS message) the BSS sends a COMPLETE LAYER 3 INFORMATION message (containing the NAS message) to the MSC which indicates CS resources have been allocated in the GERAN cell. After the establishment of the main signalling link, for example as described in TS 44.018, the UE enters either Dual Transfer Mode or Dedicated Mode.

If the LA of the new cell is different from the one stored in the UE, the UE may initiate a Location Area Update or a Combined RA/LA Update procedure, for example as specified in TS 23.060 for the different Network Modes of Operation (NMO). The UE should set the "follow-on request" flag in the LAU Request in order to indicate to the MSC not to release the Iu/A connection after the LAU procedure is complete. Further the UE performs any Routing Area Update procedure, for example as specified by TS 23.060. In NMO I a CSFB UE may perform separate LAU with "follow-on request" flag and RAU procedures instead of a Combined RA/LA Update procedure to speed up the CSFB procedure.

If the UE could not camp onto the network indicated cell or carriers in any one of steps 3*a*, 3*b* or 3*c*, the UE autonomously reselects cell of different RAT or carrier. In this case, if the UE supports DTM and ISR is not active, the UE should perform RAU or combined RA/LA update. If the finally camped RAT is UTRAN NMO II or DTM GERAN NMO II/III, the RAU and CS NAS procedure can be performed in parallel. Otherwise, the UE should perform RAU or combined RA/LA update prior to any CS NAS procedures.

At 2432, if the target RAT is GERAN and DTM is not supported, the UE starts the Suspend procedure, for example as specified in TS 23.060, clause 16.2.1.1.2. This triggers the SGSN to send a Suspend Request message to the MME. The MME returns a Suspend Response to the SGSN even though the GUTI cannot be derived from the P-TMSI and RAI pair.

At 2434, if the S1-AP UE Context Release Request message received from the eNodeB at 2426 indicates that the UE is not available for the PS service in the target cell and ISR is not active, the MME deactivates GBR bearers towards S-GW and P-GW(s) by initiating MME-initiated Dedicated Bearer Deactivation procedure, for example as specified in TS 23.401, and starts the preservation and suspension of non-GBR bearers by sending Suspend Notification message to the S-GW. The S-GW releases all eNodeB related information (address and TEIDs) for the UE, and sends Suspend Notification message to the P-GW(s). The MME stores in the UE context that UE is suspended status. All the preserved non-GBR bearers are marked as suspended status in the S-GW and P-GW(s). The P-GW should discard packets if received for the suspended UE. Updating the bearers at 2436 cannot be triggered by the Suspend procedure since the full GUTI can not be derived from the P-TMSI and RAI included in the Suspend Request message.

At 2438, the UE continues with the MO call setup procedure with sending CS Service Request. At 2440, if the UE is not registered in the MSC serving the 2G/3G cell or the UE is not allowed in the LA, the MSC should reject the service request, if implicit location update is not performed. At 2442, a UE detecting that the MSC rejected the service request may perform the Location Area Update or a Combined RA/LA procedure according to existing GERAN or UTRAN procedures, for example as specified in TS 23.060, for the different Network Modes of Operation (NMO). At 2444, the UE may initiate the CS call establishment procedure.

At 2446, after the CS voice call is terminated and if the UE is in GERAN and PS services are suspended, then the UE may resume PS services, for example as specified in TS 23.060. A Gn/Gp SGSN may follow procedures, for example as provided in TS 23.060, to resume the PDP Context(s). An S4 SGSN may follow procedures, for example as provided in TS 23.060, to resume the bearers, and informs the S-GW and P-GW(s) to resume the suspended bearers. If the UE has returned to E-UTRAN after the CS voice call was terminated, then the UE should resume PS service by sending TAU to MME. The MME may in addition inform S-GW and P-GW(s) to resume the suspended bearers. Resuming the suspended bearers in the S-GW and in the P-GW should be done by implicit resume using the Modify Bearer request message if it is triggered by the procedure in operation, e.g. RAU, TAU or Service Request. The S-GW is aware of the suspend state of the bearers and may forward the Modify Bearer request to the P-GW. Explicit resume using the Resume Notification message should be used in cases when Modify Bearer Request is not triggered by the procedure in operation. If the UE remains on UTRAN/GERAN after the CS voice call is terminated the UE performs normal mobility management procedures, for example as defined in TS 23.060 and TS 24.008.

Mobile Originating Call in Idle Mode

A Mobile Originating call in Idle Mode procedure may be specified by reusing the Mobile Originating Call in Active mode procedure with Extended Service Request (CS Fallback Indicator) to the MME where the messages S1 AP UE Context Modification Request and Response are replaced by S1 AP Initial UE Context Request and Response. The UE may be transited to ECM-CONNECTED mode, for example, by following the applicable procedures specified in TS 23.401.

If the UE is service user with subscription to CS domain priority service, the UE may set the RRC establishment cause to "HighPriorityAccess" based on the access class, for example as specified in TS 36.331. If the network supports a priority call handling, the MME determines that the Extended Service Request requires priority handling of CS Fallback based on the "HighPriorityAccess" establishment cause forwarded by eNB to the MME and/or MPS CS Priority in the UE's EPS subscription. According to operator policy, the MME may use MPS CS Priority in the UE's EPS subscription to verify the priority handling of the CS Fallback procedure.

If MME decides to perform CS Fallback with priority, it sets priority indication, i.e. "CSFB High Priority", in the S1 AP Initial UE Context Request message to the eNodeB, for example as specified in TS 36.413. The eNodeB allocates radio bearer resources to the UE preferentially compared to other normal calls.

Mobile Terminating Call in Active Mode—No PS HO Support

Figure 25:
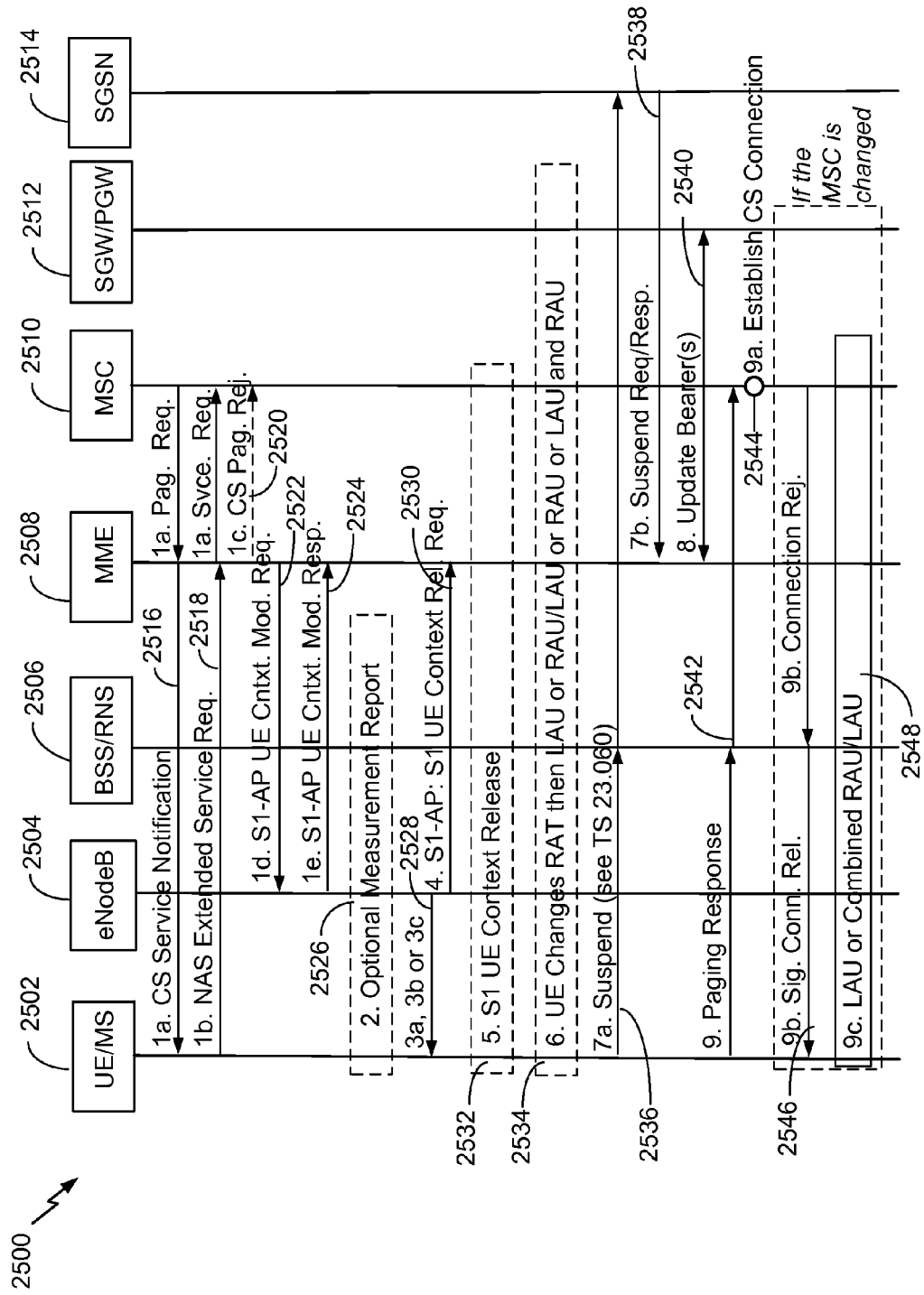
FIG. 25 illustrates an example of a call flow for a CS page and related details.

The procedure 2500 as shown in FIG. 25 may be executed when PS HO is not supported, in the normal case. The procedure 2500 may involve an MS 2502, eNB 2504, BSS/RNS 2506, MME 2508, MSC 2510, SGW/PGW 2512, and SGSN 2514.

At 2516, the MSC receives an incoming voice call and responds by sending a Paging Request (IMSI or TMSI, optional Caller Line Identification and Connection Management information, priority indication) to the MME over a SGs interface. The MSC only sends a CS Page for an UE that provides location update information using the SGs interface. In active mode the MME has an established S1 connection and if the MME did not return the "SMS-only" indication to the UE during Attach or Combined TA/LA Update procedures, the MME reuses the existing connection to relay the CS Service Notification to the UE.

If the MME returned the "SMS-only" indication to the UE during Attach or Combined TA/LA Update procedures, the MME may not send the CS Page to the UE and send CS Paging Reject towards MSC to stop CS Paging procedure, and this CSFB procedure stops. The eNB may forward the paging message to the UE. The message contains CN Domain indicator and, if received from the MSC, the Caller Line Identification.

The MME may immediately send the SGs Service Request message to the MSC containing an indication that the UE was in connected mode. The MSC uses this connected mode indication to start the Call Forwarding on No Reply timer for that UE and the MSC should send an indication of user alerting to the calling party. Receipt of the SGs Service Request message stops the MSC retransmitting the SGs interface Paging message. A pre-configured policy may be used by UE to avoid being disturbed without Caller Line Identification display and the detailed handling is to be decided by CT WG1 and CT WG6. This procedure may also take place immediately after MSC receives MAP PRN from HSS, if pre-paging is deployed. Caller Line Identification is also provided in the case of pre-paging. If the MME receives paging request message with priority indication, e.g. eMLPP priority, from the MSC, then the MME processes this message and also the subsequent CS fallback procedure preferentially compared to other normal procedures.

At 2518, the UE may send an Extended Service Request (CS Fallback Indicator, Reject or Accept) message to the MME. The Extended Service Request message is encapsulated in RRC and S1-AP messages. CS Fallback Indicator indicates MME to perform CS Fallback. The UE may decide to reject CSFB based on Caller Line Identification.

At 2520, upon receiving the Extended Service Request (CSFB, Reject), the MME sends Paging Reject towards MSC to stop CS Paging procedure and this CSFB procedure stops.

At 2522, the MME sends an S1-AP UE Context Modification Request message to eNodeB that includes a CS Fallback Indicator. This message indicates to the eNB that the UE should be moved to UTRAN/GERAN. If MME received priority indication in Step 1*a*, the MME sends S1-AP UE Context Modification Request message to the eNodeB with priority indication, i.e. "CSFB High Priority", for example as specified in TS 36.413. At 2524, the eNB may reply with S1-AP UE Context Modification Response message. At 2526, the eNodeB may optionally solicit a measurement report from the UE to determine the target GERAN/UTRAN cell to which the redirection procedure may be performed.

At 2528, the network performs one of steps 3*a* or 3*b* or 3*c*. In 3*a*, if the UE and network support inter-RAT cell change order to GERAN and the target cell is GERAN, The eNodeB may trigger an inter-RAT cell change order (optionally with NACC) to a GERAN neighbour cell by sending an RRC message to the UE. The inter-RAT cell change order may contain a CS Fallback Indicator which indicates to UE that the cell change order is triggered due to a CS fallback request. If the inter-RAT cell change order contains a CS Fallback Indicator and the UE fails to establish connection to the target RAT, then the UE considers that CS fallback has failed. Service Request procedure is considered to be successfully completed when cell change order procedure is completed successfully. In 3*b*, if the UE or the network does not support inter-RAT PS handover from E-UTRAN to GERAN/UTRAN nor inter-RAT cell change order to GERAN, the eNodeB can trigger RRC connection release with redirection to GERAN or UTRAN instead of PS HO or NACC. In 3*c*, if the UE and network support "RRC connection release with redirection and Multi Cell System Information to GERAN/UTRAN," the eNodeB can trigger RRC connection release with redirection to GERAN or UTRAN and include one or more physical cell identities and their associated System Information. The Service Request procedure supervision timer should be sufficiently long considering the optional measurement reporting at 2526.

At 2530, the eNodeB sends an S1-AP UE Context Release Request message to the MME. If the target cell is GERAN and either the target cell or the UE does not support DTM the message includes an indication that the UE is not available for PS service.

At 2532, the MME releases the UE Context in the eNodeB as well as all eNodeB related information in the S-GW, for example as specified in TS 23.401. In case the Cause indicates that RRC was released due to abnormal conditions, e.g. radio link failure, the MME suspends the EPS bearers (2540).

At 2534, the UE may performs one of steps 6*a* or 6*b* or 6*c* and THEN perform step 6*d*. Step 6*a* should be performed if step 3*a*, Cell Change Order to GERAN, was performed. In 6*a*, the UE moves to the new cell in GERAN. The UE uses the NACC information and/or receives the broadcast System Information and when it has the necessary information to access the GERAN cell, establishes a radio signalling connection.

Step 6*b* should be performed if step 3*b*, RRC release with redirection, was performed. In 6*b*, the UE moves to the target RAT, identifies a suitable cell preferably of the same PLMN as received in LAI IE of combined EPS/IMSI Attach/TAU Accept message, receives the broadcast System Information and when it has the necessary information to access GERAN/UTRAN, establishes a radio signalling connection.

Step 6*c* should be performed if step 3*c*, RRC connection release with redirection and Multi Cell System Information, was performed. In 6*c*, the UE moves to the target RAT and identifies a suitable cell preferably of the same PLMN as received in LAI IE of combined EPS/IMSI Attach/TAU Accept message. The UE uses the NACC information and/or receives the broadcast System Information and when it has the necessary information to access GERAN/UTRAN, the UE establishes the radio signalling connection.

In 6*d*, if the LA of the new cell is different from the one stored in the UE, the UE should initiate a Location Area Update or a Combined RA/LA Update, for example as specified in TS 23.060 for the different Network Modes of Operation (NMO). The UE may set the "CSMT" flag in the LAU Request. The "CSMT" flag may be used to avoid missing MT call in roaming retry case. In NMO I, the UE in GERAN may perform LA update over the RR connection instead of combined RA/LA update over the packet access, for example as defined in TS 24.008, clause 4.7.5.2.5, unless enhanced CS establishment in DTM is supported. Further the UE may perform a suitable Routing Area Update procedure, for example as specified in TS 23.060. In NMO I a CSFB UE should perform LAU (and if it does so, should set the "CSMT" flag) and RAU procedures instead of a Combined RA/LA Update procedure to speed up the CSFB procedure. When the MSC receives a LA Update Request, it should check for pending terminating CS calls and, if the "CSMT" flag is set, maintain the CS signalling connection after the Location Area Update procedure for pending terminating CS calls. If the UE could not camp onto the network indicated cell or carriers in step 3, the UE may autonomously reselects cell of different RAT or carrier. In this case, if the UE supports DTM and ISR is not active, the UE should perform RAU or combined RA/LA update. If the finally camped RAT is UTRAN NMO II or DTM GERAN NMO II/III, the RAU and CS NAS procedure can be performed in parallel. Otherwise, the UE should perform RAU or combined RA/LA update prior to any CS NAS procedures.

At 2536, if the target RAT is GERAN and DTM is not supported, the UE starts the Suspend procedure, for example as specified in TS 23.060, clause 16.2.1.1.2. This triggers the SGSN to send a Suspend Request message to the MME. At 2538, the MME returns a Suspend Response to the SGSN even though GUTI cannot be derived from the P-TMSI and RAI pair.

At 2540, if the S1-AP UE Context Release Request message, received from the eNodeB in step 4, indicates that the UE is not available for the PS services in the target cell and ISR is not active, the MME deactivates GBR bearers towards S-GW and P-GW(s) by initiating MME-initiated Dedicated Bearer Deactivation procedure, for example as specified in TS 23.401, and starts the preservation and suspension of non-GBR bearers by sending Suspend Notification message to the S-GW. The S-GW releases all eNodeB related information (address and TEIDs) for the UE, and sends Suspend Notification message to the P-GW(s). The MME stores in the UE context that the UE is in suspended status. All the preserved non-GBR bearers are marked as suspended status in the S-GW and P-GW(s). The P-GW should discard packets if received for the suspended UE. Step 2540 can not be triggered by the Suspend procedure since the full GUTI can not be derived from the P-TMSI and RAI included in the Suspend Request message.

At 2542, if the UE does not initiate a LAU procedure, the UE may respond to the paging by sending a Paging Response message, for example as specified in TS 44.018 or TS 25.331. When received at the BSS/RNS, the Paging Response may be forwarded to the MSC. The MSC should be prepared to receive a Paging Response after a relatively long time from when the CS Paging Request was sent (step 2516). At 2544, if UE is registered in the MSC serving the 2G/3G cell and the UE is allowed in the LA the MSC should establish the CS call. At 2546, if the UE is not registered in the MSC that receives the Paging Response or the UE is not allowed in the LA, the MSC should reject the Paging Response by releasing the A/Iu-CS connection. The BSS/RNS in turn releases the signalling connection for CS domain. At 2548, the signaling connection release should trigger the UE to obtain the LAI, which causes the initiation of a Location Area Update or a Combined RA/LA procedure, for example as specified in TS 23.060, for the different Network Modes of Operation (NMO). The Location Area Update may trigger the Roaming Retry for CS Fallback procedure. After performing the LAU procedure the MSC should establish the CS call if the UE is allowed in the LA.

With the exception of steps 2516 and 2520 above, Call Forwarding (for example, see TS 23.082) may be performed on the basis of the signaling received on the GERAN/UTRAN cell.

After the CS voice call is terminated and if the UE is still in GERAN and PS services are suspended, then the UE should resume PS services, for example as specified in TS 23.060. A Gn/Gp-SGSN may resume the PDP Context(s), for example as described in TS 23.060. An S4 SGSN may resume the bearers, for example as described in TS 23.060, and inform the S-GW and P-GW(s) to resume the suspended bearers. If the UE has returned to E-UTRAN after the CS voice call was terminated, then the UE should resume PS service by sending TAU to MME. The MME may in addition inform S-GW and P-GW(s) to resume the suspended bearers. Resuming the suspended bearers in the S-GW and in the P-GW should be done by implicit resume using the Modify Bearer request message if it is triggered by the procedure in operation e.g. RAU, TAU or Service Request. The S-GW is aware of the suspend state of the bearers and should forward the Modify Bearer request to the P-GW. Explicit resume using the Resume Notification message should be used in cases when Modify Bearer Request is not triggered by the procedure in operation.

If the UE remains on UTRAN/GERAN after the CS voice call is terminated the UE performs normal mobility management procedures as, for example as defined in TS 23.060 and TS 24.008.

General Remarks

In some configurations, the apparatus for wireless communication includes means for performing various functions as described herein. In one aspect, the aforementioned means may be a processor or processors and associated memory in which embodiments reside, such as are shown in FIG. 16, and which are configured to perform the functions recited by the aforementioned means. The may be, for example, modules or apparatus residing in UEs, eNBs, MMEs, and/or other network nodes such as are shown herein, such as in FIGS. 1-5 and 16-19, to perform the multimode functions as are described herein, such as in processes as shown in FIGS. 6-15. In another aspect, the aforementioned means may be a module or any apparatus configured to perform the functions recited by the aforementioned means.

In one or more exemplary embodiments, the functions, methods and processes described may be implemented in hardware, software, firmware, or any combination thereof. If implemented in software, the functions may be stored on or encoded as one or more instructions or code on a non-transitory computer-readable medium. Computer-readable media includes computer storage media. Storage media may be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

It is understood that the specific order or hierarchy of steps or stages in the processes and methods disclosed are examples of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In some implementations, processors may be processors, such as communication processors, specifically designed for implementing functionality in communication devices or other mobile or portable devices.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects may be readily apparent to those skilled in the art, and the principles defined herein may be applied to other aspects without departing from the spirit or scope of the disclosure. Thus, the disclosure is not intended to be limited to the aspects shown herein but is to be accorded the widest scope consistent with the principles and novel features disclosed herein. It is intended that the following claims and their equivalents define the scope of the disclosure.

What is claimed is:

1. A method for providing communications in a multi-mode environment, the method comprising:
   receiving, at a user terminal, a redirection target from a network entity;
   detecting a failure to connect to the redirection target;
   searching, responsive to the failure, for an alternative target;
   camping on a cell of the alternative target; and
   performing at least one of a Routing Area Update (RAU) procedure and a Circuit Switched (CS) call setup procedure while camped on the cell.

2. The method of claim 1, further comprising determining that the redirection target uses a first Radio Access Technology (RAT) different from a second RAT used by the alternative target.

3. The method of claim 1, further comprising performing the RAU procedure before performing the CS call setup procedure.

4. The method of claim 1, further comprising performing the RAU procedure in parallel with the CS call setup procedure.

5. The method of claim 1, further comprising determining, at the user terminal, whether to perform the RAU procedure in advance of the CS call setup procedure based on at least one of an operator preference, a user preference, an operator policy, or a user policy.

6. The method of claim 1, further comprising performing the at least one of the RAU procedure and the CS call setup procedure based in part on a configuration status of a multi-mode environment (MME) serving the user terminal.

7. A non-transitory computer-readable medium holding encoded instructions for causing a user terminal of a wireless communication network to:
   receive a redirection target from a network entity;
   detect a failure to connect to the redirection target;
   search, responsive to the failure, for an alternative target;
   camp on a cell of the alternative target; and
   perform at least one of a Routing Area Update (RAU) procedure and a Circuit Switched (CS) call setup procedure while camped on the cell.

8. A communication apparatus, comprising:
   a transmitter module configured to communicate with a plurality of base stations using different Radio Access Technologies (RATs);
   a receiver module configured to receive a redirection target from a network entity;
   a processor module coupled to the transmitter module and to the receiver module, configured to:
   detect a failure to connect to the redirection target;
   search, in conjunction with the receiver module, for an alternative target in response to the failure;
   initiate a process to camp on a cell of the alternative target; and
   initiate at least one of a Routing Area Update (RAU) procedure and a Circuit Switched (CS) call setup procedure in conjunction with the transmitter module while camped on the cell.

9. The communication apparatus of claim 8, wherein the processor module is further configured to determine that the redirection target uses a first Radio Access Technology (RAT) different from a second RAT used by the alternative target.

10. The communication apparatus of claim 8, wherein the processor module is further configured to determine whether to perform the RAU procedure in advance of the CS call setup procedure based on at least one of an operator preference, a user preference, an operator policy, or a user policy.

11. The communication apparatus of claim 8, wherein the processor module is further configured to perform the at least one of the RAU procedure and the CS call setup procedure based in part on a configuration status of a multi-mode environment (MME).

12. A communication apparatus, comprising:
   means for receiving a redirection target;
   means for detecting a failure to connect to the redirection target;
   means for searching, responsive to the failure, for an alternative target;
   means for camping on a cell of the alternative target; and
   means for performing at least one of a Routing Area Update (RAU) procedure and a Circuit Switched (CS) call setup procedure while camped on the cell.

13. A method for providing communications in a multi-mode environment, the method comprising:
   receiving, at a user terminal, a redirection target from a network entity;
   detecting a failure to connect to the redirection target;
   camping, responsive to the failure, on a cell associated with an alternative target; and
   determining whether to perform a Routing Area Update (RAU) procedure while camped on the cell.

14. The method of claim 13, further comprising determining when to perform a Circuit Switched (CS) call setup procedure in response to the determining whether to perform a RAU procedure.

15. The method of claim 14, further comprising determining when to perform the CS call setup procedure based in part on which of at least one Radio Access Technology (RAT) is in use by the redirection target and the alternative target.

16. The method of claim 13, further comprising determining when to perform a Circuit Switched (CS) call setup procedure based at least in part on determining an Idle Mode Signaling Reduction (ISR) status of the user terminal.

17. The method of claim 13, further comprising communicating with the network entity via a cell of a first network using a first Radio Access Technology (RAT) when receiving the redirection target, wherein the redirection target uses a second RAT different from the first RAT.

18. The method of claim 17, further comprising receiving Packet Service (PS) suspension information for a suspension of PS to the user terminal in connection with receiving the redirection target.

19. The method of claim 18, further comprising determining whether to perform the RAU procedure further based on the PS suspension information.

20. The method of claim 17, further comprising determining whether the redirection target is Dual Transfer Mode (DTM) capable.

21. The method of claim 20, further comprising determining whether to perform the RAU procedure based at least in part on whether the redirection target is DTM capable.

22. The method of claim 20, further comprising receiving information in one or more system information blocks (SIBs) from the network entity for determining whether the redirection target is DTM capable.

23. The method of claim 20, further comprising receiving information from the network entity in a Radio Resource Control (RRC) Connection Release Request for determining whether the redirection target is DTM capable.

24. A non-transitory computer-readable medium holding encoded instructions for causing a user terminal of a wireless communication network to:
    receive a redirection target from a network entity;
    detect a failure to connect to the redirection target;
    camp on a cell associated with an alternative target; and
    determine whether to perform a Routing Area Update (RAU) procedure while camped on the cell.

25. A communication apparatus, comprising:
    a transmitter module configured to communicate with a plurality of base stations using different Radio Access Technologies (RATs);
    a receiver module configured to receive a redirection target from a network entity;
    a processor module coupled to the transmitter module and to the receiver module, and configured to:
    detect a failure to connect to the redirection target;
    initiate a process to camp on a cell associated with an alternative target; and
    determine whether to perform a Routing Area Update (RAU) procedure while camped on the cell.

26. The communication apparatus of claim 25, wherein the processor module is further configured to determine when to perform a Circuit Switched (CS) call setup procedure in response to the determining whether to perform a RAU procedure.

27. The communication apparatus of claim 26, wherein the processor module is further configured to determine when to perform the CS call setup procedure based in part on which of at least one Radio Access Technology (RAT) is in use by the redirection target and the alternative target.

28. The communication apparatus of claim 25, wherein the processor module is further configured to determine when to perform a Circuit Switched (CS) call setup procedure based at least in part on determining an Idle Mode Signaling Reduction (ISR) status.

29. The communication apparatus of claim 25, wherein the transmitter module is further configured to communicate with the network entity via a cell of a first network using a first Radio Access Technology (RAT) when receiving the redirection target, wherein the redirection target uses a second RAT different from the first RAT.

30. A communication apparatus, comprising:
    means for receiving a redirection target;
    means for detecting a failure to connect to the redirection target;
    means for camping, responsive to the failure, on a cell associated with an alternative target; and
    means for determining whether to perform a Routing Area Update (RAU) procedure while camped on the cell.

* * * * *